United States Patent
Rahman et al.

(10) Patent No.: US 10,659,118 B2
(45) Date of Patent: May 19, 2020

(54) METHOD AND APPARATUS FOR EXPLICIT CSI REPORTING IN ADVANCED WIRELESS COMMUNICATION SYSTEMS

(71) Applicant: Samsung Electronics Co., Ltd, Suwon-si (KR)

(72) Inventors: Md. Saifur Rahman, Richardson, TX (US); Eko Onggosanusi, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 162 days.

(21) Appl. No.: 15/490,561

(22) Filed: Apr. 18, 2017

(65) Prior Publication Data

US 2017/0302353 A1      Oct. 19, 2017

Related U.S. Application Data

(60) Provisional application No. 62/324,604, filed on Apr. 19, 2016, provisional application No. 62/351,465, (Continued)

(51) Int. Cl.
  *H04B 7/0456*  (2017.01)
  *H04B 7/06*  (2006.01)

(52) U.S. Cl.
  CPC ......... *H04B 7/0478* (2013.01); *H04B 7/0469* (2013.01); *H04B 7/0486* (2013.01); *H04B 7/065* (2013.01)

(58) Field of Classification Search
  CPC .. H04B 7/0478; H04B 7/0469; H04B 7/0486; H04B 7/065
  See application file for complete search history.

(56) References Cited

U.S. PATENT DOCUMENTS

| | | | |
|---|---|---|---|
| 8,891,478 B2 * | 11/2014 | Kakishima | H04B 7/065 370/329 |
| 2012/0178374 A1 | 7/2012 | Yuan et al. | |

(Continued)

OTHER PUBLICATIONS

Y. Nam et al., "Full dimension MIMO for LTE-Advanced and 5G," 2015 Information Theory and Applications Workshop (ITA), San Diego, CA, Feb. 6, 2015, pp. 143-148.*

(Continued)

*Primary Examiner* — Michelle M Koeth

(57) ABSTRACT

A method for a channel state information (CSI) feedback. The method comprises receiving CSI feedback configuration information for the CSI feedback including a spatial channel information indicator based on a linear combination (LC) codebook, wherein the spatial channel information comprises at least one of a downlink channel matrix, a covariance matrix of the downlink channel matrix, or at least one eigenvector of the covariance matrix of the downlink channel matrix; deriving the spatial channel information indicator using the LC codebook that indicates a weighted linear combination of a plurality of basis vectors or a plurality of basis matrices as a representation of at least one of a downlink channel matrix, a covariance matrix of the downlink channel matrix, or at least one eigenvector of the covariance matrix of the downlink channel matrix; and transmitting over an uplink channel, the CSI feedback including the spatial channel information indicator.

20 Claims, 26 Drawing Sheets

Related U.S. Application Data filed on Jun. 17, 2016, provisional application No. 62/353,781, filed on Jun. 23, 2016, provisional application No. 62/377,711, filed on Aug. 22, 2016, provisional application No. 62/378,578, filed on Aug. 23, 2016.

(56) References Cited

U.S. PATENT DOCUMENTS

| | | | | |
|---|---|---|---|---|
| 2013/0129014 A1* | 5/2013 | Kim | ...................... | H04B 7/0456 375/295 |
| 2014/0334409 A1 | 11/2014 | Kim et al. | | |
| 2015/0049829 A1* | 2/2015 | Zhuang | ................. | H04L 5/0037 375/267 |

OTHER PUBLICATIONS

Rahman et al., "Linear Combination Codebook Based CSI Feedback Scheme for FD-MIMO Systems," 2015 IEEE Globecom Workshops (GC Wkshps), San Diego, CA, Dec. 10, 2015, pp. 1-6.*
Y. Nam et al., "Full dimension Mimo for LTE-Advanced and 5G," 2015 Information Theory and Applications Workshop (ITA), San Diego, CA, Feb. 6, 2015, pp. 143-148. (Year: 2015).*
Rahman et al., "Linear Combination Codebook Based CSI Feedback Scheme for FD-MIMO Systems," 2015 IEEE Globecom Workshops (GC Wkshps), San Diego, CA, Dec. 10, 2015, pp. 1-6. (Year: 2015).*
Onggosanusi et al., "Reduced space channel feedback for FD-MIMO," 2015 IEEE International Conference on Communications (ICC), London, 2015, pp. 3873-3878 (Year: 2015).*
International Search Report for International Application No. PCT/KR2017/004191, dated Jul. 24, 2017. (3 pages).
Samsung, "Linear combination codebook and CSI reporting", R1-162693, 3GPP TSG RAN WG1 Meeting #84bis, Busan, Korea, Apr. 11-15, 2016. (6 pages).
Samsung, "Hybrid PMI codebook and CSI reporting", R1-162691, 3GPP TSG RAN WG1 Meeting #84bis, Busan, Korea, Apr. 11-15, 2016. (6 pages).
3GPP TSG RAN Meeting #71 RP-160623, "New WID Proposal: Enhancements on Full-Dimension (FD) MIMO for LTE Approval 10.1.1", Göteborg, Sweden, Mar. 7-10, 2016, 8 Pages.
3GPP TS 36.211 V14.2.0 (Mar. 2017) Technical Specification3rd Generation Partnership Project;Technical Specification Group Radio Access Network; Evolved Universal Terrestrial Radio Access (E-UTRA); Physical channels and modulation(Release 14) Mar. 2017—194 Pages.
3GPP TS 36.212 V14.2.0 (Mar. 2017) Technical Specification 3rd Generation Partnership Project; Technical Specification Group Radio Access Network; Evolved Universal Terrestrial Radio Access (E-UTRA); Multiplexing and channel coding (Release 14)—Mar. 2017—197 Pages.
3GPP TS 36.213 V14.2.0 (Mar. 2017) Technical Specification 3rd Generation Partnership Project; Technical Specification Group Radio Access Network; Evolved Universal Terrestrial Radio Access (E-UTRA); Physical layer procedures (Release 14)—Mar. 2017 454 Pages.
3GPP TS 36.321 V14.2.0 (Mar. 2017) Technical Specification 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.2.0 (Mar. 2017) Technical Specification 3rd Generation Partnership Project; Technical Specification Group Radio Access Network; Evolved Universal Terrestrial Radio Access (E-UTRA); Radio Resource Control (RRC); Protocol specification.
"3rd Generation Partnership Project; Technical Specification Group Radio Access Network; Evolved Universal Terrestrial Radio Access (E-UTRA); Physical layer procedures (Release 13)", 3GPP TS 36.213, Mar. 31, 2016, p. 45-254.
Supplementary European Search Report dated Mar. 8, 2019 in connection with European Patent Application No. 17 78 6173, 9 pages.

* cited by examiner

1200

2nd dim ↑
1st dim →

| Number of ports | Port layouts, and $(N_1, N_2)$ values | | | | | |
|---|---|---|---|---|---|---|
| 2 | (1,1) | × | | | | |
| 4 | (2,1) | × × | | | | |
| 8 | (2,2) | × ×<br>× × | | (4,1) | × × × × | |
| 12 | (2,3) | × ×<br>× ×<br>× × | × × ×<br>× × ×<br>(3,2) | | × × × × × ×<br>(6,1) | |
| 16 | (2,4) | × ×<br>× ×<br>× ×<br>× × | × × × ×<br>× × × ×<br>(4,2) | | × × × × × × × ×<br>(8,1) | |

FIGURE 12

| # ports | Port layouts, and $(N_1, N_2)$ values | | | |
|---|---|---|---|---|
| 20 | (5,2) (2,5) (1,10) | | | |
| | (10,1) | | | |
| 24 | (4,3) (3,4) (2,6) (1,12) | | | |
| | (6,2) | | | |
| | (12,1) | | | |
| 28 | (7,2) (2,7) (1,14) | | | |
| | (14,1) | | | |
| 32 | (4,4) (2,8) (1,16) | | | |
| | (8,2) | | | |
| | (16,1) | | | |

FIGURE 13

| Configuration | $W_1$ codebook | Class A W1 beams, indicated by i1 or $(i_{1,1}, i_{1,2})$ Beams | Class B, K = 1 |
|---|---|---|---|
| 0-0 | Rank 1-2 | | $N_p = 2$ |
| 1-0, 1-1 | Rank 3-4 | 1D port layout: 3 orthogonal beam pairs {(0,0),(0,O1)}, {(0,0),(2,O1)}, and {(0,0),(3,O1)} <br> 2D port layout: 2 orthogonal beam pairs {(0,0),(O1,0)} and {(0,0),(O2,0)} | $N_p = 2, 4$ |
| 2-0, 2-1, 2-2 | Rank 7-8 | 1D port layout / 2D port layout | $N_p = 2, 4, 8$ |

| Codebook-Config | Rank 1 beam group | | |
|---|---|---|---|
| | | $N_1 \geq N_2$ | $N_1 < N_2$ |
| 1 | | $(L_1, L_2) = (1,1)$ | $(L_1, L_2) = (1,1)$ |
| 2 | | $(L_1, L_2) = (2,2)$ | $(L_1, L_2) = (2,2)$ |
| 3 | | $(L_1, L_2) = (4,2)$ | $(L_1, L_2) = (2,4)$ |
| 4 | | $(L_1, L_2) = (4,1)$ | $(L_1, L_2) = (1,4)$ |

FIGURE 29

| Codebook-Config | Rank 1 beam group | Number of beams ($L_1, L_2$) | |
|---|---|---|---|
| | | $N_1 >= N_2$ | $N_1 < N_2$ |
| 5 | | (4,2) | (2,4) |
| 6 | | (8,2) | (2,8) |
| 7 | | (8,1) | (1,8) |
| 8 | | (2,4) | (4,2) |
| 9 | | (4,4) | (4,4) |
| 10 | | (4,2) | (2,4) |

FIGURE 30

METHOD AND APPARATUS FOR EXPLICIT CSI REPORTING IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/324,604, filed on Apr. 19, 2016, entitled "Method and Apparatus for Explicit CSI reporting in Advanced Wireless Communication Systems;" U.S. Provisional Patent Application Ser. No. 62/351,465, filed on Jun. 17, 2016, entitled "Hybrid CSI Reporting for MIMO Wireless Communication Systems;" U.S. Provisional Patent Application Ser. No. 62/353,781, filed on Jun. 23, 2016, entitled "Method and Apparatus for Explicit CSI reporting in Advanced Wireless Communication Systems;" U.S. Provisional Patent Application Ser. No. 62/377,711, filed on Aug. 22, 2016, entitled "Hybrid CSI Reporting for MIMO Wireless Communication Systems;" and U.S. Provisional Patent Application Ser. No. 62/378,578, filed on Aug. 23, 2016, entitled "Hybrid CSI Reporting for MIMO Wireless Communication Systems." The content of the above-identified patent documents are incorporated herein by reference.

TECHNICAL FIELD

The present application relates generally to channel state information (CSI) reporting operation in advanced wireless communication systems. More specifically, this disclosure relates to advanced CSI reporting based on linear combination codebook wherein the advanced CSI comprises at least one of a downlink channel matrix, a covariance matrix of the downlink channel matrix, or at least one eigenvector of the covariance matrix of the downlink channel matrix.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-$5^{th}$-Generation (5G) or 5G communication system to be provided for supporting higher data rates beyond $4^{th}$-Generation (4G) communication system such as long term evolution (LTE). Embodiments of the present disclosure provide an advanced CSI reporting based on linear combination codebook for MIMO wireless communication systems wherein advanced CSI comprises at least one of a downlink channel matrix, a covariance matrix of the downlink channel matrix, or at least one eigenvector of the covariance matrix of the downlink channel matrix.

In one embodiment, a user equipment (UE) for a channel state information (CSI) feedback in an advanced communication system is provided. The UE comprises a transceiver configured to receive, via a higher layer signaling from a base station (BS), CSI feedback configuration information for the CSI feedback including a spatial channel information indicator based on a linear combination (LC) codebook, wherein the spatial channel information indicator comprises at least one of a downlink channel matrix, a covariance matrix of the downlink channel matrix, or at least one eigenvector of the covariance matrix of the downlink channel matrix. The UE further comprises at least one processor configured to derive the spatial channel information indicator using the LC codebook that indicates a weighted linear combination of a plurality of basis vectors or a plurality of basis matrices as a representation of at least one of a downlink channel matrix, a covariance matrix of the downlink channel matrix, or at least one eigenvector of the covariance matrix of the downlink channel matrix, wherein, the transceiver is further configured to transmit, to the BS, over an uplink channel, the CSI feedback including the spatial channel information indicator.

In another embodiment, a base station (BS) for a channel state information (CSI) feedback in an advanced communication system is provided. The BS comprises a transceiver configured to transmit, via a higher layer signaling to a user equipment (UE), CSI feedback configuration information for the CSI feedback including a spatial channel information indicator based on a linear combination (LC) codebook, wherein the spatial channel information indicator comprises at least one of a downlink channel matrix, a covariance matrix of the downlink channel matrix, or at least one eigenvector of the covariance matrix of the downlink channel matrix; and receive, from the UE, over an uplink channel, the CSI feedback including the spatial channel information indicator, wherein the spatial channel information indicator is derived using the LC codebook that indicates a weighted linear combination of a plurality of basis vectors or a plurality of basis matrices as a representation of at least one of a downlink channel matrix, a covariance matrix of the downlink channel matrix, or at least one eigenvector of the covariance matrix of the downlink channel matrix.

In yet another embodiment, a method for a channel state information (CSI) feedback in an advanced communication system is provided. The method comprises receiving, via a higher layer signaling from a base station (BS), CSI feedback configuration information for the CSI feedback including a spatial channel information indicator based on a linear combination (LC) codebook, wherein the spatial channel information indicator comprises at least one of a downlink channel matrix, a covariance matrix of the downlink channel matrix, or at least one eigenvector of the covariance matrix of the downlink channel matrix; deriving, by a user equipment (UE), the spatial channel information indicator using the LC codebook that indicates a weighted linear combination of a plurality of basis vectors or a plurality of basis matrices as a representation of at least one of a downlink channel matrix, a covariance matrix of the downlink channel matrix, or at least one eigenvector of the covariance matrix of the downlink channel matrix; and transmitting, to the BS, over an uplink channel, the CSI feedback including the spatial channel information indicator.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM).

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example dual-polarized antenna port layouts for {2, 4, 8, 12, 16} ports according to embodiments of the present disclosure;

FIG. 13 illustrates example dual-polarized antenna port layouts for {20, 24, 28, 32} ports according to embodiments of the present disclosure;

FIG. 25 illustrates an example hybrid configuration for Codebook-Config=1 according to embodiments of the present disclosure;

FIG. 26 illustrates an example hybrid configuration for Codebook-Config=2, 3, and 4 according to embodiments of the present disclosure;

FIG. 29 illustrates a table for a Codebook-Config parameter to rank 1 beam grouping mapping according to embodiments of the present disclosure; and FIG. 30 illustrates a table for an alternate Codebook-Config to beam group mapping according to embodiments of the present disclosure.

DETAILED DESCRIPTION

FIGS. 1 through 30, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v14.2.0, "E-UTRA, Physical channels and modulation" (REF1); 3GPP TS 36.212 v14.2.0, "E-UTRA, Multiplexing and Channel coding" (REF2); 3GPP TS 36.213 v14.2.0, "E-UTRA, Physical Layer Procedures" (REF3); 3GPP TS 36.321 v14.2.0, "E-UTRA, Medium Access Control (MAC) protocol specification" (REF4); 3GPP TS 36.331 v14.2.0, "E-UTRA, Radio Resource Control (RRC) protocol specification" (REF5); and RP-160623, "New WID Proposal: Enhancements on Full-Dimension (FD) MIMO for LTE," Samsung (REF6).

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier(FBMC), non-orthogonal multiple access (NOMA), and sparse code multiple access (SCMA) as an advanced access technology have been developed.

Figure 1:
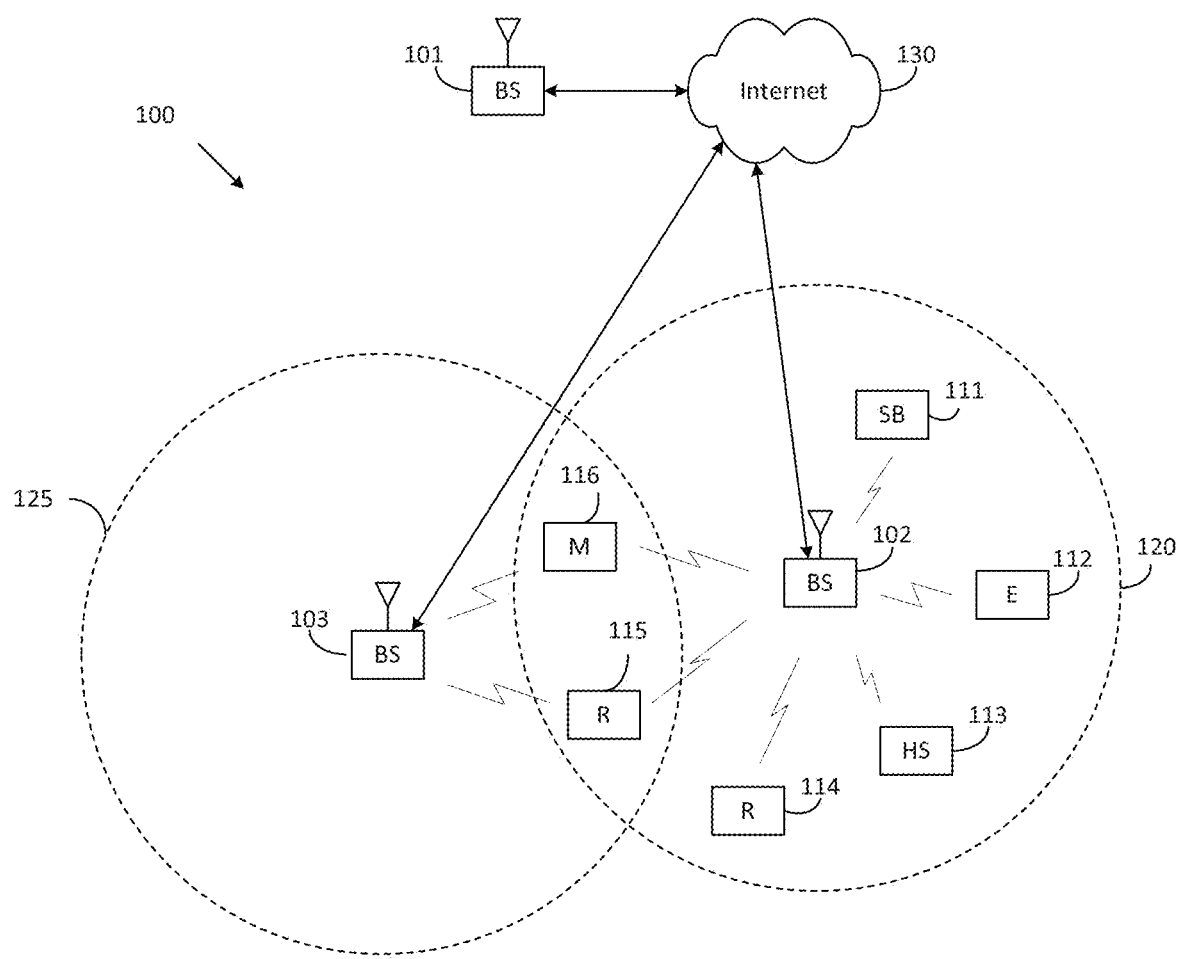
FIG. 1 illustrates an example wireless network according to embodiments of the present disclosure.
Figure 2:
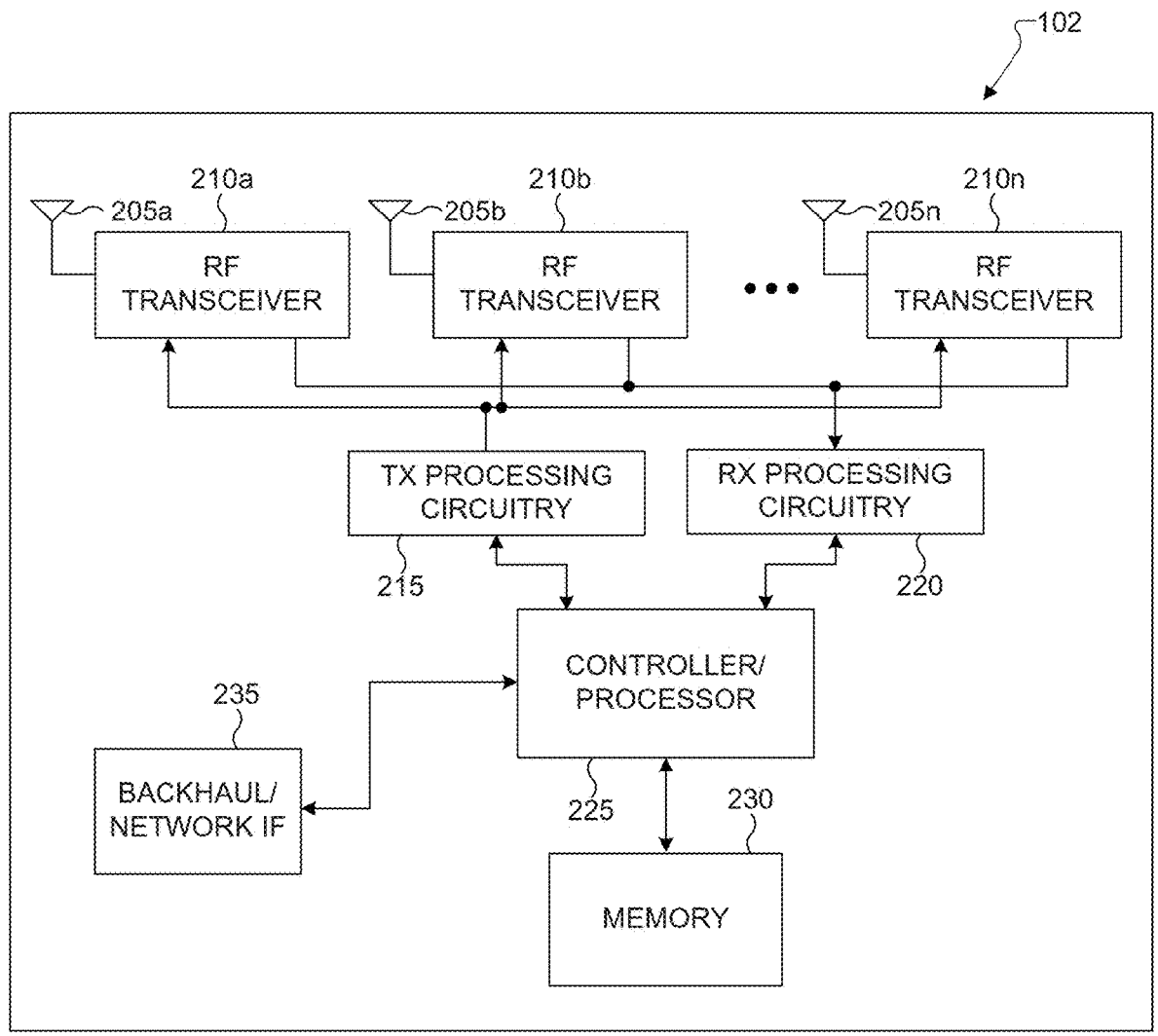
FIG. 2 illustrates an example eNodeB (eNB) according to embodiments of the present disclosure.
Figure 3:
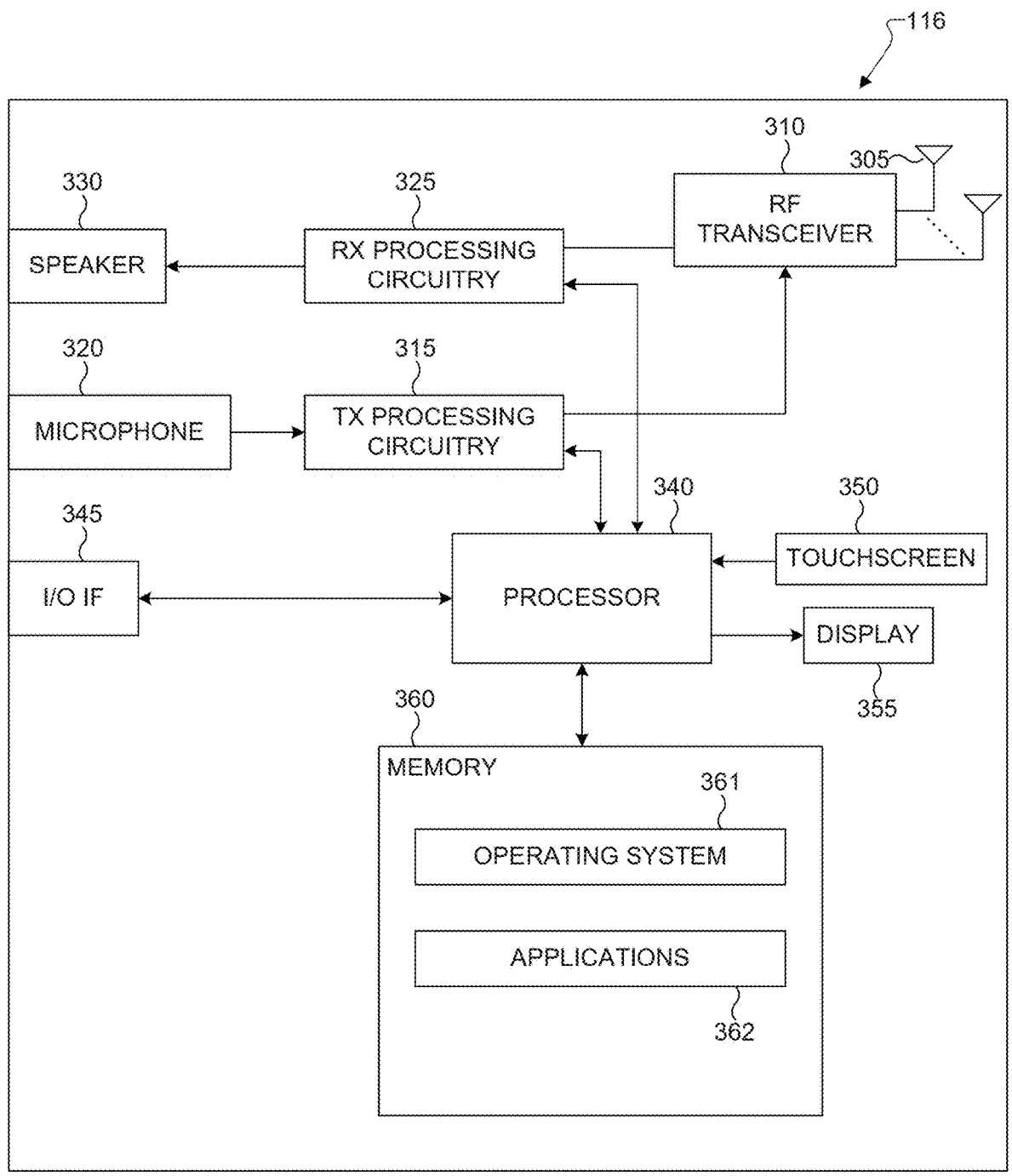
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on an uplink channel in an advanced wireless communication system. In certain embodiments, and one or more of the eNBs 101-103 includes circuitry, programing, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiment, the RF transceivers 210a-210n is capable of transmitting, via a higher layer signaling to a user equipment (UE), CSI feedback configuration information for the CSI feedback including a spatial channel information indicator based on a linear combination (LC) codebook, wherein the spatial channel information indicator comprises at least one of a downlink channel matrix, a covariance matrix of the downlink channel matrix, or at least one eigenvector of the covariance matrix of the downlink channel matrix; and receiving, from the UE, over an uplink channel, the CSI feedback including the spatial channel information indicator, wherein the spatial channel information indicator is derived using the LC codebook that indicates a weighted linear combination of a plurality of basis vectors or a plurality of basis matrices as a representation of at least one of a downlink channel matrix, a covariance matrix of the downlink channel matrix, or at least one eigenvector of the covariance matrix of the downlink channel matrix.

In such embodiments, the spatial channel information indicator corresponds to a precoding matrix indicator (PMI) comprising a first PMI $i_1$ to indicate at least one of the plurality of basis vectors or the plurality of basis matrices, and a second PMI $i_2$ to indicate weights to combine the plurality of basis vectors or the plurality of basis matrices.

In such embodiments, the spatial channel information indicator comprises the at least one eigenvector corresponding to at least one transmit eigenvector derived using an eigen decomposition of an P×P transmit covariance matrix of an P×R downlink channel matrix, where P is a number of antenna ports at the BS and R is a number of antenna ports at the UE, and wherein the at least one transmit eigenvector is represented as the following weighted linear combination of the plurality of basis vectors: $e_{T,1} \approx \Sigma_{l=0}^{L_T-1} c_{T,l} b_{T,l}$ where $b_{T,l}$ is a transmit basis vector, $c_{T,l}$ is an l-th transmit weight, and $L_T$ is a number of a plurality of transmit basis vectors.

In such embodiments, the spatial channel information indicator comprises the at least one eigenvector corresponding to at least one receive eigenvector derived using an eigen decomposition of an R×R receive covariance matrix of an P×R downlink channel matrix, where P is a number of antenna ports at the BS and R is a number of antenna ports at the UE, and wherein the at least one receive eigenvector is represented as the following weighted linear combination of the plurality of basis vectors: $e_{R,1} \approx \Sigma_{l=0}^{L_R-1} c_{R,l} b_{R,l}$ where $b_{R,l}$ is a receive basis vector, $c_{R,l}$ is an l-th receive weight, and $L_R$ is a number of a plurality of receive basis vectors.

In such embodiments, the spatial channel information indicator comprises at least one eigenvector corresponding to at least one transmit and at least one receive eigenvectors that are jointly derived using an eigen decomposition of an P×P transmit covariance matrix and an R×R receive covariance matrix of an P×R downlink channel matrix, where P is a number of antenna ports at the BS and R is a number of antenna ports at the UE, and wherein the jointly derived at least one transmit and at least one receive eigenvectors are represented as the following weighted linear combination of the plurality of basis vectors: $e_{R,1} \approx \Sigma_{l=0}^{L_R-1} c_{R,l} b_{R,l}$ where $b_{R,l}$ is a transmit basis vector, L is a number of a plurality of transmit and receive basis vectors, $b_{R,l}$ is a receive basis vector, $c_l$ is an l-th weight.

In such embodiments, the spatial channel information indicator comprises at least one of a transmit covariance matrix or a receive covariance matrix based on the downlink channel matrix, wherein the transmit and receive covariance matrices are represented as the following weighted linear combination of the plurality of basis matrices:

$$E_T = \frac{1}{|f|} \sum_{k \in f} ((H_k^{(D)})(H_k^{(D)})^H) \approx \sum_{l=0}^{L_T-1} c_{T,l} b_{T,l} b_{T,l}^H; \text{ and}$$

$$E_R = \frac{1}{|f|} \sum_{k \in f} ((H_k^{(D)})^H (H_k^{(D)})) \approx \sum_{l=0}^{L_R-1} c_{R,l} b_{R,l} b_{R,l}^H$$

where f is a set of frequency subcarriers, $H_k^{(D)}$ is a P×R downlink channel matrix at a frequency subcarrier k in the set f, $E_T$ is a transmit covariance matrix, $b_{T,l} b_{T,l}^H$ is a transmit basis matrix, $c_{T,l}$ is an l-th transmit weight, $L_T$ is a number of a plurality of transmit basis matrices, $E_R$ is a receive covariance matrix, $b_{R,l} b_{R,l}^H$ is a receive basis matrix, $c_{R,l}$ is an l-th receive weight, and $L_R$ is a number of a plurality of receive basis matrices.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of CSI reporting on an uplink channel. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, via a higher layer signaling from a base station (BS), CSI feedback configuration information for the CSI feedback including a spatial channel information indicator based on a linear combination (LC) codebook, wherein the spatial channel information indicator comprises at least one of a downlink channel matrix, a covariance matrix of the downlink channel matrix, or at least one eigenvector of the covariance matrix of the downlink channel matrix; and transmitting, to the BS, over an uplink channel, the CSI feedback including the spatial channel information indicator.

In such embodiments, the spatial channel information indicator corresponds to a precoding matrix indicator (PMI) comprising a first PMI $i_1$ to indicate at least one of the plurality of basis vectors or the plurality of basis matrices, and a second PMI $i_2$ to indicate weights to combine the plurality of basis vectors or the plurality of basis matrices.

In such embodiments, the spatial channel information indicator comprises the at least one eigenvector corresponding to at least one transmit eigenvector derived using an eigen decomposition of an P×P transmit covariance matrix of an P×R downlink channel matrix, where P is a number of antenna ports at the BS and R is a number of antenna ports at the UE, and wherein the at least one transmit eigenvector is represented as the following weighted linear combination of the plurality of basis vectors: $e_{T,l} \approx \Sigma_{l=0}^{L_T-1} c_{T,l} b_{T,l}$ where $b_{T,l}$ is a transmit basis vector, $c_{T,l}$ is an l-th transmit weight, and $L_T$ is a number of a plurality of transmit basis vectors.

In such embodiments, the spatial channel information indicator comprises the at least one eigenvector corresponding to at least one receive eigenvector derived using an eigen decomposition of an R×R receive covariance matrix of an P×R downlink channel matrix, where P is a number of antenna ports at the BS and R is a number of antenna ports at the UE, and wherein the at least one receive eigenvector is represented as the following weighted linear combination of the plurality of basis vectors: $e_{R,1} \approx \Sigma_{l=0}^{L_R-1} c_{R,l} b_{R,l}$ where $b_{R,l}$ is a receive basis vector, $C_{R,l}$ is an l-th receive weight, and $L_R$ is a number of a plurality of receive basis vectors.

In such embodiments, the spatial channel information indicator comprises at least one eigenvector corresponding to at least one transmit and at least one receive eigenvectors that are jointly derived using an eigen decomposition of an P×P transmit covariance matrix and an R×R receive covariance matrix of an P×R downlink channel matrix, where P is a number of antenna ports at the BS and R is a number of antenna ports at the UE, and wherein the jointly derived at least one transmit and at least one receive eigenvectors are represented as the following weighted linear combination of the plurality of basis vectors: $e_{T,1} e_{R,1}^H \approx \Sigma_{l=0}^{L-1} c_l b_{T,l} b_{R,l}^H$ where $b_{T,l}$ is a transmit basis vector, L is a number of a plurality of transmit and receive basis vectors, $b_{R,l}$ is a receive basis vector, $c_l$ is an l-th weight.

In such embodiments, the spatial channel information indicator comprises at least one of a transmit covariance matrix or a receive covariance matrix based on the downlink channel matrix, wherein the transmit and receive covariance matrices are represented as the following weighted linear combination of the plurality of basis matrices:

$$E_T = \frac{1}{|f|} \sum_{k \in f} \left( (H_k^{(l)})(H_k^{(l)})^H \right) \approx \sum_{l=0}^{L_T-1} c_{T,l} b_{T,l} b_{T,l}^H; \text{ and}$$

$$E_R = \frac{1}{|f|} \sum_{k \in f} \left( (H_k^{(l)})^H (H_k^{(l)}) \right) \approx \sum_{l=0}^{L_R-1} c_{R,l} b_{R,l} b_{R,l}^H$$

where f is a set of frequency subcarriers, $H_k^{(l)}$ is a P×R downlink channel matrix at a frequency subcarrier k in the set f, $E_T$ is a transmit covariance matrix, $b_{T,l} b_{T,l}^H$ is a transmit basis matrix, $c_{T,l}$ is an l-th transmit weight, $L_T$ is a number of a plurality of transmit basis matrices, $E_R$ is a receive covariance matrix, $b_{R,l} b_{R,l}^H$ is a receive basis matrix, $c_{R,l}$ is an l-th receive weight, and $L_R$ is a number of a plurality of receive basis matrices. In some embodiments, the RF transceiver 310 is capable of transmitting, over the uplink channel, the CSI feedback including the multiple spatial channel information indicators in multiple time instances where each spatial channel information indicator corresponds the CSI for a subset of antenna ports at the BS.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on an uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of deriving, by a user equipment (UE), the spatial channel information indicator using the LC codebook that indicates a weighted linear combination of a plurality of basis vectors or a plurality of basis matrices as a representation of at least one of a downlink channel matrix, a covariance matrix of the downlink channel matrix, or at least one eigenvector of the covariance matrix of the downlink channel matrix, wherein, the transceiver is further configured to transmit, to the BS, over an uplink channel, the CSI feedback including the spatial channel information indicator.

In such embodiments, spatial channel information indicator corresponds to a precoding matrix indicator (PMI) comprising a first PMI $i_1$ to indicate at least one of the plurality of basis vectors or the plurality of basis matrices, and a second PMI $i_2$ to indicate weights to combine the plurality of basis vectors or the plurality of basis matrices.

In such embodiments, the spatial channel information indicator comprises the at least one eigenvector corresponding to at least one transmit eigenvector derived using an eigen decomposition of an P×P transmit covariance matrix of an P×R downlink channel matrix, where P is a number of antenna ports at the BS and R is a number of antenna ports at the UE, and wherein the at least one transmit eigenvector is represented as the following weighted linear combination of the plurality of basis vectors: $e_{T,i} \approx \sum_{l=0}^{L_T-1} c_{T,l} b_{T,l}$ where $b_{T,l}$ is a transmit basis vector, $c_{T,l}$ is an l-th transmit weight, and $L_T$ is a number of a plurality of transmit basis vectors.

In such embodiments, the spatial channel information indicator comprises the at least one eigenvector corresponding to at least one receive eigenvector derived using an eigen decomposition of an R×R receive covariance matrix of an P×R downlink channel matrix, where P is a number of antenna ports at the BS and R is a number of antenna ports at the UE, and wherein the at least one receive eigenvector is represented as the following weighted linear combination of the plurality of basis vectors: $e_{R,1} \approx \sum_{l=0}^{L_R-1} c_{R,l} b_{R,l}$ where $b_{R,l}$ where $b_{R,l}$ is a receive basis vector, $c_{R,l}$ is an l-th receive weight, and $L_R$ is a number of a plurality of receive basis vectors.

In such embodiments, the spatial channel information indicator comprises at least one eigenvector corresponding to at least one transmit and at least one receive eigenvectors that are jointly derived using an eigen decomposition of an P×P transmit covariance matrix and an R×R receive covariance matrix of an P×R downlink channel matrix, where P is a number of antenna ports at the BS and R is a number of antenna ports at the UE, and wherein the jointly derived at least one transmit and at least one receive eigenvectors are represented as the following weighted linear combination of the plurality of basis vectors: $e_{T,1} e_{R,1}{}^H \approx \sum_{l=0}^{L-1} c_l b_{T,l} b_{R,l}{}^H$ where $b_{T,l}$ is a transmit basis vector, L is a number of a plurality of transmit and receive basis vectors, $b_{R,l}$ is a receive basis vector, $c_l$ is an l-th weight.

In such embodiments, the spatial channel information indicator comprises at least one of a transmit covariance matrix or a receive covariance matrix based on the downlink channel matrix, wherein the transmit and receive covariance matrices are represented as the following weighted linear combination of the plurality of basis matrices:

$$E_T = \frac{1}{|f|} \sum_{k \in f} \left( (H_k^{(I)})(H_k^{(I)})^H \right) \approx \sum_{l=0}^{L_T-1} c_{T,l} b_{T,l} b_{T,l}^H; \text{ and}$$

$$E_R = \frac{1}{|f|} \sum_{k \in f} \left( (H_k^{(I)})^H (H_k^{(I)}) \right) \approx \sum_{l=0}^{L_R-1} c_{R,l} b_{R,l} b_{R,l}^H$$

where f is a set of frequency subcarriers, $H_k^{(I)}$ is a P×R downlink channel matrix at a frequency subcarrier k in the set f, $E_T$ is a transmit covariance matrix, $b_{T,l} b_{T,l}^H$ is a transmit basis matrix, $c_{T,l}$ is an l-th transmit weight, $L_T$ is a number of a plurality of transmit basis matrices, $E_R$ is a receive covariance matrix, $b_{R,l} b_{R,l}^H$ is a receive basis matrix, $c_{R,l}$ is an l-th receive weight, and $L_R$ is a number of a plurality of receive basis matrices.

In some embodiments, the processor 340 is also capable of partitioning the spatial channel information indicator into multiple spatial channel information indicators each of which corresponds to a subset of antenna ports at the BS and comprises at least one of a downlink channel matrix, a covariance matrix of the downlink channel matrix, or at least one eigenvector of the covariance matrix of the downlink channel matrix, wherein the downlink channel matrix corresponds to the subset of antenna ports at the BS.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
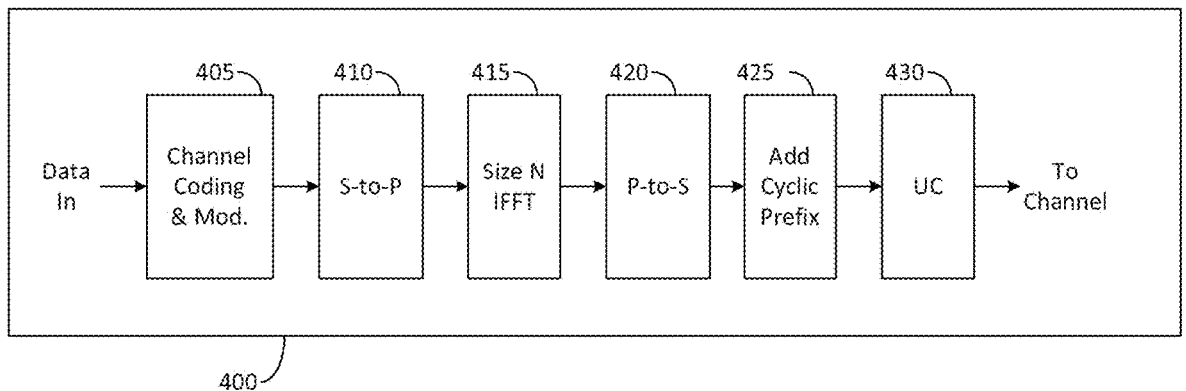
FIG. 4A illustrates a high-level diagram of an orthogonal frequency division multiple access transmit path according to embodiments of the present disclosure.
Figure 4B:
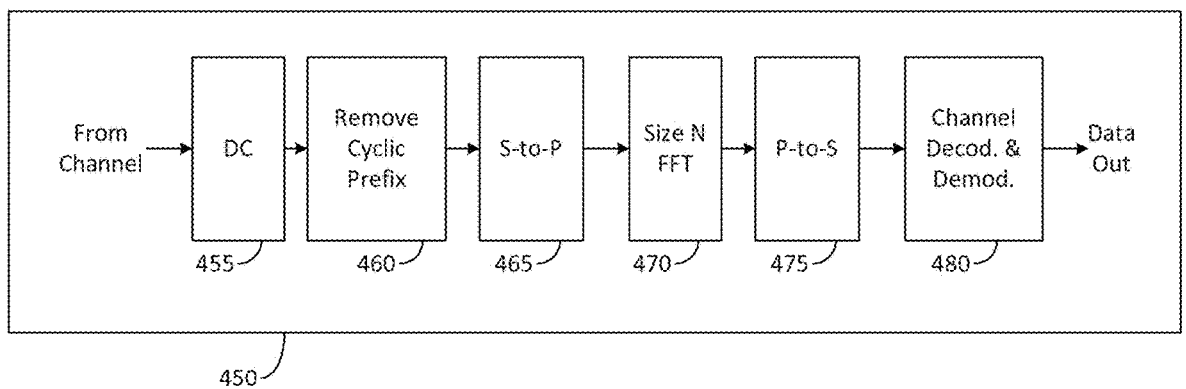
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
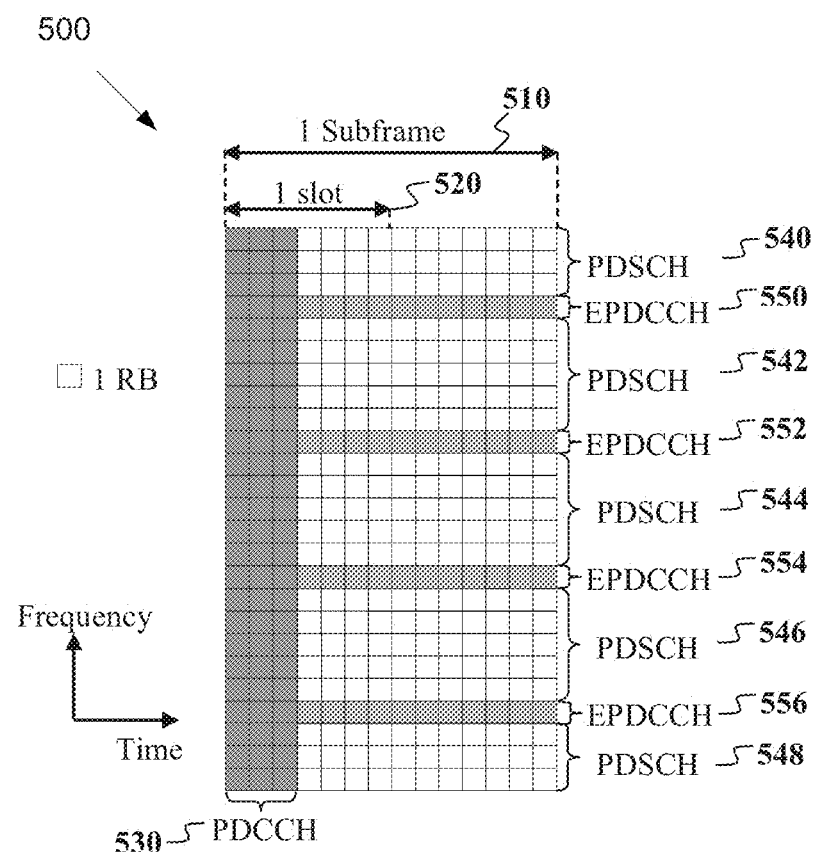
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCH}$ RBs for a total of $Z=O_F+\lfloor (n_{s0}+y \cdot N_{EPDCCH})/D \rfloor$ REs for a PDSCH transmission BW. An EPDCCH transmission is achieved in either one RB or multiple of RBs.

Figure 6:
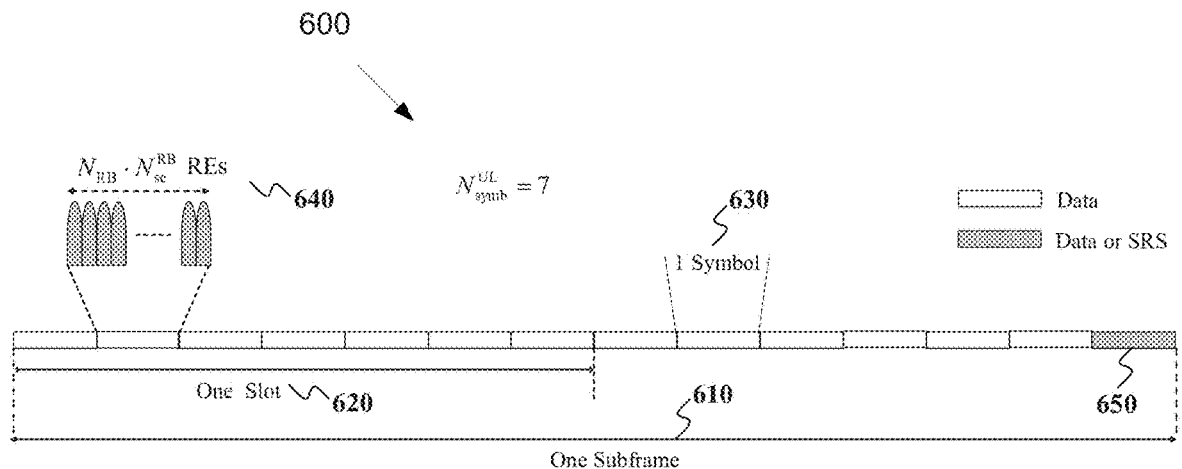
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB} \cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 7:
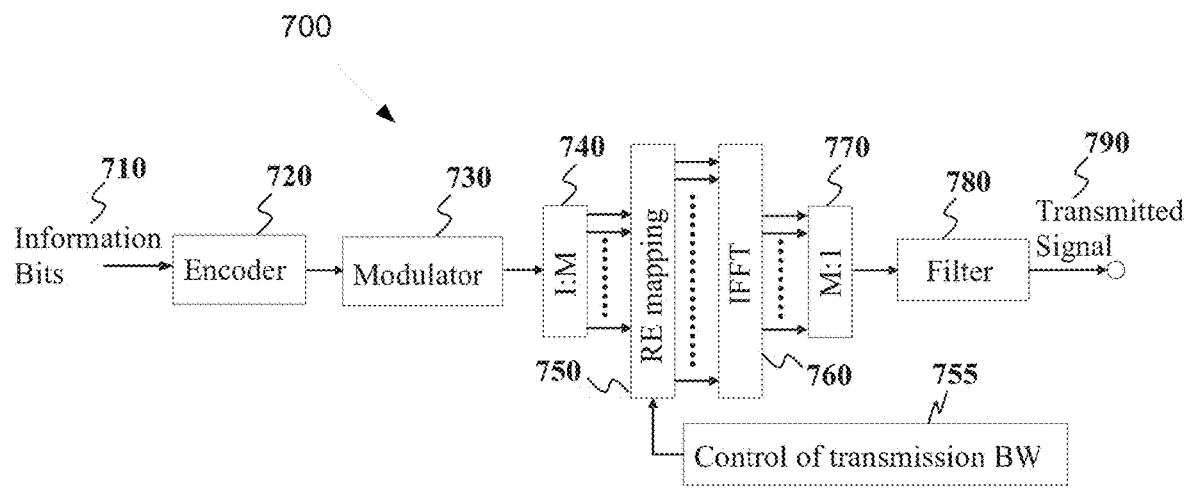
FIG. 7 illustrates an example transmitter block diagram for a physical downlink shared channel (PDSCH) subframe according to embodiments of the present disclosure.

FIG. 7 illustrates an example transmitter block diagram for a physical downlink shared channel (PDSCH) subframe 700 according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast Fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
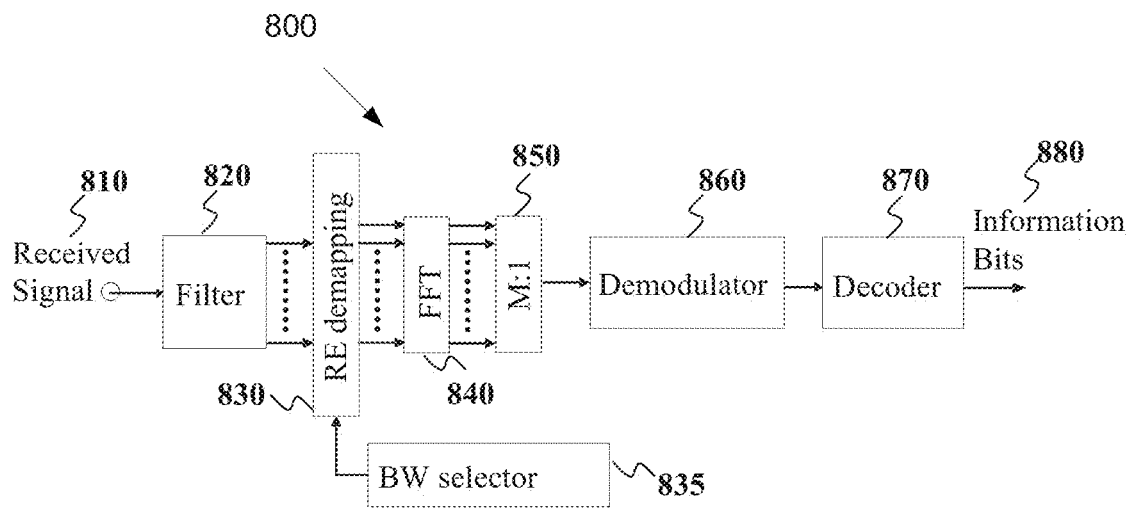
FIG. 8 illustrates an example receiver block diagram for a PDSCH subframe according to embodiments of the present disclosure.

FIG. 8 illustrates an example receiver block diagram for a packet data shared channel (PDSCH) subframe 800 according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping 830 assigns a reception bandwidth (BW) that is selected by a BW selector 835. The BW selector 835 is configured to control a transmission BW. A fast Fourier transform (FFT) circuit 840 applies a FFT. The output of the FFT circuitry 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a de-scrambling, channel estimation, and a de-interleaving are not shown for brevity.

Figure 9:
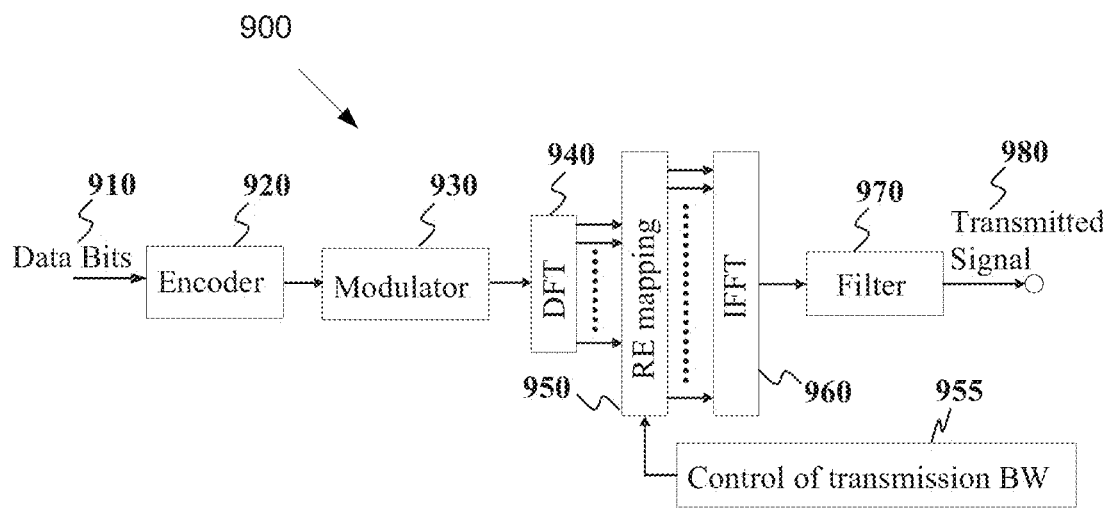
FIG. 9 illustrates an example transmitter block diagram for a physical uplink shared channel (PUSCH) subframe according to embodiments of the present disclosure.

FIG. 9 illustrates a transmitter block diagram for a physical uplink shared channel (PUSCH) subframe 900 according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
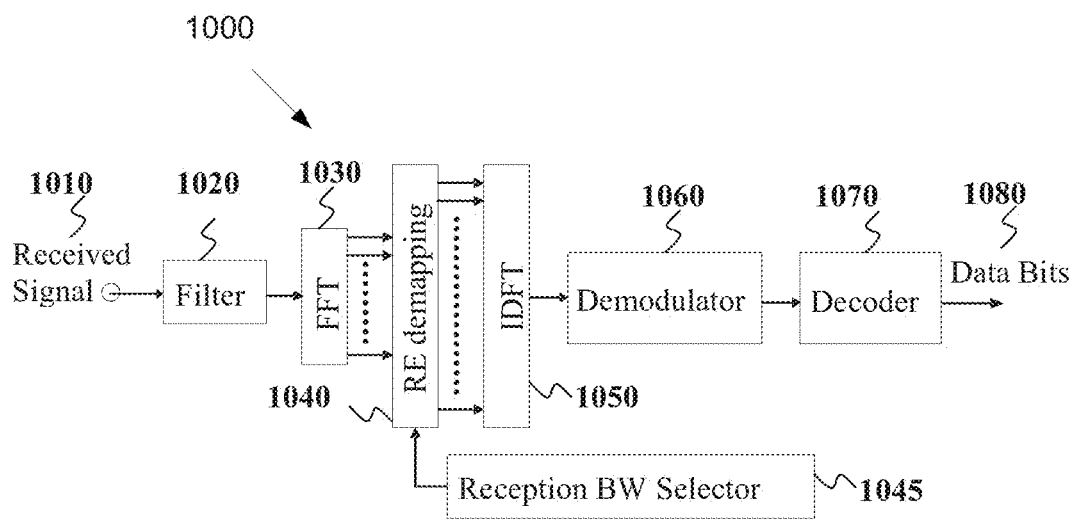
FIG. 10 illustrates an example receiver block diagram for a physical uplink shared channel (PUSCH) in a subframe according to embodiments of the present disclosure.

FIG. 10 illustrates an example receiver block diagram for a PUSCH subframe 1000 according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs 1040 corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
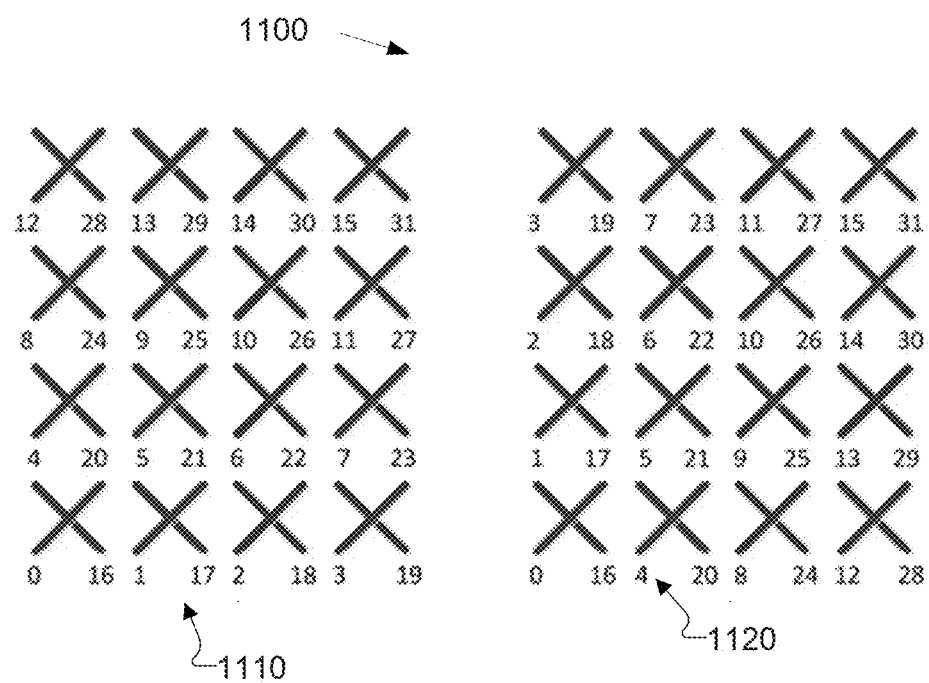
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel.12 of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In 3GPP LTE specification, MIMO precoding (for beamforming or spatial multiplexing) can be facilitated via precoding matrix index (PMI) reporting as a component of channel state information (CSI) reporting. The PMI report is derived from one of the following sets of standardized codebooks: two antenna ports (single-stage); four antenna ports (single-stage or dual-stage); eight antenna ports (dual-stage); configurable dual-stage eMIMO-Type of 'CLASS A' codebook for eight, twelve, or sixteen antenna ports (also known as 'nonPrecoded);' and single-stage eMIMO-Type of 'CLASS B' codebook for two, four, or eight antenna ports (also known as 'beamformed').

If an eNodeB follows a PMI recommendation from a UE, the eNB is expected to precode the eNB's transmitted signal according to a recommended precoding vector or matrix for a given subframe and RB. Regardless whether the eNB follows this recommendation, the UE is configured to report a PMI according to a configured precoding codebook. Here a PMI, which may consist of a single index or a pair of indices, is associated with a precoding matrix W in an associated codebook.

When dual-stage class A codebook is configured, a resulting precoding matrix can be described in equation (1). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}$ ($i_{m,n}$) denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components. The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. The precoder $W_2(i_2)$, therefore, performs a linear transformation of the long-term component such as a linear combination of a set of basic functions or vectors associated with the column vectors of $W_{1,1})(i_{1,1}) \otimes W_{1,2}(i_{1,2}))$.

$$W(i_{1,1}, i_{1,2}, i_2) = \underbrace{(W_{1,1}(i_{1,1}) \otimes W_{1,2}(i_{1,2}))}_{W_1(i_{1,1},i_{1,2})} W_2(i_2) \qquad \text{Equation (1)}$$

The above discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include a three-component PMI $\{i_{1,1}, i_{1,2}, i_2\}$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage.

In addition, when UE-specific beamforming is applied to CSI-RS resource (termed the UE-specific or UE-specifically beamformed CSI-RS); CSI-RS overhead reduction is possible. UE complexity reduction is also evident since the configured number of ports tends to be much smaller than NP CSI-RS counterpart of the UE. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMIn. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel.13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, the aforementioned precoding codebooks are utilized for CSI reporting. Two schemes of CSI reporting modes are supported (e.g., PUSCH-based aperiodic CSI (A-CSI) and PUCCH-based periodic CSI (P-CSI)). In each scheme, different modes are defined based on frequency selectivity of CQI and/or PMI, that is, whether wideband or subband reporting is performed. The supported CSI reporting modes are given in Table 1.

TABLE 1

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

CQI and PMI Feedback Types for PUCCH CSI reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

According to the [REF6], the hybrid CSI reporting based on non-precoded and beam-formed CSI-RS associated with two eMIMO-Types is supported in LTE specification.

In the following, for brevity, FDD is considered as the duplex method for both DL and UL signaling but the embodiments of the present disclosure are also directly applicable to TDD. Terms such as 'non-precoded' (or 'NP') CSI-RS and 'beamformed' (or 'BF') CSI-RS are used throughout this present disclosure. The essence of this present disclosure does not change when different terms or names are used to refer to these two CSI-RS types. The same holds for CSI-RS resource. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are exemplary and can be substituted with other labels such as '1' and '2', 'A' or 'B'. Alternatively, instead of using categories such as CSI-RS type or CSI-RS resource type, a category of CSI reporting class can also be used. For instance, NP CSI-RS is associated with eMIMO-Type of 'CLASS A' while UE-specific BF CSI-RS is associated with eMIMO-Type of 'CLASS B' with one CSI-RS resource.

Throughout this present disclosure, 2D dual-polarized array is used solely for illustrative purposes, unless stated otherwise. Extensions to 2D single-polarized array are straightforward for those skilled in the art.

FIG. 12 illustrates an example dual-polarized antenna port layouts for {2, 4, 8, 12, 16} ports 1200 according to embodiments of the present disclosure. An embodiment of the dual-polarized antenna port layouts for {2, 4, 8, 12, 16} ports 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, 2D antenna arrays are constructed from $N_1 \times N_2$ dual-polarized antenna elements arranged in a $(N_1, N_2)$ rectangular format for 2,4,8,12,16 antenna ports. In FIG. 12, each antenna element is logically mapped onto a single antenna port. In general, one antenna port may correspond to multiple antenna elements (physical antennas) combined via a virtualization. This $N_1 \times N_2$ dual polarized array can then be viewed as $2N_1N_2$-element array of elements.

The first dimension consists of $N_1$ columns and facilitates azimuth beamforming. The second dimension similarly consists of $N_2$ rows and allows elevation beamforming. MIMO precoding in LTE specification was largely designed to offer precoding (beamforming) gain for one-dimensional (1D) antenna array using 2, 4, 8 antenna ports, which correspond to $(N_1, N_2)$ belonging to $\{(1, 1), (2, 1), (4, 1)\}$. While fixed beamforming (i.e. antenna virtualization) can be implemented across the elevation dimension, it is unable to reap the potential gain offered by the spatial and frequency selective nature of the channel. Therefore, MIMO precoding in LTE specification is designed to offer precoding gain for two-dimensional (2D) antenna array using 8, 12, 16 antenna ports, which correspond to $(N_1, N_2)$ belonging to $\{(2, 2), (2, 3), (3, 2), (8, 1), (4, 2), (2, 4)\}$.

Although $(N_1, N_2)=(6, 1)$ case has not been supported in LTE specification, it may be supported in future releases. The embodiments of the present disclosure are general and are applicable to any $(N_1, N_2)$ values including $(N_1, N_2)=(6, 1)$. The first and second dimensions as shown in FIG. 12 are for illustration only. The present disclosure is applicable to the case, in which the first and second dimensions are swapped, i.e., first and second dimensions respectively correspond to elevation and azimuth or any other pair of directions.

FIG. 13 illustrates example dual-polarized antenna port layouts 1300 for (20, 24, 28, 32) ports according to embodiments of the present disclosure. An embodiment of the dual-polarized antenna port layouts 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

For 8 antenna ports {15,16,17,18,19,20,21,22}, 12 antenna ports {15,16,17,18,19,20,21,22,23,24,25,26}, 16 antenna ports {15,16,17,18,19,20,21,22,23,24,25,26,27,28,29,30}, and UE configured with higher layer parameter eMIMO-Type, and eMIMO-Type is set to 'CLASS A', each PMI value corresponds to three codebook indices given in Table 4, where the quantities $\varphi_n$, $u_m$ and $v_{l,m}$ are given by equation (2):

$$\varphi_n = e^{j\pi n/2} \qquad \text{Equation (2)}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

In equation (2), the values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively. The supported configurations of $(O_1, O_2)$ and $(N_1, N_2)$ for a given number of CSI-RS ports are given in Table 3. The number of CSI-RS ports, P, is $2N_1N_2$.

A UE is not expected to be configured with value of Codebook-Config set to 2 or 3, if the value of codebook-Config-N2 is set to 1. A UE may only use $i_{1,2}=0$ and shall not report $i_{1,2}$ if the value of codebook-Config-N2 is set to 1. A first PMI value $i_1$ corresponds to the codebook indices pair $\{i_{1,1}, i_{1,2}\}$, and a second PMI value $i_2$ corresponds to the codebook index $i_2$ given in Table 4.

In some embodiments, a codebook subsampling is supported. The sub-sampled codebook for PUCCH mode 2-1 for value of parameter Codebook-Config set to 2, 3, or 4 is defined in LTE specification for PUCCH Reporting Type 1a.

TABLE 3

Supported configurations of $(O_1, O_2)$ and $(N_1, N_2)$

| Number of CSI-RS antenna ports, P | $(N_1, N_2)$ | $(O_1, O_2)$ |
|---|---|---|
| 8 | (2, 2) | (4, 4), (8, 8) |
| 12 | (2, 3) | (8, 4), (8, 8) |
|  | (3, 2) | (8, 4), (4, 4) |

TABLE 3-continued

Supported configurations of $(O_1, O_2)$ and $(N_1, N_2)$

| Number of CSI-RS antenna ports, P | $(N_1, N_2)$ | $(O_1, O_2)$ |
|---|---|---|
| 16 | (2, 4) | (8, 4), (8, 8) |
|  | (4, 2) | (8, 4), (4, 4) |
|  | (8, 1) | (4, —), (8, —) |

TABLE 4

Codebook for 1-layer CSI reporting using antenna ports 15 to 14 + P

| Value of Codebook-Config | $i_{1,1}$ | $i_{1,2}$ | $i_2$ = 0 | 1 | 2 | 3 |
|---|---|---|---|---|---|---|
| 1 | $0, 1, \ldots, O_1 N_1 - 1$ | $0, 1, \ldots, O_2 N_2 - 1$ | $W^{(1)}_{i_{1,1},i_{1,2},0}$ | $W^{(1)}_{i_{1,1},i_{1,2},1}$ | $W^{(1)}_{i_{1,1},i_{1,2},2}$ | $W^{(1)}_{i_{1,1},i_{1,2},3}$ | where $W^{(1)}_{l,m,n} = \frac{1}{\sqrt{P}} \begin{bmatrix} v_{l,m} \\ \varphi_n v_{l,m} \end{bmatrix}$

| Value of Codebook-Config | $i_{1,1}$ | $i_{1,2}$ | $i_2$ = 0 | 1 | 2 | 3 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |

| Value of Codebook-Config | $i_{1,1}$ | $i_{1,2}$ | $i_2$ = 4 | 5 | 6 | 7 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |

| Value of Codebook-Config | $i_{1,1}$ | $i_{1,2}$ | $i_2$ = 8 | 9 | 10 | 11 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,2}$ | $W^{(1)}_{2i_{1,1},2i_{1,2}+1,3}$ |

| Value of Codebook-Config | $i_{1,1}$ | $i_{1,2}$ | $i_2$ = 12 | 13 | 14 | 15 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ | where $W^{(1)}_{l,m,n} = \frac{1}{\sqrt{P}} \begin{bmatrix} v_{l,m} \\ \varphi_n v_{l,m} \end{bmatrix}$

| Value of Codebook-Config | $i_{1,1}$ | $i_{1,2}$ | $i_2$ = 0 | 1 | 2 | 3 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ | $W^{(1)}_{2x,2y,2}$ | $W^{(1)}_{2x,2y,3}$ |

| Value of Codebook-Config | $i_{1,1}$ | $i_{1,2}$ | $i_2$ = 4 | 5 | 6 | 7 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |

TABLE 4-continued

Codebook for 1-layer CSI reporting using antenna ports 15 to 14 + P

| Value of Codebook-Config | $i_{1,1}$ | $i_{1,2}$ | $i_2$ = 8 | 9 | 10 | 11 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W_{2x+1,2y+1,0}^{(1)}$ | $W_{2x+1,2y+1,1}^{(1)}$ | $W_{2x+1,2y+1,2}^{(1)}$ | $W_{2x+1,2y+1,3}^{(1)}$ |

| Value of Codebook-Config | $i_{1,1}$ | $i_{1,2}$ | $i_2$ = 12 | 13 | 14 | 15 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W_{2x+3,2y+1,0}^{(1)}$ | $W_{2x+3,2y+1,1}^{(1)}$ | $W_{2x+3,2y+1,2}^{(1)}$ | $W_{2x+3,2y+1,3}^{(1)}$ | where $x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}, y = i_{1,1}, W_{l,m,n}^{(1)} = \frac{1}{\sqrt{P}} \begin{bmatrix} v_{m,l} \\ \varphi_n v_{m,l} \end{bmatrix}$, if $N_1 < N_2$

| Value of Codebook-Config | $i_{1,1}$ | $i_{1,2}$ | $i_2$ = 0 | 1 | 2 | 3 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| Value of Codebook-Config | $i_{1,1}$ | $i_{1,2}$ | $i_2$ = 4 | 5 | 6 | 7 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| Value of Codebook-Config | $i_{1,1}$ | $i_{1,2}$ | $i_2$ = 8 | 9 | 10 | 11 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| Value of Codebook-Config | $i_{1,1}$ | $i_{1,2}$ | $i_2$ = 12 | 13 | 14 | 15 |
|---|---|---|---|---|---|---|
| 4 | $0, 1, \ldots, \frac{N_1 O_1}{2} - 1$ | $0, 1, \ldots, \frac{N_2 O_2}{2} - 1$ | $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}, y = i_{1,1}, W_{l,m,n}^{(1)} = \frac{1}{\sqrt{P}} \begin{bmatrix} v_{m,l} \\ \varphi_n v_{m,l} \end{bmatrix}$, if $N_1 < N_2$ The mapping between Codebook-Config parameter to rank 1 beam grouping indicated by ($i_{1,1}, i_{1,2}$) is illustrated in FIG. 29. As shown, Codebook-Config=1 corresponds to one beam (black square located at (0, 0)), and Codebook-Config=2, 3, 4 correspond to 4 beams (shown as black squares) which are located inside the (4, 2) beam grid depending on the Codebook-Config value.

Note that Rel. 10 8-Tx and Rel. 12 4-Tx codebooks can be mapped to Codebook-Config=4 because the codebooks correspond to 1D antenna port layouts.

LTE supports {20, 24, 28, 32} antenna ports in Rel. 14. Assuming rectangular (1D or 2D) port layouts, there are several possible ($N_1, N_2$) values for {20, 24, 28, 32} ports. An illustration of 1D and 2D antenna port layouts for these ($N_1, N_2$) values are shown in FIG. 13.

Figure 14:
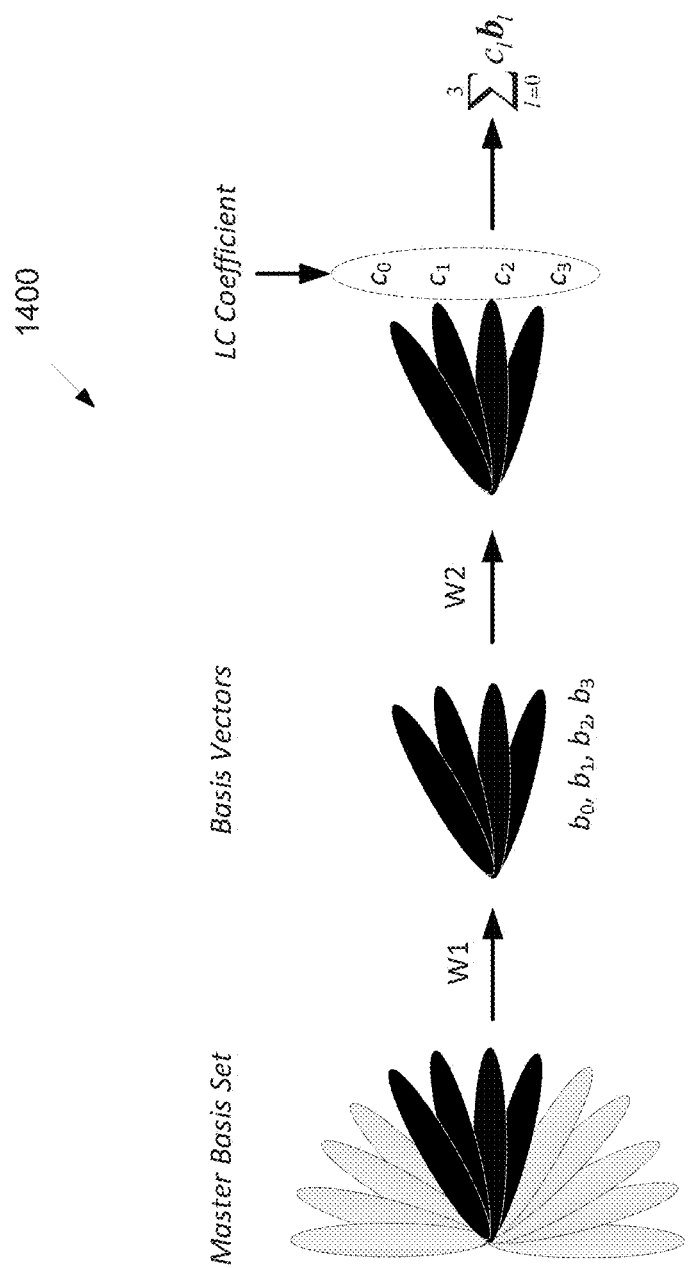
FIG. 14 illustrates example explicit channel state information (CSI) feedback framework according to embodiments of the present disclosure.

FIG. 14 illustrates example explicit channel state information (CSI) feedback framework 1400 according to embodiments of the present disclosure. An embodiment of the explicit CSI feedback framework 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In some embodiments: let $N_r$ be the number of receive antennas at the UE; let $H^{(f,r,p)}$ be the channel associated with the f-th SB, r-th receive antenna at the UE, and p-th polarization. Note that $H^{(f,r,p)}$ is a column vector of size $N_1N_2 \times 1$; Let $H^{(f,r)}$ be the channel associated with the f-th SB, r-th receive antenna at the UE, and both polarizations (+45 and −45). Note that $H^{(f,r)}$ is a column vector of size $2N_1N_2 \times 1$; Let $H^{(f,p)}$ be the channel associated with the f-th SB, all $N_r$ receive antennas at the UE, and p-th polarization. Note that H(f'I') is a matrix of size $N_1N_2 \times N_r$; Let $H^{(f)}$ be the channel associated with the f-th SB, all $N_r$ receive antennas at the UE, and both polarizations (+45 and −45). Note that 1/(f) is a matrix of size $2N_1N_2 \times N_r$.

For brevity, in the rest of present disclosure, we will use the notation $H^{(I)}$, where (I) belongs to {(f,r,p), (f,r), (f,p), (f)} to represent one of above four types of channel notations unless mentioned otherwise. In case of SB comprising of multiple subcarriers, we will use $H_k^{(I)}$ to denote the channel for subcarrier k in SB f.

In some embodiments, as shown in FIG. 14, a UE is configured with a 'Class E' or 'Class Explicit' eMIMO-Type in which DL channel $H^{(I)}$ or one of derivatives (Alt 0-Alt 4 below) is reported based on the LC framework as $\Sigma_{l=0}^{L-1} c_l b_l$ using a double codebook for explicit feedback: $W = W_1 W_2$, where: $W_1$ is for WB and long-term basis vectors $\{b_l: l=0, 1, \ldots, L-1\}$ feedback; $W_2$ is for SB and short-term LC coefficients $\{c_l: l=0, 1, \ldots, L-1\}$ feedback; and L is the size of the basis vector set.

This configuration is via RRC signaling for example. This eMIMO-Type can be associated with NP or BF CSI-RS with K≥1 resources. The alternatives for DL channel and the DL channel's derivatives and their LC representations are determined.

In one embodiment of Alt 0-0, for at least one subcarrier k in SB f, the channel is u) represented as $H_k^{(I)} \approx \Sigma_{l=0}^{L-1} c_l b_l$, where the dimension of $b_l$ is the same as $H_k^{(I)}$ depending on I.

In another embodiment of Alt 0-1, for at least one subcarrier k in SB f, the channel is represented as $H_k^{(I)} \approx \Sigma_{l=0}^{L-1} c_l b_{T,l} b_{R,l}^H$, where $b_{T,l}$ is a column vector of length $N_1N_2$ or $2N_1N_2$ depending on I and $b_{R,l}$ is a column vector of length $N_r$. Note that the l-th basis vector is decomposed into the Tx and Rx basis vector pair ($b_{T,l}$, $b_{R,l}$).

In yet another embodiment of Alt 1: Left (Tx) covariance matrix, for SB f, the left (Tx) covariance matrix of $H^{(I)}$ is represented as $$E_T = \frac{1}{|f|} \sum_{k \in f} ((H_k^{(I)})(H_k^{(I)})^H) \approx \sum_{l=0}^{L_T-1} c_{T,l} b_{T,l} b_{T,l}^H$$

where $b_{T,l}$ is defined in Alt 0-1, $c_{T,l}$ is the l-th Tx coefficient, and $L_T$ is the number of Tx basis vectors.

In yet another embodiments of Alt 2: Left and right (Tx and Rx) covariance matrices, for SB f, the left and right (Tx and Rx) covariance matrices of $H^{(I)}$ where (I) belongs to {(f,p),(f)} are represented as $E_T$ same as in Alt 1 and $$E_R = \frac{1}{|f|} \sum_{k \in f} ((H_k^{(I)})^H (H_k^{(I)})) \approx \sum_{l=0}^{L_R-1} c_{R,l} b_{R,l} b_{R,l}^H,$$

where $b_{R,l}$ is defined in Alt 0-1, $c_{R,l}$ is the l-th Rx coefficient, and $L_R$ is the number of Rx basis vectors.

In yet another embodiment of Alt 3: Left (Tx) dominant eigenvector, for SB f, the left (Tx) dominant eigenvector of $H^{(I)}$ which is derived using Eigen decomposition of Tx covariance matrix $E_T$ is represented as $e_{T,1} \approx \Sigma_{l=0}^{L_T-1} c_{T,l} b_{T,l}$.

In yet another embodiment of Alt 4: Left and right (Tx and Rx) dominant eigenvectors, for SB f, the left and right (Tx and Rx) dominant eigenvectors of $H_{(I)}$ which are derived using Eigen decomposition of Tx and Rx covariance matrix $E_T$ and $E_R$, respectively, and where (I) belongs to {(f,p),(f)}. In one example of Alt 4-0: separate, $e_{T,1}$ same as in Alt 3 and $e_{R,1} \approx \Sigma_{l=0}^{L_R-1} c_{R,l} b_{R,l}$. In another example of Alt 4-1: joint, $e_{T,1} e_{R,1}^H \approx \Sigma_{l=0}^{L-1} c_l b_{T,l} b_{R,l}^H$. In Alt 3 and 4, the most dominant eigenvectors are considered. The alternatives, however, can be extended to multiple eigenvectors.

Note that in Alt 1-Alt 3 and Alt 4-0, the master basis set ($W_1$) comprises of two separate master basis sets, one for each of Tx and Rx basis vectors $\{b_{T,l}\}_{l=0}^{L_T-1}$ and $\{b_{R,l}\}_{l=0}^{L_R-1}$. The number of Tx and Rx basis vectors can be the same (i.e., $L_T = L_R$) or the number of Tx and Rx basis vector can be different (i.e., $L_T \neq L_R$). In Alt 0 and Alt 4-1, the master basis set ($W_1$) is a joint set of L basis vectors $\{b_l\}_{l=0}^{L-1}$ or $\{(b_{T,l}, b_{R,l})\}_{l=0}^{L-1}$.

In some embodiments, the master basis sets for joint basis vector $\{b_l\}_{l=0}^{L-1}$ (Alt 0-0) and $\{(b_{T,l}, b_{R,1})\}_{l=0}^{L-1}$ (Alt 0-1 and Alt 4-1), or separate Tx and Rx basis vectors $\{b_{T,l}\}_{l=0}^{L_T-1}$ and $\{b_{R,l}\}_{l=0}^{L_R-1}$ may be the same for all alternatives Alt 0-Alt 4. In some embodiments, the master basis sets can be specific to an alternative. Similarly, in one method, the codebook for joint LC coefficients $\{c_l\}_{l=0}^{L-1}$ or separate Tx and Rx LC coefficients $\{c_{T,l}\}_{l=0}^{L_T-1}$ and $\{c_{R,l}\}_{l=0}^{L_T-1}$ may be the same for all alternatives Alt 0-Alt 4. In another method, the separate Tx and Rx LC coefficients can be specific to an alternative.

In some embodiments, the UE is also configured with one or both of I and one alternative from Alt 0-Alt 4 via RRC signaling. In some embodiments, the UE reports preferred values for them. For example, this reporting can be a part of the explicit CSI report. In some embodiments, the reporting is fixed, for example I=(f,r) and Alt 0.

In some embodiments, the bases $\{b_l\}_{l=0}^{L-1}$ to represent DL channels at multiple Rx antennas (in case of $H^{(f)}$ and $H^{(f,p)}$) are the same, and hence only one basis set is reported. In some embodiments, bases $\{b_l\}_{l=0}^{L-1}$ are different, and hence a basis set is reported for each Rx antenna. Similarly, in one embodiment, the bases $\{b_l\}_{l=0}^{L-1}$ to represent DL channels at two polarizations (in case of $H^{(f)}$ and $H^{(f,r)}$) are the same, and hence only one basis set is reported. In another embodiment, the bases $\{b_l\}_{l=0}^{L-1}$ are different, and hence a basis set is reported for each polarization.

Similarly, in one embodiment, the bases $\{b_l\}_{l=0}^{L-1}$ to represent multiple eigenvectors are the same, and hence only one basis set is reported for all reported eigenvectors. In another embodiment, the bases $\{b_l\}_{l=0}^{L-1}$ are different, and hence a basis set is reported for each reported eigenvector.

In some embodiments, in addition to channel or one of derivatives, the explicit CSI report can also include one of the following: (1) at least one CQI representing either, wherein quantized largest eigenvalue associated with the dominant Tx and Rx eigenvectors or SNR; (2) RI to indicate a preferred rank; or (3) both CQI and RI, where reported CQI may or may not correspond to reported RI. For instance, only one CQI is reported but the reported RI>1.

In some embodiments, RI is not fed back in the explicit CSI report. In such embodiments, the explicit CSI feedback may correspond to a pre-determined or fixed RI. For example: RI=1. In this example, the UE reports the dominant Tx eigenvector (associated with the largest eigenvalue)

or both Tx and Rx dominant eigenvectors as explicit CSI feedback; and RI=maximum possible rank, i.e. RI=max $(2N_1N_2, N_r)$. In this example, the UE reports either the full DL channel or all eigenvectors or covariance matrix.

In some embodiments, the RI is configured to the UE via higher-layer RRC signaling. The UE reports the explicit CSI feedback based on the configured RI.

In some embodiments, RI is fed back in the explicit CSI report. In the case of channel and covariance matrix feedback, the reported RI corresponds to a preferred rank, and in the case of eigenvector feedback, the reported RI corresponds to the number of reported dominant eigenvectors associated with largest eigenvalues.

In some embodiments, a UE is configured with Rel. 13 (or extended to future releases such as Rel. 14) Class A $W_1$ codebook as the $W_1$ codebook or master basis set for the proposed LC based 'Class A-E' or 'Class A-Explicit' eMIMO-Type. This configuration can be signaled in the same way as in Rel. 13, i.e., via RRC signaling of five parameters $N_1$, $N_2$, $O_1$, $O_2$, and Codebook-Config. An example of rank 1-2 Class A $W_1$ codebook is shown in Table 7, where the group of beams indicated by $(i_{1,1}, i_{1,2})$ is expressed as $W_{i_{1,1},i_{1,2}}$, where the quantities $u_m$ and $v_{l,m}$ are given by:

book-Config-N2, codebook-Over-Sampling-RateConfig-O1, and codebook-Over-Sampling-RateConfig-O2, respectively.

The supported configurations of $(O_1,O_2)$ and $(N_1,N_2)$ for a given number of CSI-RS ports in the Class A eMIMO-Type are given in Table 3. For 20, 24, 28, and 32 CSI-RS ports, the supported configurations of $(O_1,O_2)$ and $(N_1,N_2)$ can be added to the table. The number of CSI-RS ports, P, is $2N_1N_2$.

A UE is not expected to be configured with value of Codebook-Config set to 2 or 3, if the value of codebook-Config-N2 is set to 1. A UE may only use $i_{1,2}=0$ and shall not report $i_{1,2}$ if the value of codebook-Config-N2 is set to 1.

TABLE 6

Supported configurations of $(O_1, O_2)$ and $(N_1, N_2)$

| Number of CSI-RS antenna ports, P | $(N_1, N_2)$ | $(O_1, O_2)$ |
| --- | --- | --- |
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |
| 20 |  |  |
| 24 |  |  |
| 28 |  |  |
| 32 |  |  |

TABLE 7

$W_1$ Codebook for 1-layer and 2-layer CSI reporting using antenna ports 15 to 14 + P

| Value of Codebook-Config | $i_{1,1}$ | $i_{1,2}$ | $w_{i_{1,1},i_{1,2}}$ |
| --- | --- | --- | --- |
| 1 | $0, 1, \ldots, N_1O_1 - 1$ | $0, 1, \ldots, N_2O_2 - 1$ | $w_{i_{1,1},i_{1,2}} = \frac{1}{\sqrt{N_1N_2}} v_{i_{1,1},i_{1,2}}$ |
| 2 | $0, 1, \ldots, \frac{N_1O_1}{2} - 1$ | $0, 1, \ldots, \frac{N_2O_2}{2} - 1$ | $w_{i_{1,1},i_{1,2}} = \frac{1}{\sqrt{N_1N_2}} [\, v_{2i_{1,1},2i_{1,2}} \quad v_{2i_{1,1}+1,2i_{1,2}} \quad v_{2i_{1,1},2i_{1,2}+1} \quad v_{2i_{1,1}+1,2i_{1,2}+1} \,]$ |
| 3 | $0, 1, \ldots, \frac{N_1O_1}{2} - 1$ | $0, 1, \ldots, \frac{N_2O_2}{2} - 1$ | $w_{i_{1,1},i_{1,2}} = \frac{1}{\sqrt{N_1N_2}} [\, v_{2i_{1,1},2i_{1,2}} \quad v_{2i_{1,1}+2,2i_{1,2}} \quad v_{2i_{1,1}+1,2i_{1,2}+1} \quad v_{2i_{1,1}+3,2i_{1,2}+1} \,]$, if $N_1 \geq N_2$ |
|  |  |  | $w_{i_{1,1},i_{1,2}} = \frac{1}{\sqrt{N_1N_2}} [\, v_{2i_{1,1},2i_{1,2}} \quad v_{2i_{1,1},2i_{1,2}+2} \quad v_{2i_{1,1}+1,2i_{1,2}+1} \quad v_{2i_{1,1}+1,2i_{1,2}+3} \,]$, if $N_1 < N_2$ |
| 4 | $0, 1, \ldots, \frac{N_1O_1}{2} - 1$ | $0, 1, \ldots, \frac{N_2O_2}{2} - 1$ | $w_{i_{1,1},i_{1,2}} = \frac{1}{\sqrt{N_1N_2}} [\, v_{2i_{1,1},2i_{1,2}} \quad v_{2i_{1,1}+1,2i_{1,2}} \quad v_{2i_{1,1}+2,2i_{1,2}} \quad v_{2i_{1,1}+3,2i_{1,2}} \,]$, if $N_1 \geq N_2$ |
|  |  |  | $w_{i_{1,1},i_{1,2}} = \frac{1}{\sqrt{N_1N_2}} [\, v_{2i_{1,1},2i_{1,2}} \quad v_{2i_{1,1},2i_{1,2}+1} \quad v_{2i_{1,1},2i_{1,2}+2} \quad v_{2i_{1,1},2i_{1,2}+3} \,]$, if $N_1 < N_2$ |

$$u_m = \left[\, 1 \quad e^{j\frac{2\pi m}{O_2N_2}} \quad \ldots \quad e^{j\frac{2\pi m(N_2-1)}{O_2N_2}} \,\right]$$

$$v_{l,m} = \left[\, u_m \quad e^{j\frac{2\pi l}{O_1N_1}} u_m \quad \ldots \quad e^{j\frac{2\pi l(N_1-1)}{O_1N_1}} u_m \,\right]^T$$

where the values of $N_1$, $N_2$, $O_1$, and $O_2$ are configured with the higher-layer parameters codebook-Config-N1, code- In some embodiments, the mapping of Codebook-Config to DFT beam group remains the same as in Rel. 13 Class A codebook or Rel. 13 Class A codebook's extensions (see FIG. 29). In this case, the configured value for Codebook-Config can be restricted to 2, 3, and 4 in order to have multiple beams (L=4) for LC.

In some embodiments, 20, 24, 28, 32 CSI-RS ports, if Codebook-Config=1, then the UE is configured with implicit CSI feedback as in Rel. 13 or in Rel. 14, and if Codebook- Config=2,3,4, then the UE is configured with advanced CSI feedback such as explicit CSI feedback proposed in the present disclosure.

In some embodiments, Codebook-Config=1 case is mapped to a new beam group of L=4 beams either in 1D or 2D. For example, it can be mapped to Codebook-Config=4. Then, all possible values of Codebook-Config can be configured.

According to the configuration, the UE derives and reports the first PMI $i_1$ or $(i_{1,1}, i_{1,2})$ indicating L=4 DFT beams, $b_0, b_1, b_2, b_3$ as basis vectors. This reporting can be periodic using PUCCH CSI reporting modes. Or, the reporting can be aperiodic using PUSCH CSI reporting modes.

In some embodiment 1, if (I)=(f,r), then both polarizations (+45 and −45) are included in $H^{(I)}$. So, the UE reports a co-phase value $\phi_l$ for each basis vector $b_l$ using the coefficient codebook $C_{co-ph}$. In this case, the l-th basis vector is given by $$\begin{bmatrix} b_l \\ \phi_l b_l \end{bmatrix}.$$

Two examples for $C_{co-ph}$ are as follows: (1) $c_{co-ph}=\{1,j,-1,-j\}$. So, 2L bits are needed to indicate $\{\phi_l: l=0, 1, \ldots, L-1\}$. The indication can be WB or SB; and $C_{co-ph}=C_{co-ph,1}C_{co-ph,2}$ where $$C_{co-ph,1} = \{e^{j\frac{\pi}{4}}, e^{j\frac{3\pi}{4}}, e^{j\frac{5\pi}{4}}, e^{j\frac{7\pi}{4}}\}$$

is for WB component and $$C_{co-ph,2} = \{e^{j\frac{\pi}{4}}, e^{-j\frac{\pi}{4}}\}$$

is for SB component. So, 2L bits WB and L bits per SB indication are needed in this case.

In some embodiments 2, if (I)=(f,p), then all receive antennas at the UE are included in $H^{(I)}$. So, in addition to Tx basis vector $b_{T,l}$ indicated by the first PMI $i_1$ or $(i_{1,1}, i_{1,2})$, the UE also reports Rx basis vectors $b_{R,l}$. This indication can either be: joint as $b_l=(b_{T,l},b_{R,l})$ using the first PMI $i_1$ or $(i_{1,1},i_{1,2})$; or separate as $b_{T,l}$ and $b_{R,l}$ using the first PMI $i_1$ or $(i_{1,1},i_{1,2})$ for $b_{T,l}$ and another WB and long-term reporting for $b_{R,l}$, where reporting of Tx and Rx basis vectors can be in the same or different PMI reporting instances (or subframes).

In some embodiments, two examples of the master Rx basis set are as follows: fixed/configured: $b_{R,l}$ are fixed or eNB configures them, and hence no indication is needed; and DFT codebook based: each $b_{R,l}$ is a DFT beam (1D or 2D) from a DFT codebook with an integer oversampling factor ≥1.

Two examples of the DFT based codebook are as follows: single DFT codebook such as legacy {1, 2, 4}-Tx codebooks; and double DFT codebook such as legacy {4, 8, 12, 16}-Tx double codebooks.

In some embodiment 3, if (I)=(f), then the UE reports Tx and Rx basis vectors, $b_{T,l}$ and $b_{R,l}$, and co-phase values $\phi_l$ for all Tx basis vectors by combining the aforementioned embodiments 1 and 2.

In some embodiments, a UE is configured with an extended Class A $W_1$ codebook as the $W_1$ codebook or master basis set for the proposed LC based 'Class E' or 'Class Explicit' eMIMO-Type in which more beams are included in $W_1$ codebook. For example, the number of beams L=8 and new Codebook-Config=5, 6, . . . are used to configure these extended beam groups. A few examples of extended beam groups are shown in FIG. 30.

In some embodiments, a UE is configured with multiple Codeook-Config values or beam groups via RRC signaling, and the UE reports a preferred Codebook-Config value or beam group in the UE's explicit CSI report. The configured Codeook-Config values may or may not correspond to the same number of beams.

In some embodiments, a UE is configured with an additional Class A $W_1$ codebook parameter $(p_1, p_2)$ pairs via RRC signaling, which respectively are beam spacing parameters in 1st and 2nd dimensions. The configured Class A $W_1$ codebook is used as the $W_1$ codebook or master basis set for the proposed LC based 'Class E' or 'Class Explicit' eMIMO-Type according to some embodiments of this present disclosure. The beam spacing parameter determines the spacing between the two adjacent beams in a beam group (indicated by $i_1$ or $(i_{1,1}, i_{1,2})$ of W1 codebook). For dimension d=1,2, starting from the beam index $i_{l,d}$, indices of $L_d$ beams forming a beam group are $i_{l,d}, i_{l,d}+p_d, i_{l,d}+2p_d, \ldots, i_{l,d}+(L_d-1)p_d$. Example values of beam spacing parameters include $p_1$ in $\{1, \ldots, O_1/2, O_1\}$ and $p_2$ in $\{1, \ldots, O_2/2, O_2\}$. Note that $p_1=O_1$ implies orthogonal beams in 1st dimension.

In some embodiments, the UE is configured with orthogonal DFT beams as the basis set for the LC based explicit CSI feedback. In one example, for 1D port layouts, L $(=L_1)=N_1$ orthogonal DFT beams form the basis set. The master basis set in this case corresponds to the 1D DFT codebook of length $N_1$ and with an oversampling factor $O_1$. In another example, for 2D port layouts, L $(=L_1 \times L_2)=N_1 \times N_2$ (2D) orthogonal DFT beams form the basis set. The master basis set in this case corresponds to the 2D DFT codebook, which can be obtained by the Kronecker product of two 1D DFT codebooks of lengths $N_1$ and $N_2$ and with oversampling factors $O_1$ and $O_2$, respectively.

Figure 15:
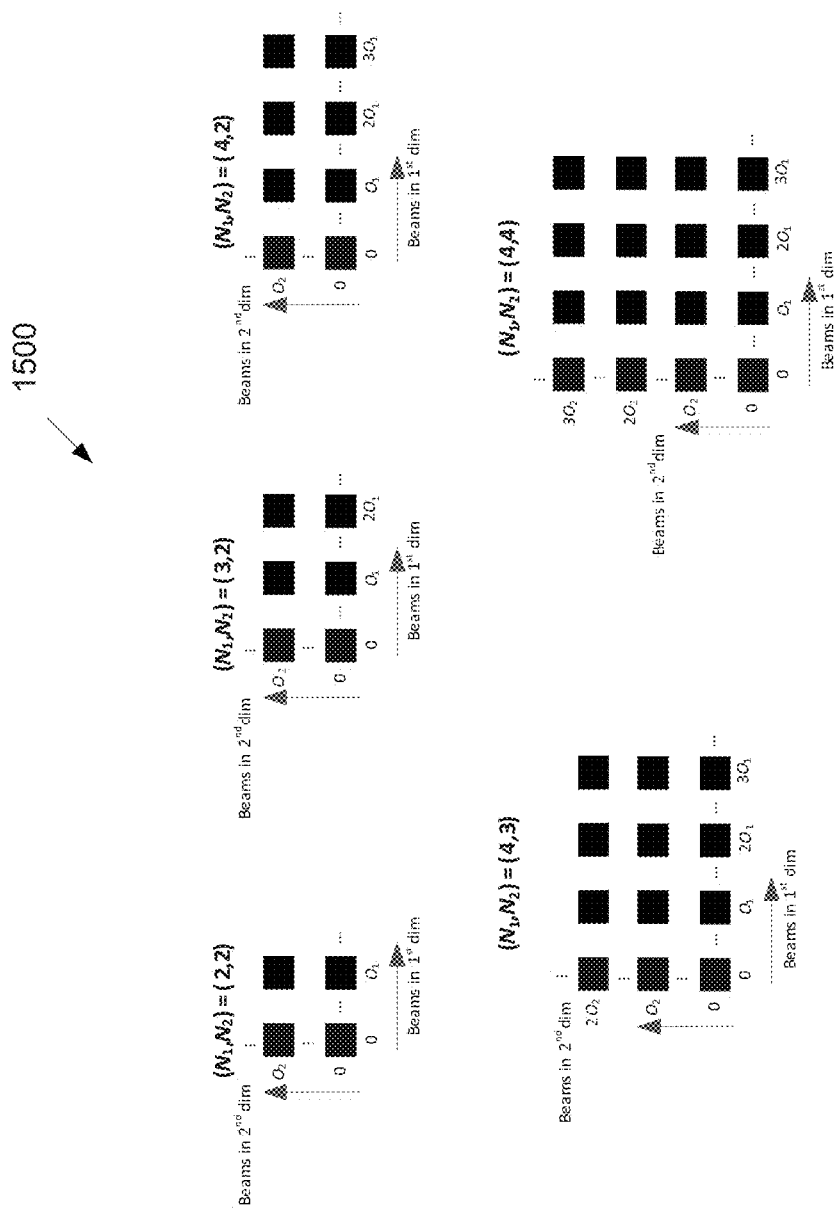
FIG. 15 illustrates example orthogonal bases according to embodiments of the present disclosure.

FIG. 15 illustrates example orthogonal bases 1500 according to embodiments of the present disclosure. An embodiment of the orthogonal bases 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with multiple beam spacing parameters via RRC signaling, and the UE reports a preferred beam spacing parameter pair in the UE's explicit CSI report.

In some embodiments, a UE is configured to report explicit or implicit CSI feedback or eMIMO-Types depending on the rank. For instance, for rank >r, the UE reports implicit CSI and for rank ≤r, the UE reports explicit CSI. An example value of r is 2.

Figure 16:
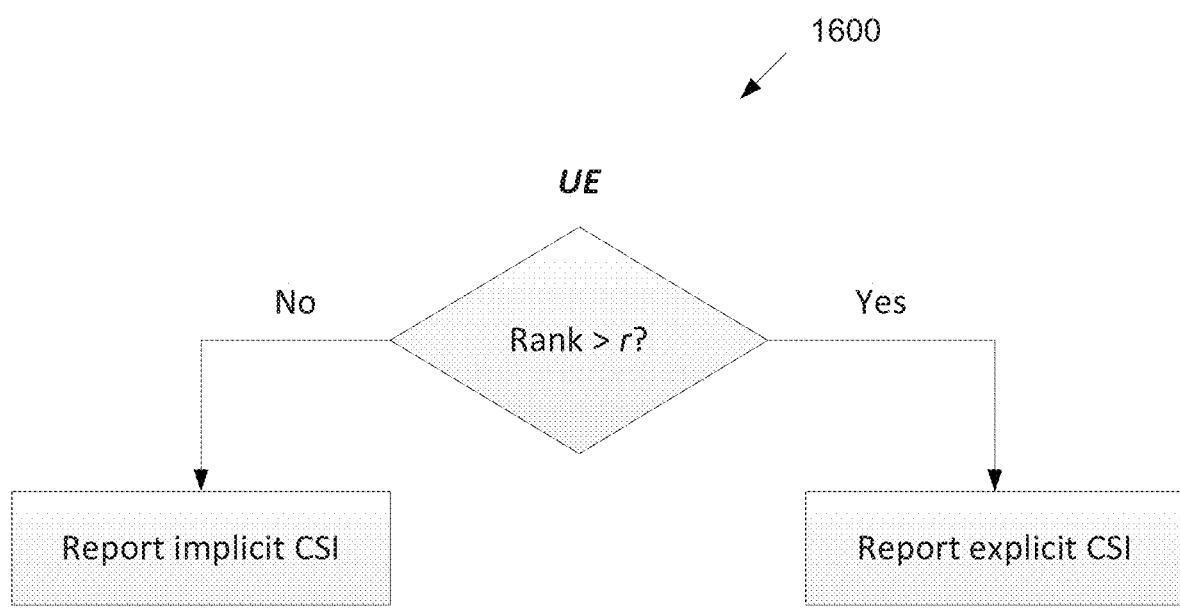
FIG. 16 illustrates an example implicit or explicit CSI based on a rank according to embodiments of the present disclosure.

FIG. 16 illustrates an example implicit or explicit CSI based on a rank 1600 according to embodiments of the present disclosure. An embodiment of the implicit or explicit CSI based on a rank 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

An illustration of CSI reporting type based on rank is shown in FIG. 16. If rank ≤r, the UE derives and reports explicit CSI using the proposed explicit CSI feedback scheme. Otherwise, the UE derives and reports implicit CSI using the legacy (up to Rel. 13) or future (Rel. 14 and beyond) implicit CSI reporting schemes or eMIMO-Types.

In some embodiments, a UE is configured with a 'Class B-E' or 'Class B-Explicit' eMIMO-Type associated with BF CSI-RS with K≥1 resources and L BF ports which are beam-formed using L basis vectors $\{b_l\}$. The UE derives and reports LC coefficients $\{c_l\}$ using the coefficient codebook ($W_2$) of 'Class A-E' or 'Class A-Explicit' eMIMO-Type codebook. This configuration is via RRC signaling.

If the UE is configured with K>1 BF CSI-RS resource and L ports, then the UE reports a CRI and corresponding LC coefficients. In such embodiments, the eNB can determine L basis vectors $\{b_l\}$ using UL SRS measurement if UL-DL duplex distance is small for FDD systems. Alternatively, eNB determines L basis vectors $\{b_l\}$ using a DL channel profile estimation based on CSI reports received in earlier CSI reporting instances.

Figure 17:
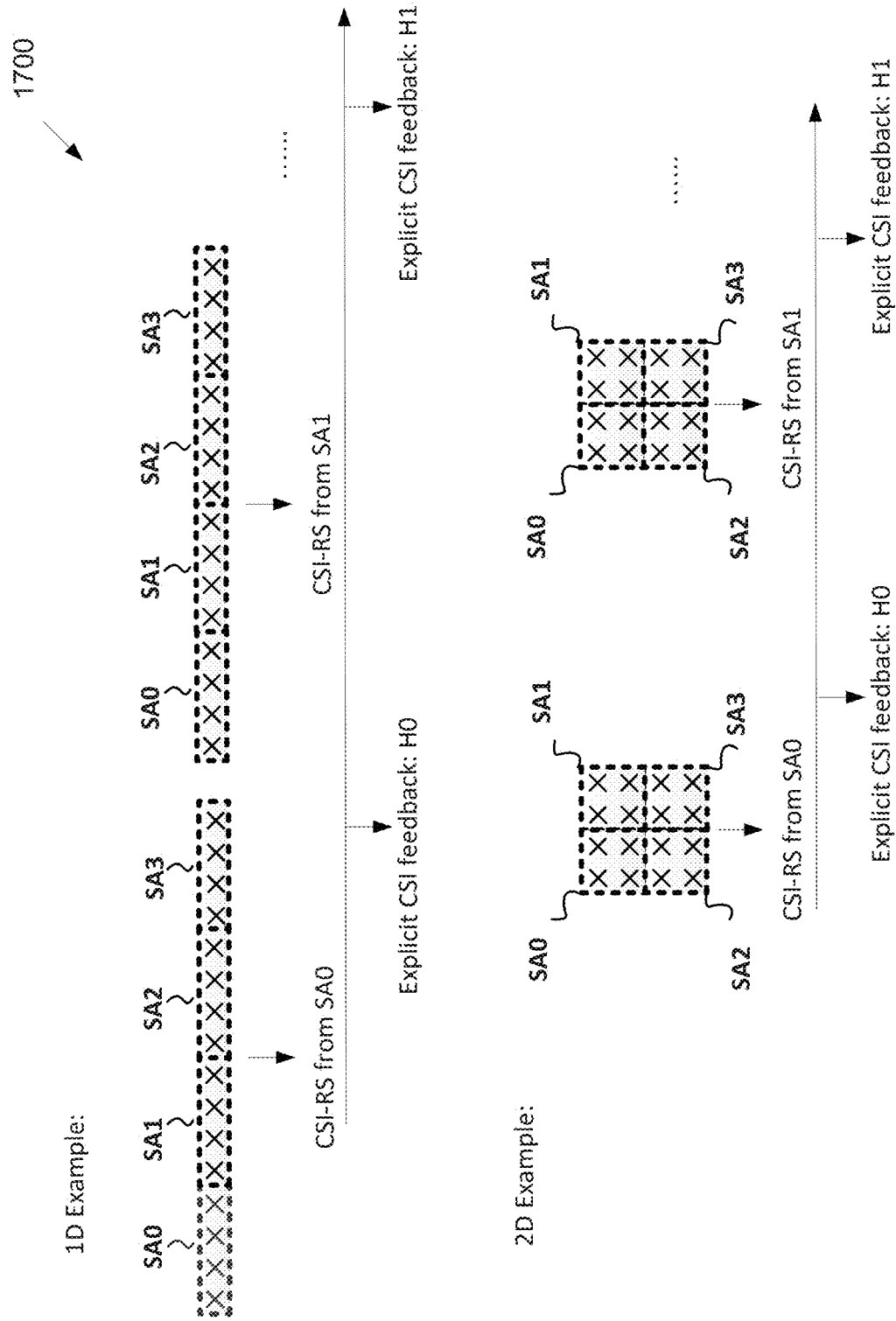
FIG. 17 illustrates an example partial port explicit feedback according to embodiments of the present disclosure.

FIG. 17 illustrates an example partial port explicit feedback 1700 according to embodiments of the present disclosure. An embodiment of the partial port explicit feedback 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with a 'Class A-E' or 'Class A-Explicit' or 'Class B-E' or 'Class B-Explicit' eMIMO-Type for partial port explicit feedback (e.g. via RRC signaling) based on the subarray or partial port based partition of the entire 1D or 2D antenna ports, an illustration of which is shown in FIG. 17. As shown the antenna ports are partition into 4 subarrays or partial ports. The construction of which is according to the following: the number of ports in the 1st dimension of each subarray or group is $M_1$, where $M_1$ divides $N_1$; the number of ports in the 2nd dimension of each subarray or group is $M_2$, where $M_2$ divides $N_2$; and a subarray is 1D for 1D antenna port layouts and is 1D or 2D for 2D antenna port layouts.

In some embodiments, the configured eMIMO-Type is associated with a single CSI process with K=Q resources, each for M (per polarization case) or 2M (both polarization case) resources. In another method, the configured eMIMO-Type is associated with Q CSI processes with K=1 resource for M (per polarization case) or 2M (both polarization case) resources.

The number of subarrays or partial ports in the dimension d=1,2 is $$Q_d = \frac{N_d}{M_d}.$$

The total number of subarrays or partial ports is $Q=Q_1Q_2$ and the total number of antenna ports in each subarray or partial port is $M=M_1M_2$. Let $H_{q,k}^{(l)}$ be the DL channel associated with the subarray or partial port index $q=(q_1,q_2)$ where $q_d \in \{0, 1, \ldots, Q_d-1\}$ for d=1, 2, and $q \in \{0, 1, \ldots, Q-1\}$, (I) belongs to $\{(f,r,p), (f,r), (f,p), (f)\}$, and k is a subcarrier in SB f. The UE derives and reports at least Q explicit CSI for Q subarrays or partial ports either independently or dependently. The eNB aggregates them to reconstruct the full explicit CSI. The details of partial port explicit CSI reporting and reconstruction for Alt 0-Alt 4 are provided below.

In some embodiments of Alt 0, channel for each of Q subarrays or partial ports $\{(q_1,q_2)_q\}_{q=0}^{Q-1}$ is reported using the same master basis set ($W_1$) and LC coefficient codebook ($W_2$) for all Q subarrays or partial ports. In one example of Alt 0-0: $H_{q,k}^{(l)} \approx \sum_{l=0}^{L-1} c_l b_l$, where the dimension of $b_l$ is the same as $H_{q,k}^{(l)}$ depending on I. In another example of Alt 0-1: $H_{q,k}^{(l)} \approx \sum_{l=0}^{L-1} c_l b_{T,l} b_{R,l}^H$, where $b_{T,l}$ is a column vector of length M or 2M depending on I and $b_{R,l}$ is a column vector of length $N_r$. The l-th basis vector is decomposed into the Tx and Rx basis vector pair $(b_{T,l}, b_{R,l})$.

To reconstruct the full channel, eNB first reconstructs channels for Q subarrays or partial ports and then stacks them together according to their indices $\{(q_1,q_2)_q\}_{q=0}^{Q-1}$. For example, for $(Q_1,Q_2)=(2,2)$, the reconstructed channel is given by:

$$H^{(l)} = \begin{bmatrix} H_{(0,0)}^{(l)} & H_{(0,1)}^{(l)} \\ H_{(1,0)}^{(l)} & H_{(1,1)}^{(l)} \end{bmatrix}.$$

In some embodiments of Alt 1, left (Tx) covariance matrix for each of Q subarrays or partial ports $\{(q_1,q_2)_q\}_{q=0}^{Q-1}$ (total Q covariance matrices) and left (Tx) cross-covariance matrices across different partial ports (total $$\frac{Q(Q-1)}{2}$$

cross-covariance matrices) are reported using the same master basis set ($W_1$) and LC coefficient codebook ($W_2$). In such embodiments, Covariance matrix is given b:

$$E_{T,q,q} = \frac{1}{|f|} \sum_{k \in f} \left( (H_{q,k}^{(l)})(H_{q,k}^{(l)})^H \right) \approx \sum_{l=0}^{L_T-1} c_{T,l} b_{T,l} b_{T,l}^H,$$

where $b_{T,l}$ is defined in Alt 0-1, $C_{T,l}$ is the l-th Tx coefficient, and $L_T$ is the number of Tx basis vectors. In such embodiments, Cross-covariance matrix is given by $$E_{T,q,q'} = \frac{1}{|f|} \sum_{k \in f} \left( (H_{q,k}^{(l)})(H_{q',k}^{(l)})^H \right) \approx \sum_{l=0}^{L_T-1} c_{T,l} b_{T,l} b_{T,l}^H,$$

for q>q'. In such embodiments, note that cross-covariance matrices for q<q' are not reported because covariance matrices are symmetric, hence cross-covariance matrices are the same for the symmetric pairs (q, q') and (q', q). Note also that cross-covariance reporting is an example of dependent CSI reporting across two partial ports.

To reconstruct the full covariance matrix, eNB first reconstructs covariance and cross-covariance matrices and then stacks them together according to their indices $\{(q_1,q_2)_q\}_{q=0}^{Q-1}$ utilizing the symmetric property of covariance matrices. For example, for $(Q_1, Q_2)=(2, 1)$, the reconstructed covariance matric is $$E_T = \begin{bmatrix} E_{T,0,0} & E_{T,1,0} \\ E_{T,1,0}^H & E_{T,1,1} \end{bmatrix}.$$

In some embodiments of Alt 2, left and right (Tx and Rx) covariance matrices of $H^{(I)}$ is determined as where (I) belongs to $\{(f,p), (f)\}$: $E_T$ same as in Alt I; and $$E_R = \frac{1}{|f|} \sum_{k \in f} ((H_k^{(I)})^H (H_k^{(I)})) \approx \sum_{l=0}^{L_R-1} c_{R,l} b_{R,l} b_{R,l}^H,$$

where $b_{R,l}$ is defined in Alt 0-1, $c_{R,l}$ is the l-th Rx coefficient, and $L_R$ is the number of Rx basis vectors.

In some embodiments of Alt 3, left (Tx) dominant eigenvector of either each partial port channel $H_q^{(I)}$ or full channel $H^{(I)}$ (obtained after stacking partial port channels) is reported. In case of the former, the eNB may or may not reconstruct the eigenvector of full channel using that of the partial port channels. Here, $e_{T,q,1}$ or $e_{T,1} \approx \sum_{l=0}^{L_T-1} c_{T,l} b_{T,l}$.

In some embodiments of Alt 4, left and right (Tx and Rx) dominant eigenvectors of either each partial port channel $H_q^{(I)}$ or full channel $H^{(I)}$ (obtained after stacking partial port channels) is reported. In case of the former, the eNB may or may not reconstruct the Tx eigenvector of full channel using that of the partial port channels. In one example of Alt 4-0: separate, $e_{T,q,1}$ or $e_{T,1}$ same as in Alt 3 and $e_{R,1} \approx \sum_{l=0}^{L_R-1} c_{R,l} b_{R,l}$. In another example of Alt 4-1: join, $e_{T,q,1} e_{R,1}^H$ or $e_{T,1} e_{R,1}^H \approx \sum_{l=0}^{L-1} c_l b_{T,l} v_{R,l}^H$.

In some embodiments, a UE is configured with one CSI process with two types of NZP CSI-RS resources or two CSI processes with two types of NZP CSI-RS resources wherein, 1st CSI-RS resource is either NP CSI-RS or BF CSI-RS with $K_1>1$ resource and 2nd CSI-RS resource is either BF CSI-RS with $K_2=1$ resource or BF CSI-RS with $K_2>1$ resources.

The two NZP CSI-RS resources are associated with two eMIMO-Types according to the configuration where supported eMIMO-Type combinations are according to Table 9 depending on whether the two NZP CSI-RS resources correspond to implicit or explicit CSI types. For each eMIMO-Type configuration, the exact CSI contents reported in the two CSI reports can also be configured. A few examples of CSI contents in the two CSI reports are shown in Table 10.

TABLE 9

Supported eMIMO-Type combinations for hybrid CSI reporting

| | CSI type for first CSI-RS resource | | CSI type for second CSI-RS resource | |
|---|---|---|---|---|
| Config. | CSI Type | eMIMO-Type | CSI Type | eMIMO-Type |
| 0 | Implicit | Class A, Class B $K_1 \geq 1$ | Implicit | Class A, Class B $K_2 \geq 1$ |
| 1 | Implicit | Class A, Class B $K_1 \geq 1$ | Explicit | Class A-E, Class B-E $K_2 \geq 1$ |
| 2 | Explicit | Class A-E, Class B-E $K_1 \geq 1$ | Implicit | Class A, Class B $K_2 \geq 1$ |
| 3 | Explicit | Class A-E, Class B-E $K_1 \geq 1$ | Explicit | Class A-E, Class B-E $K_2 \geq 1$ |

TABLE 10

Example CSI reporting contents for hybrid CSI reporting

| | CSI derived with the first CSI-RS resource | | | CSI derived with the second (BF) CSI-RS resource | | | |
|---|---|---|---|---|---|---|---|
| Configuration | CSI Type | eMIMO-Type | CSI content | CSI Type | eMIMO-Type | CSI content | Optional |
| 0-0 | Implicit | Class A | $W_1$, RI | Implicit | Class B $K_2 = 1$ | Class B | |
| 0-1 | | Class A | $W_1$ (RI = 1 is assumed) | | | $W_2$, RI, CQI | |
| 0-2 | | Class B $K_1 = 1$ | $W_1$ | | | | |
| 0-3 | | Class B $K_1 > 1$ | CRI, $W_1$ | | | | |
| 0-4 | | Class B $K_1 > 1$ | $K_1$ independent $W_1$ reports | | | | |
| 1-0 | Implicit | Class A | $W_1$, RI | Explicit | Class B-E $K_2 = 1$ | Class B-E $W_2$ | RI, CQI |
| 1-1 | | Class A | $W_1$ (RI = 1 is assumed) | | | | |
| 1-2 | | Class B $K_1 = 1$ | $W_1$ | | | | |
| 1-3 | | Class B $K_1 > 1$ | CRI, $W_1$ | | | | |
| 1-4 | | Class B $K_1 > 1$ | $K_1$ independent $W_1$ reports | | | | |

TABLE 10-continued

Example CSI reporting contents for hybrid CSI reporting

| | | CSI derived with the first CSI-RS resource | | CSI derived with the second (BF) CSI-RS resource | | | |
|---|---|---|---|---|---|---|---|
| Configuration | CSI Type | eMIMO-Type | CSI content | CSI Type | eMIMO-Type | CSI content | Optional |
| 2-0-2-4 | Explicit | | 0-0 to 0-4 with Class A and Class replaced with Class A-E and Class B-E, respectively | Implicit | | 2nd CSI report of 0-0 to 0-4 | |
| 3-0-3-4 | Explicit | | 1st CSI report of 2-0 to 2-4 | Explicit | | 2nd CSI report of 1-0 to 1-4 | |

In some embodiments, a UE is configured with either explicit CSI feedback representing a form of DL channel or implicit CSI feedback comprising of RI, PMI, and CQI via RRC signaling (1-bit RRC parameter). In one example, the explicit CSI feedback is configured using an RRC parameter ExplicitfeedbackEnabled When this parameter is ON, the proposed LC based explicit feedback is enabled regardless whether eMIMO-Type is 'Class A'/'nonPrecoded' or 'Class B'/'beamformed.' In another example, when the UE is configured with eMIMO-Type 'Class A'/'nonPrecoded', then the UE uses the Class A explicit feedback proposed in the present disclosure. In yet another example, when the UE is configured with eMIMO-Type 'Class B'/'beamformed', then the UE uses the Class B explicit feedback proposed in the present disclosure. In yet another example, when this parameter is OFF, then the UE uses Rel. 13 or Rel. 14 Class A or Class B codebooks depending on the configured eMIMO-Type.

In some embodiments, the Class A explicit feedback is configured using an RRC parameter ClassAExplicitfeedbackEnabled. When this parameter is ON and the UE is configured with eMIMO-Type 'Class A'/'nonPrecoded', then the UE uses the Class A explicit feedback proposed in the present disclosure. When this parameter is OFF and the UE is configured with eMIMO-Type 'Class A'/'nonPrecoded', then the UE uses the Rel. 13 or Rel. 14 Class A codebook for CSI calculation.

In some embodiments, the Class B LC explicit feedback is configured using an RRC parameter ClassBExplicitfeedbackEnabled. When this parameter is ON and the UE is configured with eMIMO-Type 'Class B'/'beamformed', then the UE uses the Class B explicit feedback proposed in the present disclosure. When this parameter is OFF and the UE is configured with eMIMO-Type 'Class B'/'beamformed', then the UE uses the Rel. 13 or Rel. 14 Class B codebook for CSI calculation.

An example of LC based explicit feedback configuration for hybrid CSI-RS and CSI reporting is shown in Table 11. In this hybrid scheme, there are two CSI-RS associated with two eMIMO-Types in one CSI process. For instance, the 1st CSI-RS is NP and is associated with Class A eMIMO-Type and the 2nd CSI-RS is BF and is associated with Class B, K=1 eMIMO-Type. Depending on the RRC parameter value, the Class A and Class B explicit feedback can be enabled/disabled as shown in Table 11.

The LC based explicit feedback for other hybrid CSI schemes such as 1st eMIMO-Type Class B, K≥1 and 2nd eMIMO-Type Class B, K=1 can be configured similarly.

TABLE 11

LC based explicit feedback configuration for hybrid CSI-RS

| | | Hybrid CSI Combination | |
|---|---|---|---|
| RRC parameter | Value | 1st eMIMO-Type associated with 1st (NP) CSI-RS: Class A | 2nd eMIMO-Type associated with 2nd (BF) CSI-RS: Class B, K = 1 |
| CombinationCBEnabled | ON | Class A Explicit | Class B LC Explicit |
| | OFF | Rel. 13 or Rel. 14 Class A Implicit | Rel. 13 or Rel. 14 Class B Implicit |
| ClassACombinationCBEnabled | ON | Class A LC Explicit | Rel. 13 or Rel. 14 |
| | OFF | Rel. 13 or Rel. 14 Class A Implicit | Class B Implicit |
| ClassBCombinationCBEnabled | ON | Rel. 13 or Rel. 14 Class A Implicit | Class B LC Explicit |
| | OFF | | Rel. 13 or Rel. 14 Class B Implicit |

Figure 18:
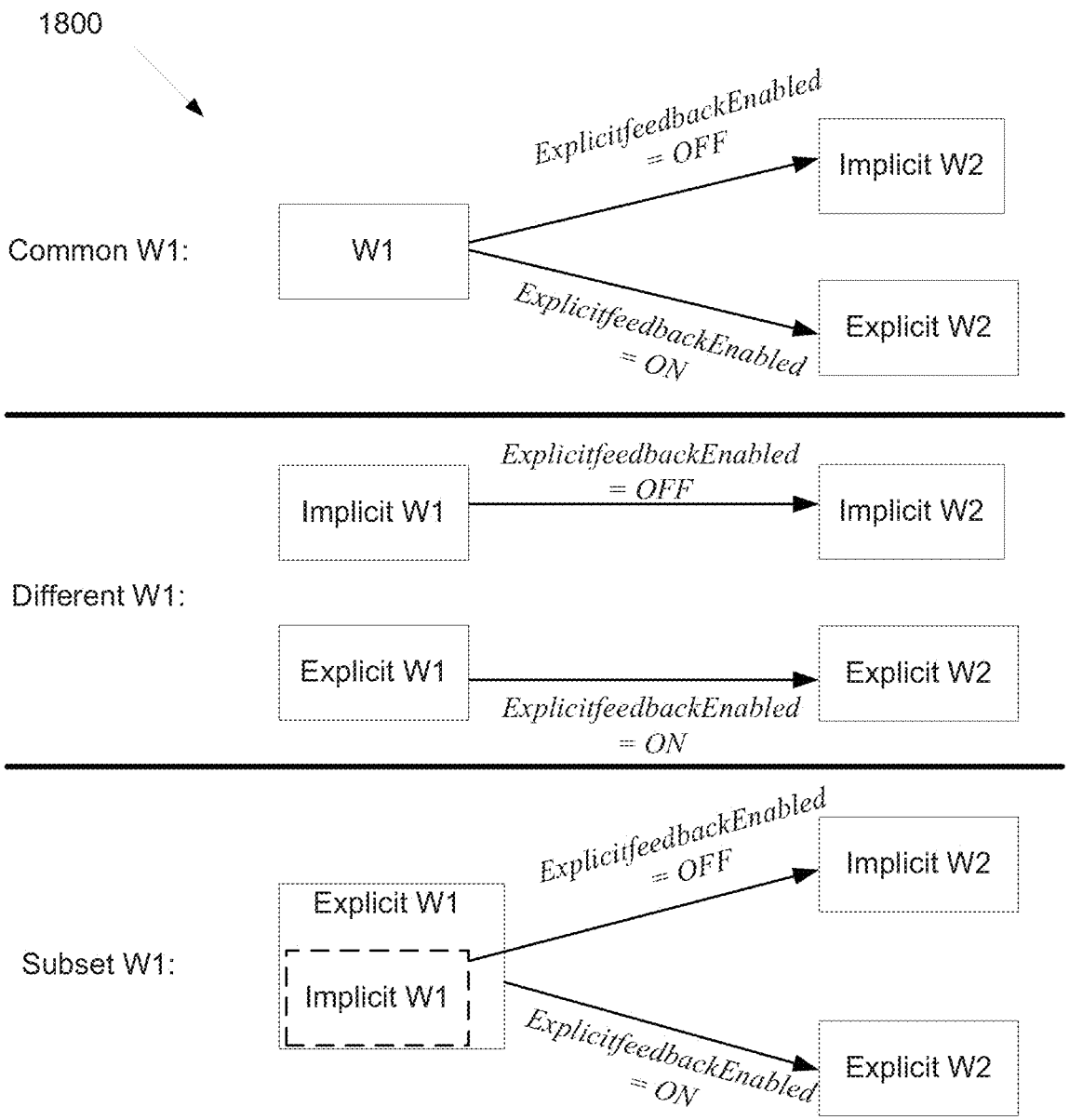
FIG. 18 illustrates example $W_1$ codebook alternatives according to embodiments of the present disclosure.

FIG. 18 illustrates example $W_1$ codebook alternatives 1800 according to embodiments of the present disclosure. An embodiment of the $W_1$ codebook alternatives 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with either implicit CSI feedback (for low spatial resolution feedback) or explicit CSI feedback (for high spatial resolution feedback) (via RRC signaling) based on a dual-stage codebook structure $W=W_1W_2$, where $W_1$ codebook for the two types of CSI feedback is according to one of the following alternatives: common $W_1$: the $W_1$ codebook is common between implicit and explicit CSI feedback; different $W_1$: the $W_1$ codebook for implicit CSI feedback is different from that for explicit CSI feedback; or subset $W_1$: the $W_1$ codebook for implicit CSI is a subset of that for explicit CSI feedback. An illustration of the three $W_1$ codebook alternatives is shown in FIG. 18, where the $W_1$ codebook is according to some embodiments of this present disclosure, for example, Rel. 13 Class A $W_1$ codebook (e.g., Table 7 or a new $W_1$ codebook proposed in the present disclosure.

The $W_2$ codebook for implicit CSI feedback is according to legacy (up to Rel. 13 or Rel. 14) codebooks. For example, the $W_2$ codebook in Rel. 13 is a Class A codebook. Alternatively, the $W_2$ codebook is a new $W_2$ codebook.

The $W_2$ codebook for explicit CSI feedback is according to some embodiments of the present disclosure. In addition, it may or may not include the $W_2$ codebook for implicit CSI feedback. For example, the $W_2$ codebook for explicit CSI feedback comprises of the $W_2$ codebook for implicit CSI feedback and a new $W_2$ codebook for explicit CSI feedback proposed in the present disclosure.

In one embodiment, the Rel. 13 Class A codebook parameter Codebook-Config is used to configure implicit or explicit CSI feedback. For example, when Codebook-Config=1, then the UE is configured with implicit feedback, and Codebook-Config=2, 3, 4, then the UE is configured with explicit feedback. This is an example of different $W_1$ codebook for types of CSI feedback.

In another embodiment, a new RRC parameter such ExplicitfeedbackEnabled (or other parameters mentioned above) is used to configure implicit or explicit CSI feedback according to the previous embodiment. In such embodiment, all three alternatives of $W_1$ codebook are possible. In one example of common $W_1$, Rel. 13 Class A $W_1$ codebook for Codebook-Config=2, 3, or 4 is used regardless of the configured CSI type (e.g., ExplicitfeedbackEnabled is turned ON or OFF). In another example of different $W_1$, Rel. 13 Class A $W_1$ codebook for Codebook-Config=2, 3, or 4 is used if implicit CSI feedback is configured (e.g., ExplicitfeedbackEnabled is turned OFF), and a new $W_1$ codebook is used if explicit CSI feedback is configured (e.g., ExplicitfeedbackEnabled is turned ON). In yet another example of subset $W_1$, Rel. 13 Class A $W_1$ codebook for Codebook-Config=2, 3, or 4 is used if implicit CSI feedback is configured (e.g., ExplicitfeedbackEnabled is turned OFF), and a new $W_1$ codebook which includes Rel. 13 Class A $W_1$ codebook is used if explicit CSI feedback is configured (e.g., ExplicitfeedbackEnabled is turned ON).

If I={(f),(f,r)}, the $W_2$ codebook has two components. In one example, Co-phase $\{\varphi_l\}_{l=0}^{L-1}$: it is reported In this case, LC beams with co-phase are given by $$\left\{\begin{bmatrix} b_l \\ \varphi_l b_l \end{bmatrix}; l = 0, 1, \ldots, L-1\right\},$$

the co-phase $\varphi_l$ belongs to $\{1,j,-1,-j\}$, for example. In such example, there are two alternatives for the co-phase: common: same co-phase for L beams; and Different: different co-phase for L beams. In another example, Coefficients $\{c_l\}_{l=0}^{L-1}$, the un-quantized LC coefficients can be obtained as the least-square solution to minimize the squared error. For example, for eigenvector feedback, the un-quantized coefficients are $$\{c_l\}_{l=0}^{L-1} = \arg\min_{\{c_l\}_{l=0}^{L-1}} \left\| e - \sum_{l=0}^{L-1} c_l \begin{bmatrix} b_l \\ \varphi_l b_l \end{bmatrix} \right\|^2.$$

The resultant solution is obtained by pre-multiplying the dominant eigenvector e with the pseudo-inverse of the basis vector set, i.e., $\{c_l\}_{l=0}^{L-1}=(B^*B)^{-1}B^*e$, where $$B = \begin{bmatrix} b_0 & b_1 & \cdots & b_{L-1} \\ \varphi_0 b_0 & \varphi_1 b_1 & \cdots & \varphi_{L-1} b_{L-1} \end{bmatrix}$$

is basis matrix in which columns are basis vectors.

In some embodiments, the $W_2$ codebook has one component for the coefficient. The un-quantized coefficient in this method can be obtained as $\{c_l\}_{l=0}^{L-1}=(B^*B)^{-1}B^*e$, where $$B = \begin{bmatrix} b_0 & b_1 & \cdots & b_{L-1} & 0 \\ 0 & b_0 & b_1 & \cdots & b_{L-1} \end{bmatrix}.$$

If I={(f,p), (f,r,p)}, then the $W_2$ codebook is for the coefficient. The un-quantized coefficient is obtained as $\{c_l\}_{l=0}^{L-1}=(B^*B)^{-1}B^*e$, where $B=[b_0\ b_1\ \ldots\ b_{L-1}]$.

In some embodiments, a UE is configured with a single (complex) coefficient codebook $W_2$ which quantizes the complex coefficients $\{c_l: l=0, 1, \ldots, L-1\}$ and reports the quantized coefficients per SB.

In some embodiments, a UE is configured with a coefficient codebook $W_2$ which can be decomposed into a double codebook: magnitude $W_{2,mag}$ is for the magnitude of coefficients, i.e., $\{|c_l|: l=0, 1, \ldots, L-1\}$; and phase $W_{2,ph}$ is for the phase of coefficients, i.e., $\{\alpha_l: l=0, 1, \ldots, L-1\}$ where $c_l=|c_l|e^{i\alpha_l}$ is the magnitude and phase representation of l-th coefficient. The UE is further configured to report the magnitudes and phases of the coefficients according to one of the following sub-embodiments.

In some embodiment, the UE is configured to report magnitudes and phases of coefficients separately where the magnitude reporting is WB, i.e., the UE reports only one magnitude vector for all SBs comprising the WB and the phase reporting is per SB, i.e., the UE reports a phase vector for each SB.

In one example, magnitude codebook is Constant modulus, for example $|c_l|=1/\sqrt{L}$ wherein no WB indication is needed in this case. In another example, magnitude codebook is B-bit uniform codebook over [0, U], where U is a finite positive number. In one example value of B is 4.

An example of phase codebook is C-PSK codebook. One example value of C is 4 (QPSK codebook) which corresponds to 2-bit quantization. Another example value of C is 8 (8-PSK codebook) which corresponds to 3-bit quantization. Another example of phase codebook is an oversampled DFT codebook of length L and appropriate oversampling factor O (e.g. 8, 16).

In some embodiments, the UE is configured to report magnitudes and phases of coefficients separately where the magnitude reporting is differential in two stages. In one example, stage 0: WB magnitude is reported, i.e., $|c_l|$ is quantized as $d_{l,WB}$ using a 4-bit uniform codebook, for example; and (2) stage 1: Per SB magnitude is reported, i.e., $|c_l|-d_{l,WB}$ is quantized using a 2-bit uniform codebook, for example. In another example, the phase reporting is per SB as in Sub-embodiment 1.

In some embodiments, the Stage 0 for magnitude reporting corresponds to one WB magnitude for all L coefficients, i.e., one $d_{l,WB}$ is reported for all l=0, 1, . . . , L-1. In one embodiment, the Stage 0 corresponds to separate WB magnitude for each of L coefficients.

In some embodiments, the UE is configured to report a WB norm value, denoted as K, for the coefficients, an example of which is the Euclidean norm $K=\sqrt{\|\Sigma_{l=0}^{L-1}|c_l|^2\|}$. In one example, the norm is quantized using a $N_K$-bit uniform codebook over [0,U], where U is a finite positive number. An example value for $N_K$ is 16.

The UE is also configured to report the normalized coefficients $$\left\{\frac{c_l}{K}: l=0, 1, \ldots, L-1\right\}.$$

Note that the normalized coefficient vector lies on a complex unit-sphere in an L-dimensional complex Euclidean space. The magnitudes and phases of the normalized coefficients can be reported according to the above-mentioned embodiments or sub-embodiments. In particular, the magnitudes of normalized coefficients can be reported WB or per SB using a B-bit uniform codebook over (0, 1), where an example value for B is 2, and the phases of normalized coefficients can be reported per SB using either QPSK or 8-PSK codebooks.

In some embodiments, the UE is configured to report: magnitudes of the coefficients according to some embodiments or sub-embodiments of this present disclosure, and phases of the coefficients using a two stage phase codebook $C_{co-ph}=C_{co-ph,1}C_{co-ph,2}$, where $C_{co-ph,1}$ is for WB phase reporting and $C_{co-ph,2}$ is for SB phase reporting. An example of such as codebook is $$C_{co-ph,1}=\left\{e^{\frac{j\pi}{4}}\ e^{\frac{j3\pi}{4}}\ e^{\frac{j5\pi}{4}}\ e^{\frac{j7\pi}{4}}\right\} \text{ and } C_{co-ph,2}=\left\{e^{\frac{j\pi}{4}}\ e^{-\frac{j\pi}{4}}\right\}.$$

In some embodiments, a UE first performs a dimension reduction of LC coefficients across SBs and across different coefficients, and then quantizes the reduced dimensional coefficients using the $W_2$ codebook according to some embodiments of the present disclosure.

In one example of dimension reduction, the coefficient matrix for S SBs and L coefficients is expressed as:

$$C=\begin{bmatrix} c_{0,0} & c_{0,1} & \ldots & c_{0,L-1} \\ c_{1,0} & c_{1,1} & \ldots & c_{1,L-1} \\ \vdots & \vdots & \ddots & \vdots \\ c_{S-1,0} & c_{S-1,1} & \ldots & c_{S-1,L-1} \end{bmatrix}$$

where row s corresponds L coefficients for SB s and column l corresponds to S SBs for coefficient l. The singular value decomposition of C is performed $C=U\Sigma V^H=\Sigma_{i=0}^{D-1}\sigma_i u_i v_i^H$, where $U=[u_0\ u_1\ \ldots\ u_{S-1}]$ is the left eigenvector matrix (columns are length-S eigenvectors); $V=[v_0\ v_1\ \ldots\ v_{L-1}]$ is the right eigenvector matrix (columns are length-L eigenvectors); $\Sigma=\text{diag}([\sigma_0\ \sigma_1\ \ldots\ \sigma_{D-1}])$ is a diagonal matrix of singular values sorted as $\sigma_0 \geq \sigma_1 \geq \ldots \geq \sigma_{D-1}$, and D=min(S, L).

Then, d where $1 \leq d < D$ 'dominant' singular values $\sigma_0, \ldots \sigma_d$ are selected and corresponding left and right eigenvector matrices can be constructed as: $U_d=[u_0\ u_1\ \ldots\ u_d]$; $V_d=[v_0\ v_1\ \ldots\ v_d]$; and $\Sigma_d=\text{diag}([\sigma_0\ \sigma_1\ \ldots\ \sigma_d])$.

The reduced dimensional coefficient matrix is then given by $C \cong C_d=U_d\Sigma_d V_d^H=\Sigma_{i=0}^d \sigma_i u_i v_i^H$.

To obtain reduced dimensional coefficients, the UE transforms the coefficient matrix C as $R_d=CV_d$. The UE then quantizes $R_d$ and $V_d$ using the $W_2$ codebook and sends the quantized matrices to the eNB, which reconstructs the coefficient matrix as $C=R_d V_d^H$.

In some embodiments, the d value is configured to the UE. In some embodiments, the UE reports a value. In some embodiments, the d value is fixed, for example to 1.

In some embodiments, a UE performs other forms of dimension reduction transformations on coefficient matrix C and reports the transformed coefficients using the $W_2$ codebook according to some embodiments of this present disclosure. A few examples of other transformation include 1D or 2D Discrete Cosine Transform (DCT), 1D or 2D discrete Fourier transform (DFT), and Karhunen-Loéve Transform (KLT).

In some embodiments, the dimension reduction is applied by constructing higher dimensional coefficient matrix C by including more dimensions such as (e.g., SB, coefficient, time). In some embodiments, the dimension reduction is applied only across SBs or only across coefficients.

In some embodiments, a UE is configured with at least one L value for Class A-E or B-E explicit codebook, and one ($L_1$, $L_2$) pair for hybrid explicit codebook via higher-layer RRC signaling, where the set of configurable L or ($L_1$ or/and $L_2$) values includes 2, 4, and 8.

In some embodiments, the L or ($L_1$ or/and $L_2$) beams or basis vectors associated with the configured L or ($L_1$ or/and $L_2$) value are pre-determined and fixed.

In some embodiments, the UE is configured with Codebook-Config (similar to Rel. 13 Class A codebook parameter), where the set of configurable Codebook-Config values include 1, 2, 3, and 4. For example, an illustration of mapping Codebook-Config to L or ($L_1$ or/and $L_2$) beams or basis vectors is shown in FIGS. 29 and 30.

In some embodiments, a UE is configured with multiple L values via RRC signaling which may be a subset of {2, 4, 8}. The UE reports a preferred L value from the configured set, where this report may either be: WB in which the number of beams or basis vectors remains the same in all SBs or SB in which the number of beams or basis vectors may change in different SBs.

In some embodiments, a UE is configured with either: implicit CSI codebook: such as up to Rel.13 codebooks, and Rel. 14 codebooks or the proposed explicit CSI codebook using a 1-bit RRC signaling.

Figure 19:
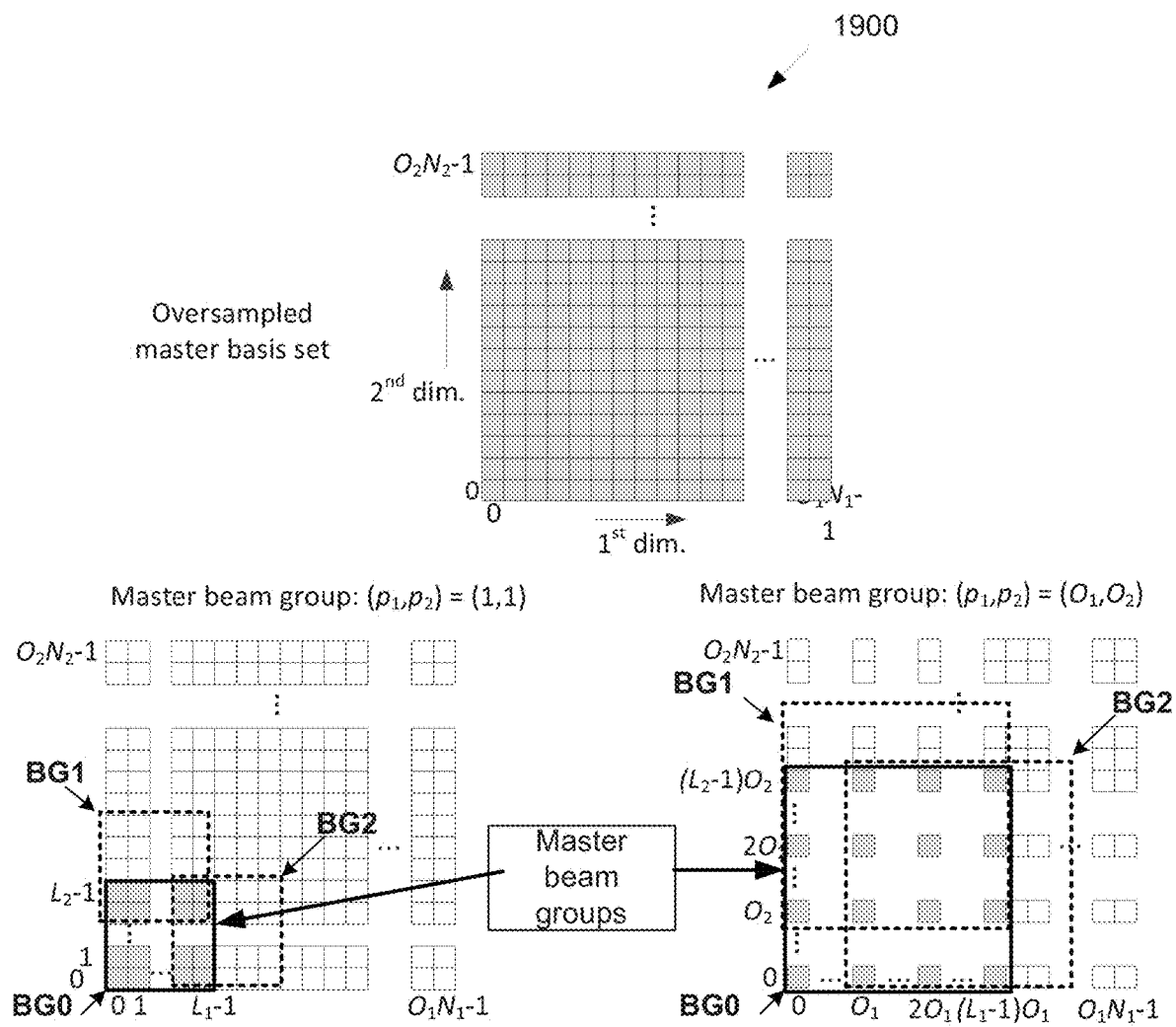
FIG. 19 illustrates example master beam groups according to embodiments of the present disclosure.

FIG. 19 illustrates example master beam groups 1900 according to embodiments of the present disclosure. An embodiment of the master beam groups 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with an oversampled DFT codebook as the master basis set comprising of $O_1 N_1 \times O_2 N_2$ DFT beams and ($L_1$, $L_2$) parameters representing the number of beams in the two dimensions of the master beam group.

The UE is further configured with multiple types of master beam groups based on the spacing ($p_1$, $p_2$) between two adjacent beams in two dimensions of the master beam group. The UE reports one of multiple types of master beam groups in the UE's CSI report where this reporting can be explicit as a new WB CSI feedback component or it is implicit with either $i_1$ or $(i_{1,1}, i_{1,2})$. An illustration of two types of master beam groups is shown in FIG. 18, where each small square represents a 2D DFT beam. When $(p_1, p_2)=(1, 1)$, the master beam group corresponds to $L_1L_2$ closely spaced beams, and when $(p_1, p_2)=(O_1, O_2)$, the master beam group corresponds to $L_1L_2$ orthogonal beams. Three examples of master beam groups for each type are also shown as BG0, BG1, and BG2.

Alternatively, eNB configures one of multiple types of master beam groups via RRC signaling. For example, eNB configures one of the two master beam groups shown in FIG. 18 via 1-bit RRC parameter MasteBeamGroupType.

In some embodiments, the explicit CSI report comprises a master beam group of configured or reported type is reported as the 1st PMI $i_1$ or $(i_{1,1}, i_{1,2})$. This reporting is WB. The range of values of $i_{1,1}$ and $i_{1,2}$ is given by $i_{1,1}=0, 1, 2, \ldots O_1N_1/s_1$ and $i_{i,2}=0, 1, 2, \ldots O_2N_2/s_2$, where $(s_1, s_2)$ are spacing between two adjacent master beam groups in two dimensions. The example values of $s_1$ (or $s_2$) are 1, 2, $O_1/4$ (or $O_2/4$), $O_1/2$ (or $O_2/2$), and $O_1$ (or $O_2$). So, the number of bits to report is $$\log_2\left\lceil\frac{O_1N_1}{s_1}\right\rceil \text{ and } \log_2\left\lceil\frac{O_2N_2}{s_2}\right\rceil.$$

Figure 20:
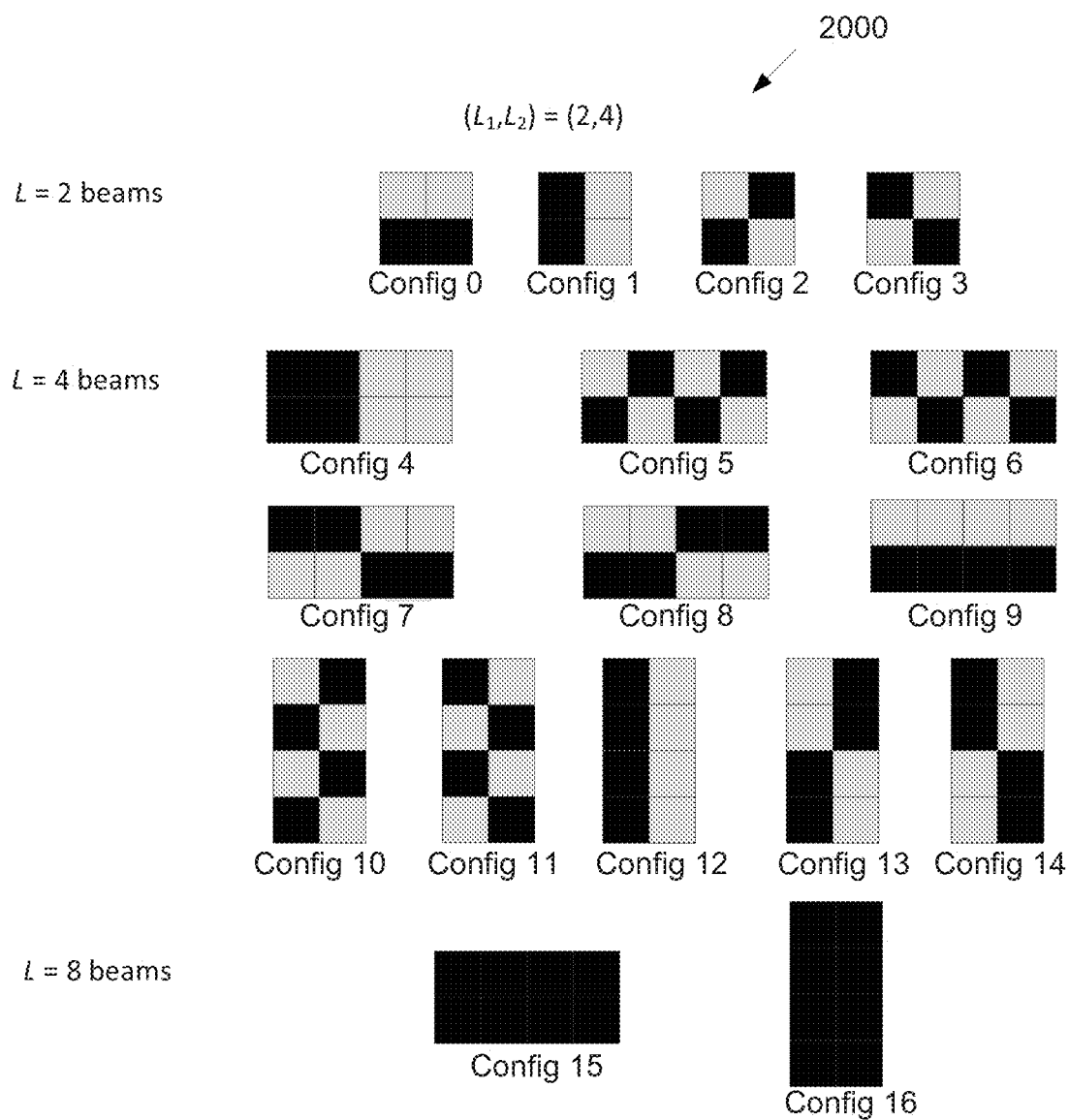
FIG. 20 illustrates an example beam selection according to embodiments of the present disclosure.

In some embodiments, the explicit CSI report, for each SB in which the UE is configured to report explicit CSI, comprises a beam selection: L out $L_1L_2$ beams are selected from the reported master beam group. Examples of L values are 2, 4, and 8. The L value can be reported in the CSI report or it is configured via higher layer RRC signaling. In the case of the former, the reported L value is either WB or SB. In one example, the selection is parameterized: the selection of L beams is based on Config parameter. Examples of a few beam selections are shown in FIG. 20. In such example, the UE reports a preferred Config value in per SB CSI report where the set of possible Config values is fixed, for example Config 0-16 in FIG. 20. In such example, the UE reports a WB L value and a Config value per SB corresponding to the reported L. For example, the UE reports L=2 in the WB CSI report (2-bit WB reporting of an L value) and reports one of Config 0-Config 3 in per SB CSI report (2-bit SB reporting on Config). Alternatively, an L value is configured via RRC signaling and the UE reports a Config value corresponding to the reported L. In such example, the set of Config values for per SB beam selection is configured via RRC signaling. For example, a length 17 bitmap is used to configure the set of Config values (e.g., FIG. 20).

In another example, the selection is unconstrained: The selected L beams is unconstrained and any L out of $L_1L_2$ beams can be reported. In this case, the reporting can be based on a bitmap of length $L_1L_2$.

In some embodiments, the explicit CSI report, for each SB in which the UE is configured to report explicit CSI, comprises Co-phase: K-PSK (e.g. QPSK) co-phase for two polarizations can also be reported.

In some embodiments, the explicit CSI report, for each SB in which the UE is configured to report explicit CSI, comprises coefficients: Coefficients to linearly combine L selected beams are reported.

FIG. 20 illustrates an example beam selection 2000 according to embodiments of the present disclosure. An embodiment of the beam selection 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with a DFT codebook without oversampling (e.g. oversampling factor=1). As in the previous embodiment, the UE reports a master beam group comprises of $L_1L_2$ beams (WB) and for each SB, reports L out of $L_1L_2$ reported beams. In addition, the UE also reports the rotation matrix (M) for either each of L beams (L rotation matrices) or the whole beam group (one rotation matrix), where the rotation can be WB or SB, and it can be only in one dimension or in both dimensions. An example of rotation matrix is a diagonal matrix whose diagonal entries form a DFT vector.

In some embodiments, a UE is configured with an explicit CSI reporting in which the proposed LC framework for explicit CSI reporting is extended to include frequency dimension in addition to the 1st and 2nd port dimensions. An illustration of the master grid of beams in 3D (1st port dim., 2nd port dim., freq. dim.) is shown in FIG. 20 in which: 1st dimension is associated with the 1st port dimension; 2nd dimension is associated with the 2nd port dimension; and 3rd dimension is associated with the frequency dimension.

The master basis set for spatial (port) domain representation, (i.e., 1st and 2nd dimensions) is according to some embodiments of this present disclosure. In particular, it is according to the aforementioned embodiments of Alt 0-Alt 4 for DL channel or derivatives explained earlier in the present disclosure. The master basis set for frequency domain representation (i.e., 3rd dimension) is an oversampled DFT codebook of length-$N_3$ and with oversampling factor $O_3$. Some example values for the oversampling factors $O_3$ include {2, 4, 8}. The length $N_3$ depends on the type of frequency domain representation. Some examples of which are shown FIG. 20.

Figure 21:
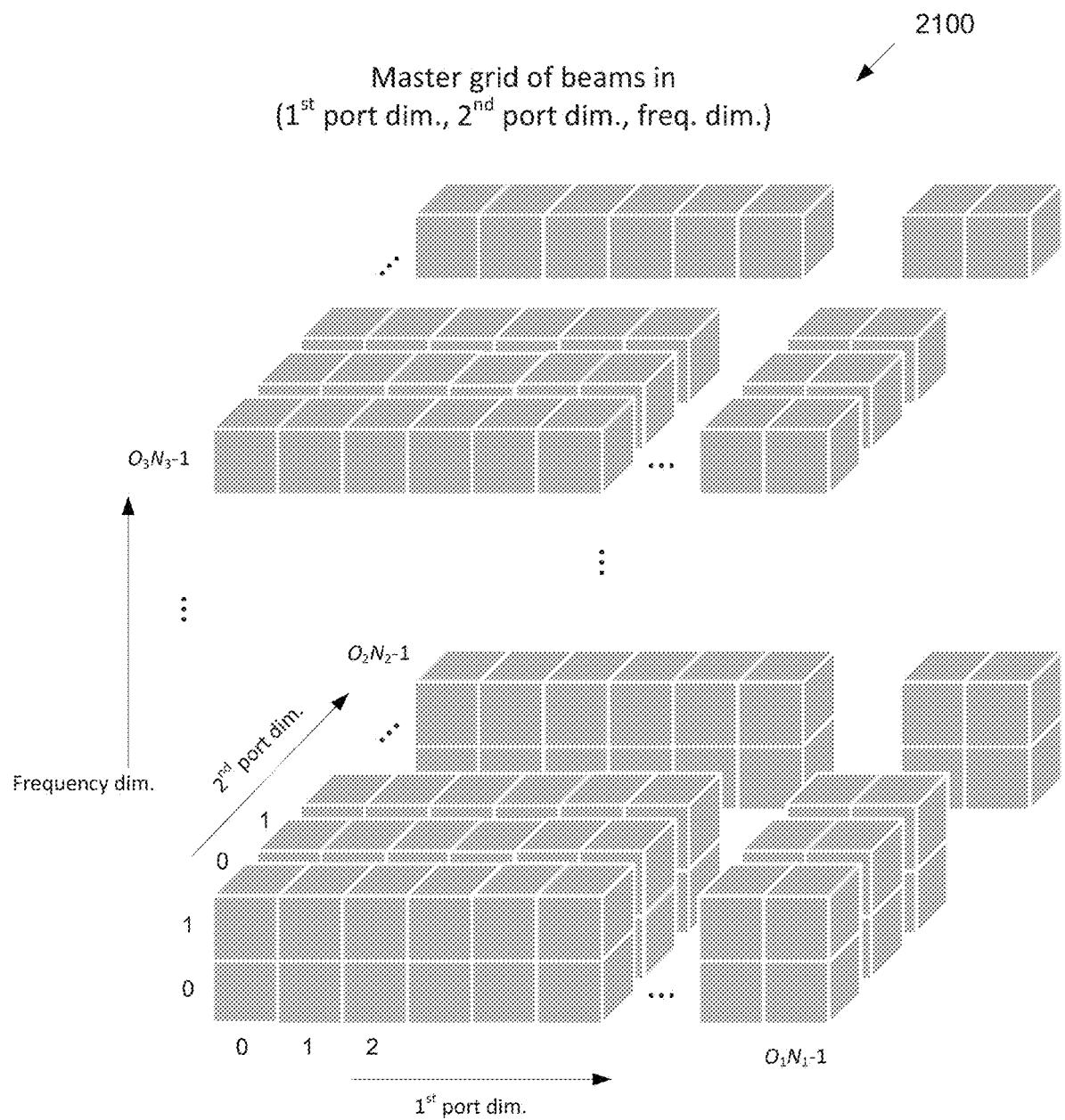
FIG. 21 illustrates an example frequency domain representation alternatives according to embodiments of the present disclosure.

FIG. 21 illustrates example frequency domain representation alternatives 2100 according to embodiments of the present disclosure. An embodiment of the frequency domain representation alternatives 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

TABLE 12

Frequency domain representation alternatives

| Frequency domain representation type | $N_3$ Channel | Eigenvector or covariance matrix |
|---|---|---|
| PRB | 1 | 1 |
|  | number of subcarriers in each PRB | 1 |
| SB | number of PRBs in each SB | 1 |
|  | number of subcarriers in each PRB × number of PRBs in each SB | number of PRBs in each SB |
| WB | number of PRBs in each SB × number | number of SBs in whole BW |

TABLE 12-continued

Frequency domain representation alternatives

| Frequency domain representation type | Channel | Eigenvector or covariance matrix |
|---|---|---|
| | $N_3$ | |
| | of SBs in whole BW number of subcarriers in each PRB × number of PRBs in each SB × number of SBs in whole BW | number of PRBs in each SB × number of SBs in whole BW |
| Best P PRBs | P | P |
| | number of subcarriers in each PRB × P | P |

In some embodiments, a UE is configured with a 'Class E' or 'Class Explicit' eMIMO-Type in which DL channel or one of derivatives is reported based on the extended LC framework as $\Sigma_{m=0}^{M-1}\Sigma_{l=0}^{L-1}c_{m,l}(a_m b_l^H)$ or $\Sigma_{m=0}^{M-1}\Sigma_{l=0}^{L-1}c_{m,l}(a_m \otimes b_l^H)$ using a double codebook for explicit feedback: $W=W_1 W_2$, where $W_1$ is for WB and long-term feedback of two basis vector sets: $\{a_m: m=0, 1, \ldots, M-1\}$ for frequency domain (across SBs) representation; and $\{b_l: l=0, 1, \ldots, L-1\}$ for spatial domain (across number of Tx (and Rx antennas)) representation, $W_2$ is for SB and short-term LC coefficients $\{c_{m,l}: m=0, 1, \ldots, M-1 \text{ and } l=0, 1, \ldots, L-1\}$ feedback, and M and L, respectively are the size of the two basis vector sets in frequency and spatial domains. An illustration of a few example $W_1$ bases according to this embodiment is shown in FIG. 21.

Figure 22:
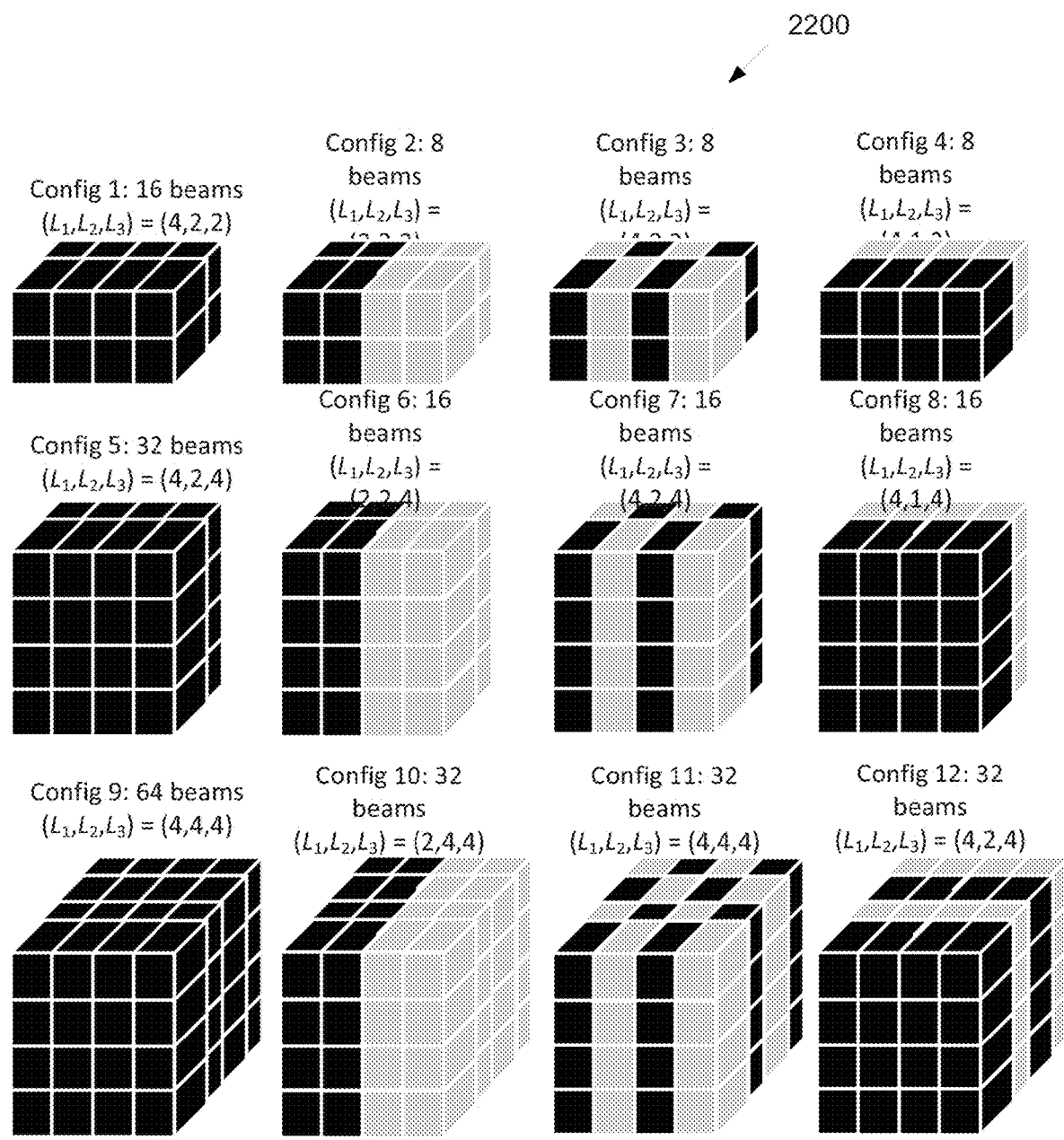
FIG. 22 illustrates an example $W_1$ beams or basis according to embodiments of the present disclosure.

FIG. 22 illustrates an example $W_1$ beams or basis 2200 according to embodiments of the present disclosure. An embodiment of the $W_1$ beams or basis 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In some embodiments, $\{a_m: m=0, 1, \ldots, M-1\}$ is reported jointly with $\{b_l: l=0, 1, \ldots, L-1\}$ in the 1st PMI $i_1$ or in the first component of the 1st PMI $i_{1,1}$, or in the second component of the 1st PMI $i_{1,2}$.

In some embodiments, $\{a_m: m=0, 1, \ldots, M-1\}$ and $\{b_l: l=0, 1, \ldots, L-1\}$ are reported separately. In particular, $\{b_l: l=0, 1, \ldots, L-1\}$ is reported as the 1st PMI $i_1$ or ($i_{1,1}$, $i_{1,2}$), and $\{a_m: m=0, 1, \ldots, M-1\}$ is reported as another 1st PMI $i_1^{(0)}$. In this method, the $W_1$ codebook can be represented as $W_1 = W_1^{(0)} W_1^{(1)}$ where $W_1^{(0)}$ is used for $i_1^{(0)}$ reporting and $W_1^{(1)}$ is used for $i_1$ or $i_{1,1}, i_{1,2}$) reporting.

In some embodiments, $\{c_{m,l}: m=0, 1, \ldots, M-1 \text{ and } l=0, 1, \ldots, L-1\}$ is reported jointly as the second PMI $i_2$ using a single codebook according to some embodiments of this present disclosure.

In some embodiments, $\{c_{m,l}: m=0, 1, \ldots, M-1 \text{ and } l=0, 1, \ldots, L-1\}$ can be decomposed as $c_{m,l} = c_m \times c_l$, and $\{c_m: m=0, 1, \ldots, M-1\}$ and $\{c_l: l=0, 1, \ldots, L-1\}$ are reported using two separate codebooks, where the two codebooks may or may not be the same. The reporting of two sets of coefficients can be joint as the second PMI $i_2$. Alternatively, the reporting of two sets of coefficients can be separate as the second PMI $i_2$ for $\{c_l: l=0, 1, \ldots, L-1\}$ and as another second PMI $i_2^{(0)}$ for $\{c_m: m=0, 1, \ldots, M-1\}$. In this later alternative, the $W_2$ codebook can be represented as $W_2 = W_2^{(0)} W_2^{(1)}$, where $W_2^{(0)}$ is used for $i_2^{(0)}$ reporting and $W_2^{(1)}$ is used for $i_2$ reporting.

In some embodiments, a UE is configured with a 'Class E' or 'Class Explicit' eMIMO-Type in which DL channel or one of derivatives is reported based on the extended LC framework as $\Sigma_{l=0}^{L-1} c_l(a_l b_l^H)$ or $\Sigma_{l=0}^{L-1} c_l(a_l \otimes b_l)$ using a double codebook for explicit feedback: $W=W_1 W_2$, where $W_1$ is for WB and long-term feedback of a joint basis vector set for both frequency and spatial domain representations comprising of either: basis matrices $\{a_l b_l^H: l=0, 1, \ldots, L-1\}$ or basis vectors $\{a_l \otimes b_l: l=0, 1, \ldots, L-1\}$, where $\{a_m: m=0, 1, \ldots, L-1\}$ is for frequency domain (across SBs) representation and $\{b_l: l=0, 1, \ldots, L-1\}$ is for spatial domain (across number of Tx (and Rx antennas)) representation, $W_2$ is for SB and short-term LC coefficients $\{c_l: l=0, 1, \ldots, L-1\}$ feedback, and L is the size of the basis vector set.

In some embodiments, the master basis set component for spatial domain representation $\{b_l: l=0, 1, \ldots, L-1\}$ is according to some embodiments of the present disclosure. In particular, it is according to the aforementioned embodiments of Alt 0-Alt 4 for DL channel or derivatives explained earlier in the present disclosure. In some embodiments, it is different and depends on the master basis set component for frequency domain representation $\{a_l: l=0, 1, \ldots, L-1\}$. The codebook for coefficient reporting and coefficient reporting alternatives are according to some embodiments of the present disclosure.

In some embodiments, the UE is configured to report multiple beam groups or basis sets (or 1st PMIs) from the $W_1$ codebook for explicit feedback, where multiple basis sets are reported using the same or different $W_1$ codebook. The basis sets are according to some embodiments of this present disclosure. For example, the basis sets can be in two port dimensions only (1st and 2nd port dimensions) or the basis sets can be in both port and frequency dimensions. There are at least the following three alternatives for multiple basis set reporting.

In one example, in frequency domain, the whole system BW is partitioned into multiple parts, where parts may or may be overlapping, and one basis set is reported for each part. For example, a basis set is reported for each of two non-overlapping and contiguous sets of SBs covering the whole BW. In another example, in spatial domain, multiple basis sets are reported for multiple dominant channel clusters in spatial domain. This reporting is for the whole BW (WB reporting). For example, two basis sets are reported for two dominant channel clusters. In yet another example, in both frequency and spatial domain, the whole system BW is partitioned into multiple parts, where parts may or may be overlapping, and multiple basis sets are reported for each part. For example, two basis sets are reported for each of two non-overlapping and contiguous sets of SBs covering the whole BW.

The configuration of multiple basis sets reporting is via higher-layer RRC parameter MultipleW1Enabled. If this parameter is ON, then the UE reports multiple basis sets. The number of basis sets (denoted as J) is either fixed for example to 2 or configured from a set, an example of which is {2, 3}. Similarly, the alternative for multiple basis set reporting is either fixed for example to frequency domain reporting or it is configured for example to one of frequency or spatial domain reporting.

Alternatively, the UE reports the number of basis set (J value) in the CSI report. For example, if the set of possible J values is {1, 2}, then the UE reports a preferred J value using 1-bit indication in CSI report.

In some embodiments, a UE is configured with one or both of the two types of CSI-RS resources. In one example, the "first non-zero-power (NZP) CSI-RS resource" corresponds to either: (1) full port, where CSI-RS is transmitted from all $2N_1N_2$ ports and it is non-precoded (NP) or Class A eMIMO-Type, or Partial port, where CSI-RS is transmitted from a subset of 2N1N2 ports, and the CSI-RS is either: NP CSI-RS or Class A eMIMO-Type or beam-formed (BF) CSI-RS or Class B eMIMO-Type with $K_1 \geq 1$ resources. In another example, the "second NZP CSI-RS resource" corresponds to a BF CSI-RS or Class B eMIMO-Type with either $K_2=1$ resource or $K_2>1$ resources.

In some embodiments, the configured first CSI-RS has one component for each of the two dimensions. For 1D antenna port configurations, the first CSI-RS has one component, and for 2D antenna port configurations, the first CSI-RS has two components: first CSI-RS 1 or first CSI-RS component 1; and first CSI-RS 2 or first CSI-RS component 2.

In some embodiments, the configured second CSI-RS has one component for each of the two dimensions. For 1D antenna port configurations, the second CSI-RS has one component, and for 2D antenna port configurations, the second CSI-RS has two components: second CSI-RS 1 or second CSI-RS component 1; and second CSI-RS 2 or second CSI-RS component 2.

In some embodiments, the full-port first CSI-RS resource is also referred to as Class A CSI-RS or eMIMO-Type, the partial-port first CSI-RS resource is also referred to as Class B (K>1) CSI-RS or eMIMO-Type, and the second CSI-RS resource is also referred to as Class B CSI-RS or eMIMO-Type.

In LTE Rel. 13, the following CSI reporting types or eMIMO-Type are supported: 'Class A' eMIMO-Type in which "First CSI-RS resource" is full-port, NP and CSI is reported using Class A codebook; and 'Class B' eMIMO-Type in which "Second CSI-RS resource" is beamformed and CSI is reported using Class B codebook, where K=1: CQI, PMI, RI feedback and K>1: CRI, CQI, PMI, RI feedback.

In LTE Rel. 13 'Class A' eMIMO-Type, a UE is configured with a CSI process comprising of a "first" CSI-RS resource for all $2N_1N_2$ ports. Upon receiving the CSI-RS for these ports, the UE derives and feeds back the Class A CSI feedback content comprising of the first PMI index pair, $(i_{1,1}, i_{1,2})$, the second PMI index $i_2$, CQI, and RI. An exemplary use case of the Class A CSI feedback scheme is described in FIG. 10. The UE derives the two PMIs using the Class A PMI codebook.

Figure 23:
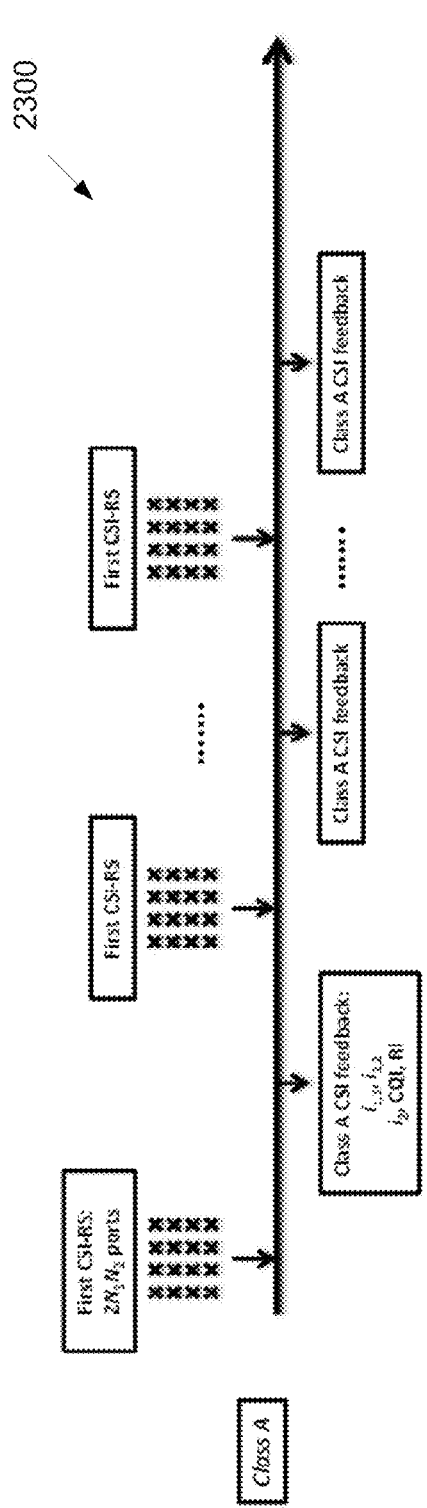
FIG. 23 illustrates an example Class A CSI feedback scheme according to embodiments of the present disclosure.

FIG. 23 illustrates an example Class A CSI feedback scheme 2300 according to embodiments of the present disclosure. An embodiment of the Class A CSI feedback scheme 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

In LTE Rel. 13 'Class B' eMIMO-Type, a UE is configured with a CSI process comprising of a "second" CSI-RS resource for a subset of $2N_1N_2$ ports. For example, the number of configured ports is 2. Upon receiving the CSI-RS for these ports, the UE derives and feeds back the Class B CSI feedback content comprising of a single PMI i, CQI, and RI. An exemplary use case of the Class B CSI feedback scheme is described in FIG. 24. The UE derives the PMI using the Class B PMI codebook.

Figure 24:
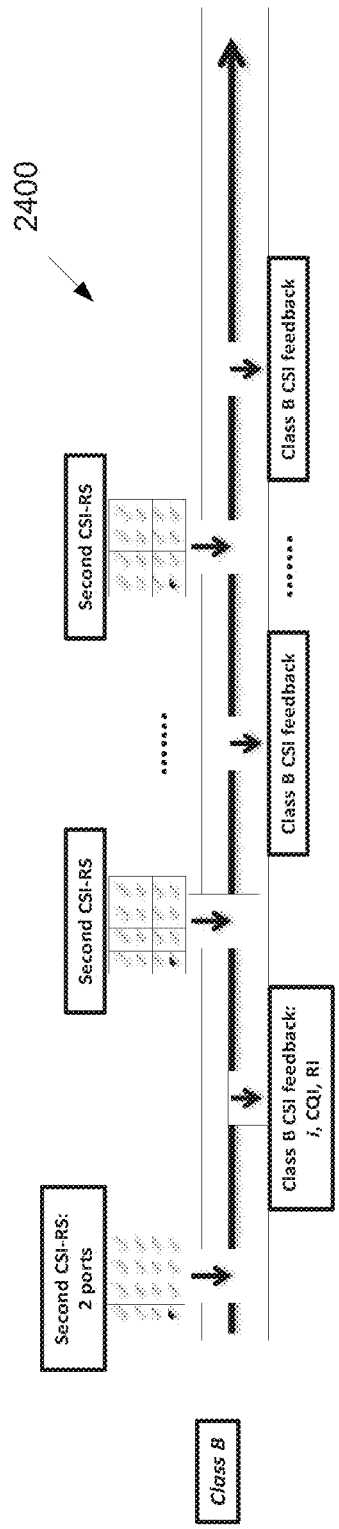
FIG. 24 illustrates an example Class B CSI feedback scheme according to embodiments of the present disclosure.

FIG. 24 illustrates an example Class B CSI feedback scheme 2400 according to embodiments of the present disclosure. An embodiment of the Class B CSI feedback scheme 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

Note that the CSI-RS overhead with the Class A CSI feedback scheme is large, which may lead to performance loss. The overhead is small for Class B CSI feedback scheme, but the overhead relies on the availability of beam-forming weights to beam-form Class B CSI-RS. The beam-forming weights may be obtained from UL SRS measurements assuming UL-DL duplex distance is small. Alternatively, it may be obtained through a Class A feedback configured with larger periodicity. The later alternative is an example of "Hybrid" CSI feedback scheme which is the focus of the present disclosure.

An issue with the Class A CSI feedback scheme for the future generation of communication systems (LTE Rel. 14 and beyond, 5G), is the increase in CSI-RS overhead to support larger number of antenna ports. In particular, as the number of supported antenna ports increases beyond a certain number, i.e. 32, the number of supported antenna ports can't be transmitted and measured in the same sub-frame. Hence, CSI-RS transmission and reception will require multiple subframes, which may not be desirable in practice.

Another issue with the Class A CSI feedback scheme is that the increase in overhead is unclear to bring justifiable performance benefits. In other words, to achieve certain performance, it may not be necessary to transmit CSI-RS from all $2N_1N_2$ ports in every CSI-RS transmission instance as is the case with Class A CSI feedback scheme. The same performance may perhaps be achieved by a so-called "hybrid CSI feedback scheme" in which there are two types of CSI-RS resources, the first CSI-RS resource is transmitted from all or a subset of $2N_1N_2$ ports with a larger periodicity and the second CSI-RS resource is transmitted from fewer than 2N1N2 ports, e.g. 2, with a smaller periodicity. The two CSI-RS resources are associated with two CSI reporting or eMIMO-Types.

The hybrid CSI feedback scheme and hybrid eMIMO-Type alternatives are proposed. The focus of the present disclosure is the details about some of the candidate hybrid eMIMO-Type alternatives and reported CSI contents.

In some embodiments, a UE is configured with either one CSI process with two NZP CSI-RS resources (each of the two associated with an eMIMO-Type) or two CSI processes each with one NZP CSI-RS resource associated with an eMIMO-Type, where 1st CSI-RS resource is associated with either Class A eMIMO-Type or Class B eMIMO-Type with $K_1 \geq 1$ resource, in terms of use cases, these two alternatives correspond to non-precoded (NP) CSI-RS and partial-port CSI-RS, respectively, and 2nd CSI-RS resource is associated with Class B eMIMO-Type with $K_2 \geq 1$ resources.

The two NZP CSI-RS resources are associated with two eMIMO-Types according to the configuration where examples of supported eMIMO-Type combinations are according to Table 13. The RI reported in the 1st eMIMO-Type is denoted as RV) and that reported in the 2nd eMIMO-Type is denoted as $RI^{(2)}$.

Some of these configurations such as Configuration 0 have multiple alternatives such as a, b, and c depending on CSI reporting contents. In one method, one of these alternatives is configured to the UE via higher-layer RRC signaling. In another method, the alternative is fixed, for example, 0-a, and hence does not need to be configured.

TABLE 13

Supported eMIMO-Type combinations for hybrid CSI reporting

| | | CSI derived with the first CSI-RS resource | | CSI derived with the second (BF) CSI-RS resource | |
|---|---|---|---|---|---|
| Configuration | eMIMO-Type | CSI reporting content | | eMIMO-Type | CSI reporting content |
| 0 | 0-a | Class A | $i_1$ or $(i_{1,1}, i_{1,2})$, $RI^{(1)}$ | Class B $K_2 = 1$ | CQI, PMI |
| | 0-b | | $i_1$ or $(i_{1,1}, i_{1,2})$, | | $RI^{(2)}$, CQI, PMI |
| | 0-c | | $i_1$ or $(i_{1,1}, i_{1,2})$, $RI^{(1)}$ | | $RI^{(2)}$, CQI, PMI |
| 1 | 1-a | Class B $K_1 = 1$ | PMI (Alt0: Rel. 13 Class B codebook Alt1: Rel. 12 codebooks) | Class B $K_2 = 1$ | $RI^{(2)}$, CQI, PMI |
| | 1-b | | CQI, $RI^{(1)}$, PMI (Alt0: Rel. 13 Class B codebook Alt1: Rel. 12 codebooks) | | $RI^{(2)}$, CQI, PMI |
| 2 | 2-a | Class B $K_1 > 1$ | CRI | Class B K2 = 1 | $RI^{(2)}$, CQI, PMI |
| | 2-b | | PMI (Alt0: Rel. 13 Class B codebook Alt1: Rel. 12 codebooks)/$RI^{(1)}$ for each CSI-RS resource | | $RI^{(2)}$, CQI, PMI |
| 3 | 3-a | Class B $K_1 = 1$ | $i_1$ or $(i_{1,1}, i_{1,2})$ | Class B $K_2 > 1$ | CRI, and {$RI^{(2)}$, CQI, PMI} conditioned on CRI |
| 4 | 3-a | Class A | $i_1$ or $(i_{1,1}, i_{1,2})$ | Class B K2 > 1 | CRI, and {$RI^{(2)}$, CQI, PMI} conditioned on CRI |
| | 3-b | | $i_1$ or $(i_{1,1}, i_{1,2})$, $RI^{(1)}$ | | CRI, and {$RI^{(2)}$, CQI, PMI} conditioned on CRI |

In some embodiments, a UE is configured with a hybrid CSI reporting in which the 1st eMIMO-Type is Class A and the 2nd eMIMO-Type is Class B, K=1. The CSI reported in the Class A eMIMO-Type includes $i_1$ or $(i_{1,1}, i_{1,2})$ and that reported in Class B eMIMO-Type includes CQI and PMI. Depending on whether both or at least one of $RI^{(1)}$ and $RI^{(2)}$ are reported, we have the following alternatives (as shown in Table 13): 0-a: Only RV) is reported; 0-b: Only $RI^{(2)}$ is reported; and 0-c: Both $RI^{(1)}$ and $RI^{(2)}$ are reported.

The UE is configured with the Rel. 13 Class B codebook (or extension in Rel. 14) for the Class B eMIMO-Type. Alternatively, the UE is configured with a new codebook for the Class B eMIMO-Type.

In the following embodiments, Rel. 13 Class A and Class B codebooks are assumed for two eMIMO-Types as examples. The embodiments, however, are applicable to other Class A and Class B codebooks such as the linear combination codebook. In one embodiment, the Codebook-Config for Class A eMIMO-Type is fixed or pre-determined (hence, not configured). For example, Codebook-Config is fixed to 1. In another embodiment, the Codebook-Config for Class A eMIMO-Type is configured, where the set of values of Codebook-Config include 1, 2, 3, and 4, which are identical to Rel. 13 Class A codebook parameter. In yet another embodiment, a restricted subset of Codebook-Config parameter values is configurable, for example Codebook-Config=2, 3, and 4. In yet another embodiment, new Codebook-Config parameters (or beam groups) that are different from Rel. 13 Class A codebook are defined for the hybrid configuration.

In general, the number and type (adjacent or orthogonal) of beams reported in Class A eMIMO-Type by $i_1$ or $(i_{1,1}, i_{1,2})$ depends on Codebook-Config parameter and $W_1$ codebook rank. For example, beams are adjacent for rank 1 $W_1$ codebook, and are orthogonal for rank 8 $W_1$ codebook. Also, Codebook-Config 1 indicates 1 rank-1 beam and Codebook-Config 2, 3, 4 indicate 4 rank-1 beams. The reported beams (indicated by $i_1$ or $(i_{1,1}, i_{1,2})$) are used by eNB to beam-form $N_P$ ports associated with Class B eMIMO-Type. Depending on whether all or a subset of the reported beams are used by the eNB, there are multiple possible hybrid configurations, the details of which are provided later in the present disclosure.

In some embodiments, the hybrid configuration is fixed for each (Codebook-Config, $N_P$) configuration. So, no additional signaling about hybrid configuration is required once (Codebook-Config, $N_P$) is configured.

In some embodiments, the UE is configured with one of multiple hybrid configurations for each (Codebook-Config, $N_P$) configuration via RRC signaling, where the set of possible configurable hybrid configurations can be a subset of the set of all possible hybrid configurations.

In some embodiments of 0-a, only $RI^{(1)}$ is reported. Since $RI^{(2)}$ is not reported in Class B eMIMO-Type, there are at least the following alternatives for PMI and CQI reporting: the reported PMI and CQI in Class B eMIMO-Type correspond to the rank (r) which is equal to RV) reported in Class A eMIMO-Type, i.e. $r=RI^{(1)}$; and the reported PMI and CQI in Class B eMIMO-Type correspond to the rank (r) which is smaller than or equal to RV) reported in Class A eMIMO- Type, i.e. r≤$RI^{(1)}$, where r is either fixed (for example rank 1) or configured via RRC signaling.

The set of possible values of $RI^{(1)}$ can either be {1, 2, . . . , 8} (i.e., 3-bit $RI^{(1)}$ indication) or a subset of {1, 2, . . . , 8}. In one example, the rank subset is {1, 2, 3, 4} (i.e., 2-bit $RI^{(1)}$ indication) or {1, 3, 5, 7} (i.e., 2-bit $RI^{(1)}$ indication) or {1, 2} (i.e., 1-bit $R^{(1)}$ indication). In another example, for $N_P$=2, the rank subset is {1, 2}, for $N_P$=4, the rank subset is {1, 2, 3, 4}, and for $N_P$=8, the rank subset is {1, 2, . . . , 8}.

In some embodiments of 0-b, only $RI^{(2)}$ is reported. Since $RI^{(1)}$ is not reported in Class A eMIMO-Type, there are at least the following alternatives for it or ($i_{1,1}, i_{1,2}$) reporting: the reported it or ($i_{1,1}, i_{1,2}$) corresponds to (or is conditioned on) a fixed and pre-determined rank Class A $W_1$ codebook. For example, rank=1 or 8; the rank on which $i_1$ or ($i_{1,1}, i_{1,2}$) reporting is conditioned is configured via higher layer (RRC) signaling, where the set of configurable rank is 1-8 (resulting in a 3-bit RRC parameter), or the set of configurable rank is a subset of 1-8. For example, {1, 3, 7} or {1, 3, 5, 7} (each resulting in a 2-bit RRC parameter); and the rank on which $i_1$ or ($i_{1,1}, i_{1,2}$) reporting is conditioned depends on the number of ports ($N_P$) configured for the CSI-RS resource associated with Class B eMIMO-Type. For example: the rank for $i_1$ or ($i_{1,1}, i_{1,2}$) reporting is 1 if $N_P$=2; the rank for $i_1$ or ($i_{1,1}, i_{1,2}$) reporting is 3 if $N_P$=4; and the rank for $i_1$ or ($i_{1,1}, i_{1,2}$) reporting is 7 if $N_P$=8.

FIG. 25 illustrates an example hybrid configuration for Codebook-Config=1 2500 according to embodiments of the present disclosure. An embodiment of the hybrid configuration for Codebook-Config=1 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

rank 1-2 $W_1$ codebook to derive $i_1$ or ($i_{1,1}, i_{1,2}$) indicating one beam; and the following sub-configuration for Class B eMIMO-Type. In one embodiment of configuration 0-0, Rel. 13 Class B, K=1 codebook for $N_P$=2 ports (which are beamformed using the beam indicated by $i_1$ or ($i_{1,1}, i_{1,2}$)), where the UE does not need to perform any beam selection and the UE reports up to rank 2 PMI (i.e., 1-bit $RI^{(2)}$) in Class B eMIMO-Type.

In some embodiments of configuration 1, the UE is configured with: Rel. 13 (or extension in Rel. 14) Class A rank 3-4 $W_1$ codebook to derive $i_1$ or ($i_{1,1}, i_{1,2}$) indicating one of the two (three) orthogonal beam pairs for 2D (1D) antenna port layouts, and one of the following two sub-configurations for Class B eMIMO-Type. In one embodiment of configuration 1-0, Rel. 13 Class B, K=1 codebook for $N_P$=2 ports (which are beamformed using 1 out of 2 beams indicated by $i_1$ or ($i_{1,1}, i_{1,2}$)), where the UE does not need to perform any beam selection and the UE reports up to rank 2 PMI (i.e., 1-bit $RI^{(2)}$) in Class B eMIMO-Type. In another embodiment of configuration 1-1, Rel. 13 Class B, K=1 codebook for $N_P$=4 ports (which are beamformed using 2 beams indicated by $i_1$ or ($i_{1,1}, i_{1,2}$)), where the UE performs 1 out of 2 beam selection for rank 1-2, and selects both beams for rank 3-4 and the UE reports up to rank 4 PMI (i.e., 2-bit $RI^{(2)}$) in Class B eMIMO-Type.

In some embodiments of configuration 2, the UE is configured with: Rel. 13 (or extension in Rel. 14) Class A rank 7-8 $W_1$ codebook to derive $i_1$ or ($i_{1,1}, i_{1,2}$) indicating four orthogonal beams, and one of the following three sub-configurations for Class B eMIMO-Type. In one embodiment of configuration 2-0, Rel. 13 Class B, K=1 codebook for $N_P$=2 ports (which are beamformed using 1 out of 4 orthogonal beams indicated by $i_1$ or ($i_{1,1}, i_{1,2}$)), where the UE does not need to perform any beam selection and the UE reports up to rank 2 PMI (i.e., 1-bit $RI^{(2)}$) in Class B eMIMO-Type. In another embodiment of configuration 2-1, Rel. 13 Class B, K=1 codebook for $N_P$=4 ports

TABLE 14

Class A (Codebook-Config = 1), Class B ($N_P$ = 2, 4, 8), Only $RI^{(2)}$ is reported

| | | Class A | | | Class B, K = 1 | | |
| --- | --- | --- | --- | --- | --- | --- | --- |
| Configuration | Number of beams indicated by $i_1$ | Beam types | Class A Codebook | $N_P$ | Rank $RI^{(2)}$ | #RI bits | Class B Codebook |
| 0 | 0-0 | 1 | Single beam | Rel. 13 (or 14) Rank 1-2 $W_1$ | 2 | 1-2 | 1 | Rel. 13 (or 14) |
| 1 | 1-0<br>1-1 | 2 | 2 orthogonal pairs for 2D port layout;<br>3 orthogonal pairs for 1D port layout | Rel. 13 (or 14) Rank 3-4 $W_1$ | 2<br>4 | 1-2<br>1-4 | 1<br>2 | |
| 2 | 2-0<br>2-1<br>2-2 | 4 | 4 orthogonal beams | Rel. 13 (or 14) Rank 7-8 $W_1$ | 2<br>4<br>8 | 1-2<br>1-4<br>1-8 | 1<br>2<br>3 | |

If Codebook-Config=1, then the UE can be configured with one of the following hybrid configurations. An illustration of the beams for these configurations is shown in FIG. 25, and the relevant details of the configurations are summarized in Table 14.

In some embodiments of configuration 0, the UE is configured with: Rel. 13 (or extension in Rel. 14) Class A (which are beamformed using 2 out of 4 orthogonal beams indicated by $i_1$ or ($i_{1,1}, i_{1,2}$)), where the UE performs 1 out of 2 beam selection for rank 1-2, and selects both beams for rank 3-4 and the UE reports up to rank 4 PMI (i.e., 2-bit $RI^{(2)}$) in Class B eMIMO-Type. In yet another embodiment of configuration 2-2, Rel. 13 Class B, K=1 codebook for $N_P$=8 ports (which are beamformed using 4 orthogonal beams indicated by $i_1$ or ($i_{1,1}$, $i_{1,2}$)), where the UE performs 1 out 4 beam selection for rank 1-2, 2 out of 4 beam selection for rank 3-4, 3 out of 4 beam selection for rank 5-6, and selects all 4 beams for rank 7-8 and the UE reports up to rank 8 PMI (i.e., 3-bit $RI^{(2)}$) in Class B eMIMO-Type.

Figure 26:
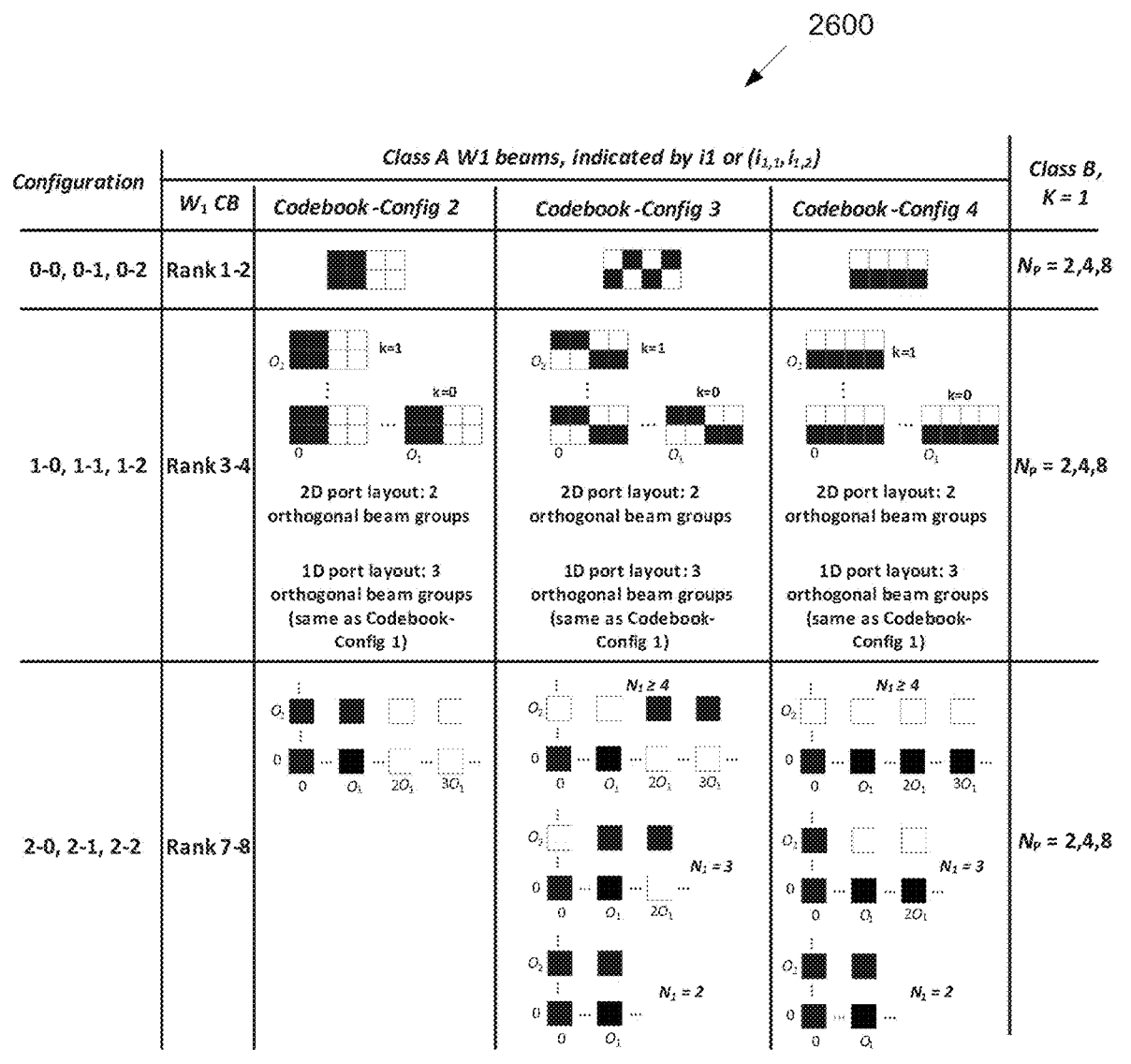

FIG. 26 illustrates an example hybrid configuration for Codebook-Config=2, 3, and 4 2600 according to embodiments of the present disclosure. An embodiment of the hybrid configuration for Codebook-Config=2, 3, and 4 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

TABLE 15

Class A (Codebook-Config = 2, 3, 4), Class B (Np = 2, 4, 8), Only $RI^{(2)}$ is reported

| Configuration | | Number of beams indicated by $i_1$ | Beam types | Class A Codebook | $N_P$ | Class B, K = 1 | | Class B Codebook |
|---|---|---|---|---|---|---|---|---|
| | | | | | | Rank $RI^{(2)}$ | #RI bits | |
| 0 | 0-0 | 4 | 4 closely spaced beams | Rel. 13 (or 14) Rank 1-2 $W_1$ | 2 | 1-2 | 1 | Rel. 13 (or 14) |
| | 0-1 | | | | 4 | | | |
| | 0-2 | | | | 8 | | | |
| 1 | 1-0 | 8 | 2 orthogonal groups for 2D port layout; 3 orthogonal groups for 1D port layout | Rel. 13 (or 14) Rank 3-4 $W_1$ | 2 | 1-2 | 1 | |
| | 1-1 | | | | 4 | 1-4 | 2 | |
| | 1-2 | | | | 8 | | | |
| 2 | 2-0 | 4 | 4 orthogonal beams | Rel. 13 (or 14) Rank 7-8 $W_1$ | 2 | 1-2 | 1 | |
| | 2-1 | | | | 4 | 1-4 | 2 | |
| | 2-2 | | | | 8 | 1-8 | 3 | |

If Codebook-Config=2, 3, 4, then the UE is configured with one of the following hybrid configurations. An illustration of the beams for the three configurations is shown in FIG. 26 and the relevant details of the configurations are summarized in Table 15.

In some embodiments of configuration 0, the UE is configured with: Rel. 13 (or extension in Rel. 14) Class A rank 1-2 $W_1$ codebook to derive $i_1$ or ($i_{1,1}$, $i_{1,2}$) indicating four beams; and one of the following three sub-configurations for Class B eMIMO-Type. In one example of configuration 0-0, Rel. 13 Class B, K=1 codebook for $N_P$=2 ports (which are beamformed using 1 out of 4 beams indicated by $i_1$ or ($i_{1,1}$, $i_{1,2}$)), where the UE does not need to perform any beam selection and the UE reports up to rank 2 PMI (i.e., 1-bit $RI^{(2)}$) in Class B eMIMO-Type. In another example of configuration 0-1, Rel. 13 Class B, K=1 codebook for $N_P$=4 ports (which are beamformed using 2 out of 4 beams indicated by $i_1$ or ($i_{1,1}$, $i_{1,2}$)), where the UE performs 1 out of 2 beam selection and the UE reports up to rank 2 PMI (i.e., 1-bit $RI^{(2)}$) in Class B eMIMO-Type. In yet another example of configuration 0-2, Rel. 13 Class B, K=1 codebook for $N_P$=8 ports (which are beamformed using all 4 beams indicated by $i_1$ or ($i_{1,1}$, $i_{1,2}$)), where the UE performs 1 out of 4 beam selection and the UE reports up to rank 2 PMI (i.e., 1-bit $RI^{(2)}$) in Class B eMIMO-Type.

In some embodiments of configuration 1, the UE is configured with: Rel. 13 (or extension in Rel. 14) Class A rank 3-4 $W_1$ codebook to derive $i_1$ or ($i_{1,1}$, $i_{1,2}$) indicating one of the two (three) orthogonal beam groups for 2D (1D) antenna port layouts where each orthogonal beam group has eight beams, four of which are located at location (0,0) and the reaming four are located at an orthogonal location, for example ($O_1$,0) or (0,$O_2$); and one of the following three sub-configurations for Class B eMIMO-Type. In one example of configuration 1-0, Rel. 13 Class B, K=1 codebook for $N_P$=2 ports (which are beamformed using 1 out of 8 beams indicated by $i_1$ or ($i_{1,1}$, $i_{1,2}$)), where the UE does not need to perform any beam selection and the UE reports up to rank 2 PMI (i.e., 1-bit $RI^{(2)}$) in Class B eMIMO-Type. In another example of configuration 1-1, Rel. 13 Class B, K=1 codebook for $N_P$=4 ports (which are beamformed using 2 out of 8 beams indicated by $i_1$ or ($i_{1,1}$, $i_{1,2}$)), where the UE performs 1 out of 2 beam selection for rank 1-2, and selects both beams for rank 3-4 and the UE reports up to rank 4 PMI (i.e., 2-bit $RI^{(2)}$) in Class B eMIMO-Type. In yet another example of configuration 1-2: Rel. 13 Class B, K=1 codebook for $N_P$=8 ports (which are beamformed using 4 out of 8 beams indicated by $i_1$ or ($i_{1,1}$,$i_{1,2}$)), where the UE performs 1 out 4 beam selection for rank 1-2, and 2 out of 4 beam selection for rank 3-4 and the UE reports up to rank 4 PMI (i.e., 2-bit $RI^{(2)}$) in Class B eMIMO-Type.

In some embodiments of configuration 2, the UE is configured with: Rel. 13 (or extension in Rel. 14) Class A rank 7-8 $W_1$ codebook to derive $i_1$ or ($i_{1,1}$, $i_{1,2}$) indicating four orthogonal beams; and one of the following three sub-configurations. In one example of configuration 2-0, Rel. 13 Class B, K=1 codebook for $N_P$=2 ports (which are beamformed using 1 out of 4 orthogonal beams indicated by $i_1$ or ($i_{1,1}$, $i_{1,2}$)), where the UE does not need to perform any beam selection and the UE reports up to rank 2 PMI (i.e., 1-bit $RI^{(2)}$) in Class B eMIMO-Type. In another example of configuration 2-1: Rel. 13 Class B, K=1 codebook for $N_P$=4 ports (which are beamformed using 2 out of 4 orthogonal beams indicated by $i_1$ or ($i_{1,1}$, $i_{1,2}$)), where the UE performs 1 out of 2 beam selection for rank 1-2, and selects both beams for rank 3-4 and the UE reports up to rank 4 PMI (i.e., 2-bit $RI^{(2)}$) in Class B eMIMO-Type. In yet another example of configuration 2-2, Rel. 13 Class B, K=1 codebook for $N_P$=8 ports (which are beamformed using 4 orthogonal beams indicated by $i_1$ or ($i_{1,1}$, $i_{1,2}$)), where the UE performs 1 out 4 beam selection for rank 1-2, 2 out of 4 beam selection for rank 3-4, 3 out of 4 beam selection for rank 5-6, and selects all 4 beams for rank 7-8 and the UE reports up to rank 8 PMI (i.e., 3-bit $RI^{(2)}$) in Class B eMIMO-Type.

The present disclosure covers the use of all the above configurations or sub-configurations. It also covers the use of only a subset of all the above configurations or sub-configurations. If more than one configurations or sub-configurations are used, the choice of configuration or sub-configuration is performed via higher layer signaling.

For example, a subset of hybrid configurations or sub-configurations in Table 14 and Table 15 is used to configure one hybrid configuration to the UE. An example of such a subset is shown in Table 16. The number of configurations in Table 16 is 18. At least two possible configuration schemes can be used. First, a 5-bit RRC parameter can be used to configure a UE with one of the 18 hybrid configurations. Second, only one bit RRC parameter which configures a UE with one of the two configurations in case of Codebook-Config 2,3,4 and $N_P$=4,8. This RRC signaling is not needed if Codebook-Config=1 or (Codebook-Config 2, 3, 4 and $N_P$=2). In this later configuration, Codebook-Config for Class A and the number of ports Np for Class B are already configurable via higher-layer signaling.

TABLE 16

Configurable hybrid configurations; Only $RI^{(2)}$ is reported

| Class A: Codebook-Config | Class B: $N_P$ | Hybrid Configuration | # $RI^{(2)}$ bits |
|---|---|---|---|
| 1 | 2 | 0-0 (Table 14) | 1 |
|  | 4 | 1-1 (Table 14) | 2 |
|  | 8 | 2-2 (Table 14) | 3 |
| 2, 3, or 4 | 2 | 0-0 (Table 15) | 1 |
|  | 4 | 0-1 (Table 15) | 1 |
|  | 8 | 0-2 (Table 15) | 1 |
|  | 4 | 1-1 (Table 15) | 2 |
|  | 8 | 2-2 (Table 15) | 3 |

A variation of the above example where only one configuration is supported for Codebook-Config=2, 3, 4 and $N_P$=4, 8 can be described as follows. Two examples are given in Table 17 and Table 18 below where the number of bits for $RI^{(2)}$ is 1 and log 2($N_P$), respectively. In this case, an additional RRC parameter is not needed.

TABLE 17

Configurable hybrid configurations; Only $RI^{(2)}$ = 1 bit is reported

| Class A: Codebook-Config | Class B: $N_P$ | Hybrid Configuration | # $RI^{(2)}$ bits |
|---|---|---|---|
| 2, 3, or 4 | 2 | 0-0 (Table 15) | 1 |
|  | 4 | 0-1 (Table 15) | 1 |
|  | 8 | 0-2 (Table 15) | 1 |

TABLE 18

Configurable hybrid configurations; Only $RI^{(2)}$ = $\log_2(N_P)$ bits is reported

| Class A: Codebook-Config | Class B: $N_P$ | Hybrid Configuration | # $RI^{(2)}$ bits |
|---|---|---|---|
| 2, 3, or 4 | 2 | 0-0 (Table 15) | 1 |
|  | 4 | 1-1 (Table 15) | 2 |
|  | 8 | 2-2 (Table 15) | 3 |

In some embodiments of 0-c, both $RI^{(1)}$ and $RI^{(2)}$ are reported. Since $RI^{(1)}$ is reported in Class A eMIMO-Type, there are at least the following alternatives for $i_1$ or ($i_{1,1}, i_{1,2}$) reporting: the reported it or ($i_{1,1}, i_{1,2}$) corresponds to (or is conditioned on) any of rank 1-8 Class A $W_1$ codebooks, i.e. $RI^{(1)}$=1, 2, . . . , 8 (i.e., 3-bit RV)); the reported $i_1$ or ($i_{1,1}, i_{1,2}$) is conditioned on a subset of all rank 1-8 Class A $W_1$ codebooks, where the subset is either pre-determined or RRC configured, where, for example, $RI^{(1)}$=1,3 (i.e., 1-bit $RI^{(1)}$), $RI^{(1)}$=1,3,5 (i.e., 2-bit $RI^{(1)}$), or $RI^{(1)}$=1,3,5,7 (i.e., 2-bit $RI^{(1)}$); and the rank on which $i_1$ or ($i_{1,1}, i_{1,2}$) reporting is conditioned depends on the number of ports ($N_P$) configured for the CSI0RS resource associated with Class B eMIMO-Type, where, for example, $RI^{(1)}$=1 (so, no $RI^{(1)}$ indication is needed) if $N_P$=2, $RI^{(1)}$=1,3 (i.e., 1-bit $RI^{(1)}$) if $N_P$=4; or $RI^{(1)}$=1,3,5,7 (i.e., 2-bit $RI^{(1)}$) if $N_P$=8.

Also, since RI is reported in both eMIMO-Types (associated with the two configured NZP CSI-RS resources), there can be following two cases: Case 0: $RI^{(1)}$ and $RI^{(2)}$ are dependent. For example, $RI^{(2)}$ reporting is only 1-bit for $N_P$=2, 4, 8, where one possible embodiment for this is to utilize rank inheritance feature in Rel.12. That is, a RI reference resource for the second eMIMO-Type is defined to as the resource associated with the first eMIMO-Type; and Case 1: $RI^{(1)}$ and $RI^{(2)}$ are independent. In particular, $RI^{(2)}$ reporting is 1, 2, and 3 bits for $N_P$=2, 4, and 8, respectively, in this instance, CQI and PMI associated with the second eMIMO-Type (of Class B) are calculated conditioned on the reported $RI^{(2)}$. For periodic PUCCH-based CSI reporting, the reported $RI^{(2)}$ is the last reported periodic $RI^{(2)}$.

One of the above two cases can be configured to a UE via RRC signaling. Alternatively, the case is pre-determined, for example Case 0.

Similar to the aforementioned embodiments of 0-b, if Codebook-Config=1, then the UE can be configured with one of the several hybrid configurations (or sub-configurations). Example configurations are summarized in Table 19 and Table 20, respectively, for Case 0 and Case 1 of rank reporting and $N_P$=2,4,8.

TABLE 19

Class A (Codebook-Config = 1) and Class B ($N_P$ = 2, 4, 8), both $RI^{(1)}$ and $RI^{(2)}$ are report, Case 0: $RI^{(1)}$ and $RI^{(2)}$ are dependent

| | | | Class A | | | Class B, K = 1 | | |
|---|---|---|---|---|---|---|---|---|
| Config. | #RI bits | Rank $RI^{(1)}$ | Number of beams indicated by $i_1$ | Beam types | Class A Codebook | $N_P$ | Rank $RI^{(2)}$ | #RI bits | Class B Codebook |
| 0 | 2 | 1-2 | 1 | — | Rel. 13 (or 14) Rank 1-2 $W_1$ | 2 | 1-2 | 1 | Rel. 13 (or 14) |
|  |  | 3-4 | 2 | 2 orthogonal pairs for 2D | Rel. 13 (or 14) Rank 3- | 4 | 3-4 |  |  |

TABLE 19-continued

Class A (Codebook-Config = 1) and Class B ($N_p$ = 2, 4, 8), both $RI^{(1)}$ and $RI^{(2)}$ are report, Case 0: $RI^{(1)}$ and $RI^{(2)}$ are dependent

| | | Class A | | | | Class B, K = 1 | | |
|---|---|---|---|---|---|---|---|---|
| | | | Number of beams | | | | | |
| Config. | #RI bits | Rank $RI^{(1)}$ | indicated by $i_1$ | Beam types | Class A Codebook | $N_p$ | Rank $RI^{(2)}$ | #RI bits | Class B Codebook |
| 2 | | 5-6 | 3 | port layout; 3 orthogonal pairs for 1D port layout 3 orthogonal beams | 4 $W_1$ Rel. 13 (or 14) Rank 5-6 $W_1$ | 8 | 5-6 | | |
| 3 | | 7-8 | 4 | 4 orthogonal beams | Rel. 13 (or 14) Rank 7-8 $W_1$ | 8 | 7-8 | | |

TABLE 20

Class A (Codebook-Config = 1) and Class B ($N_p$ = 2, 4, 8), both $RI^{(1)}$ and $RI^{(2)}$ are report, Case 1: $RI^{(1)}$ and $RI^{(2)}$ are dependent

| | | Class A | | | | Class B, K = 1 | | | |
|---|---|---|---|---|---|---|---|---|---|
| | | | Number of beams | | | | | | |
| Config. | #RI bits | Rank $RI^{(1)}$ | indicated by $i_1$ | Beam types | Class A Codebook | $N_p$ | Rank $RI^{(2)}$ | #RI bits | Class B Codebook |
| 0 | 0-0 | 1-2 | 1 | — | Rel. 13 (or 14) Rank 1-2 $W_1$ | 2 | 1-2 | 1 | Rel. 13 (or 14) |
| 1 | 1-0 1-1 | 3-4 | 2 | 2 orthogonal pairs for 2D port layout; 3 orthogonal pairs for 1D port layout | Rel. 13 (or 14) Rank 3-4 $W_1$ | 2 4 | 1-2 1-4 | 1 2 | |
| 2 | 2-0 2-1 2-2 | 5-6 | 3 | 3 orthogonal beams | Rel. 13 (or 14) Rank 7-8 $W_1$ | 2 4 8 | 1-2 1-4 1-6 | 1 2 3 | |
| 3 | 3-0 3-1 3-2 | 7-8 | 4 | 4 orthogonal beams | Rel. 13 (or 14) Rank 7-8 $W_1$ | 2 4 8 | 1-2 1-4 1-8 | 1 2 3 | |

Another example configurations are summarized in Table 21 and Table 22 for Case 0 and Case 1 of rank reporting, and $N_P$=2, 4, 6, 8. Note that in this case, a new Class B codebook for $N_P$6 needs to be configured.

TABLE 21

Class A (Codebook-Config = 1) and Class B ($N_p$ = 2, 4, 6, 8), both $RI^{(1)}$ and $RI^{(2)}$ are report, Case 0: $RI^{(1)}$ and $RI^{(2)}$ are dependent

| | | Class A | | | | Class B, K = 1 | | |
|---|---|---|---|---|---|---|---|---|
| | | | Number of beams | | | | | |
| Config. | #RI bits | Rank $RI^{(1)}$ | indicated by $i_1$ | Beam types | Class A Codebook | $N_p$ | Rank $RI^{(2)}$ | #RI bits | Class B Codebook |
| 0 | 2 | 1-2 | 1 | — | Rel. 13 (or 14) Rank 1-2 $W_1$ | 2 | 1-2 | 1 | Rel. 13 (or 14) |
| 1 | | 3-4 | 2 | 2 orthogonal pairs for 2D port layout; 3 orthogonal | Rel. 13 (or 14) Rank 3-4 $W_1$ | 4 | 3-4 | | |

TABLE 21-continued

Class A (Codebook-Config = 1) and Class B ($N_p$ = 2, 4, 6, 8), both $RI^{(1)}$ and $RI^{(2)}$ are report, Case 0: $RI^{(1)}$ and $RI^{(2)}$ are dependent

| | | | Class A | | | | Class B, K = 1 | |
|---|---|---|---|---|---|---|---|---|
| Config. | #RI bits | Rank $RI^{(1)}$ | Number of beams indicated by $i_1$ | Beam types | Class A Codebook | $N_p$ | Rank $RI^{(2)}$ | #RI bits | Class B Codebook |
| 2 | | 5-6 | 3 | pairs for 1D port layout 3 orthogonal beams | Rel. 13 (or 14) Rank 5-6 $W_1$ | 6 | 5-6 | | |
| 3 | | 7-8 | 4 | 4 orthogonal beams | Rel. 13 (or 14) Rank 7-8 $W_1$ | 8 | 7-8 | | |

TABLE 22

Class A (Codebook-Config = 1) and Class B ($N_p$ = 2, 4, 6, 8), both $RI^{(1)}$ and $RI^{(2)}$ are report, Case 1: $RI^{(1)}$ and $RI^{(2)}$ are independent

| | | | Class A | | | | Class B, K = 1 | | |
|---|---|---|---|---|---|---|---|---|---|
| Config. | #RI bits | Rank $RI^{(1)}$ | Number of beams indicated by $i_1$ | Beam types | Class A Codebook | $N_p$ | Rank $RI^{(2)}$ | #RI bits | Class B Codebook |
| 0 | 0-0 | 2 | 1-2 | 1 | — | Rel. 13 (or 14) Rank 1-2 $W_1$ | 2 | 1-2 | 1 | Rel. 13 (or 14) |
| 1 | 1-0 | | 3-4 | 2 | 2 orthogonal pairs for 2D port layout; 3 orthogonal pairs for 1D port layout | Rel. 13 (or 14) Rank 3-4 $W_1$ | 2 | 1-2 | 1 | |
| | 1-1 | | | | | | 4 | 1-4 | 2 | |
| 2 | 2-0 | | 5-6 | 3 | 3 orthogonal beams | Rel. 13 (or 14) Rank 5-6 $W_1$ | 2 | 1-2 | 1 | |
| | 2-1 | | | | | | 4 | 1-4 | 2 | |
| | 2-2 | | | | | | 6 | 1-6 | 3 | |
| 3 | 3-0 | | 7-8 | 4 | 4 orthogonal beams | Rel. 13 (or 14) Rank 7-8 $W_1$ | 2 | 1-2 | 1 | |
| | 3-1 | | | | | | 4 | 1-4 | 2 | |
| | 3-2 | | | | | | 6 | 1-6 | 3 | |
| | 3-3 | | | | | | 8 | 1-8 | 3 | |

If Codebook-Config=2, 3, 4, then the hybrid eMIMO-Type configurations can be formulated similarly. Example configurations are summarized in Table 23 and Table 24, respectively, for Case 0 and Case 1 of rank reporting and $N_p$=2,4,8.

TABLE 23

Class A (Codebook-Config = 2, 3, 4) and Class B ($N_p$ = 2, 4, 8), both $RI^{(1)}$ and $RI^{(2)}$ are report, Case 0: $RI^{(1)}$ and $RI^{(2)}$ are dependent

| | | | Class A | | | | Class B, K = 1 | | |
|---|---|---|---|---|---|---|---|---|---|
| Config. | #RI bits | Rank $RI^{(1)}$ | Number of beams indicated by $i_1$ | Beam types | Class A Codebook | $N_p$ | Rank $RI^{(2)}$ | #RI bits | Class B Codebook |
| 0 | 0-0 | 2 | 1-2 | 4 | — | Rel. 13 (or 14) Rank 1-2 $W_1$ | 2 | 1-2 | 1 | Rel. 13 (or 14) |
| | 0-1 | | | | | | 4 | | | |
| | 0-2 | | | | | | 8 | | | |

TABLE 23-continued

Class A (Codebook-Config = 2, 3, 4) and Class B ($N_p$ = 2, 4, 8), both $RI^{(1)}$ and $RI^{(2)}$ are report, Case 0: $RI^{(1)}$ and $RI^{(2)}$ are dependent

| | | | Class A | | | | Class B, K = 1 | |
| --- | --- | --- | --- | --- | --- | --- | --- | --- |
| Config. | #RI bits | Rank $RI^{(1)}$ | Number of beams indicated by $i_1$ | Beam types | Class A Codebook | $N_p$ | Rank $RI^{(2)}$ | #RI bits | Class B Codebook |
| 1 | 1-1<br>1-2 | 3-4 | 8 | 2 orthogonal pairs for 2D port layout; 3 orthogonal pairs for 1D port layout | Rel. 13 (or 14) Rank 3-4 $W_1$ | 4<br>8 | 3-4 | | |
| 2 | 2-2 | 5-6 | 3 | 3 orthogonal beams | Rel. 13 (or 14) Rank 5-6 $W_1$ | 8 | 5-6 | | |
| 3 | 3-2 | 7-8 | 4 | 4 orthogonal beams | Rel. 13 (or 14) Rank 7-8 $W_1$ | 8 | 7-8 | | |

TABLE 24

Class A (Codebook-Config = 2, 3, 4) and Class B ($N_p$ = 2, 4, 8), both $RI^{(1)}$ and $RI^{(2)}$ are report, Case 1: $RI^{(1)}$ and $RI^{(2)}$ are independent

| | | | Class A | | | | Class B, K = 1 | |
| --- | --- | --- | --- | --- | --- | --- | --- | --- |
| Config. | #RI bits | Rank $RI^{(1)}$ | Number of beams indicated by $i_1$ | Beam types | Class A Codebook | $N_p$ | Rank $RI^{(2)}$ | #RI bits | Class B Codebook |
| 0 | 0-0<br>0-1<br>0-2 | 1-2 | 4 | — | Rel. 13 (or 14) Rank 1-2 $W_1$ | 2<br>4<br>8 | 1-2 | 1 | Rel. 13 (or 14) |
| 1 | 1-0<br>1-1<br>1-2 | 3-4 | 8 | 2 orthogonal pairs for 2D port layout; 3 orthogonal pairs for 1D port layout | Rel. 13 (or 14) Rank 3-4 $W_1$ | 2<br>4<br>8 | 1-2<br>1-4 | 1<br>2 | |
| 2 | 2-0<br>2-1<br>2-2 | 5-6 | 3 | 3 orthogonal beams | Rel. 13 (or 14) Rank 7-8 $W_1$ | 2<br>4<br>8 | 1-2<br>1-4<br>1-6 | 1<br>2<br>3 | |
| 3 | 3-0<br>3-1<br>3-2 | 7-8 | 4 | 4 orthogonal beams | Rel. 13 (or 14) Rank 7-8 $W_1$ | 2<br>4<br>8 | 1-2<br>1-4<br>1-8 | 1<br>2<br>3 | |

The present disclosure covers the use of all the above configurations or sub-configurations. It also covers the use of only a subset of all the above configurations or sub-configurations. If more than one configurations or sub-configurations are used, the choice of configuration or sub-configuration is performed via higher layer signaling.

For example, a subset of hybrid configurations or sub-configurations in Table 19, Table 20, Table 23, and Table 24 is used to configure one hybrid configuration to the UE. An example of such a subset is shown in Table 25. In this subset, $RI^{(1)}$=2 bits corresponds to rank 1-2, rank 3-4, rank 5-6, and rank 7-8 Class A $W_1$ codebooks. The total number of configurations in the Table is 32. At least two possible configuration schemes can be used. First, a 5-bit RRC parameter can be used to configure a UE with one of the 32 hybrid configurations. Second, only one bit RRC parameter which configures a UE for either Case 0 ($RI^{(1)}$ and $RI^{(2)}$ calculation are dependent) or Case 1 ($RI^{(1)}$ and $RI^{(2)}$ calculation are independent) is used. Since Codebook-Config for Class A and the number of ports $N_p$ for Class B are already configurable via higher-layer signaling, the choice of hybrid configuration for a given combination of Codebook-Config for Class A and the number of ports Np for Class B, along with the sets of possible values for $RI^{(1)}$ and $RI^{(2)}$, are fixed.

TABLE 25

Configurable hybrid configurations; both $RI^{(1)}$ and $RI^{(2)}$ are reported

| Case | Class A: Codebook-Config | Class B: $N_P$ | Hybrid Configuration | # $RI^{(1)}$ bits | # $RI^{(2)}$ bits |
| --- | --- | --- | --- | --- | --- |
| 0: $RI^{(1)}$ and $RI^{(2)}$ calculation are dependent | 1 | 2 | 0 (Table 18) | 2 | 1 |
| | | 4 | 1 (Table 18) | | |
| | | 8 | 2 (Table 18) | | |
| | | 8 | 3 (Table 18) | | |
| | 2, 3, or 4 | 2 | 0-0 (Table 23) | 2 | 1 |
| | | 4 | 1-1 (Table 23) | | |
| | | 8 | 2-2 (Table 23) | | |
| | | 8 | 2-3 (Table 23) | | |

TABLE 25-continued

Configurable hybrid configurations; both $RI^{(1)}$ and $RI^{(2)}$ are reported

| Case | Class A: Codebook-Config | Class B: $N_P$ | Hybrid Configuration | # $RI^{(1)}$ bits | # $RI^{(2)}$ bits |
|---|---|---|---|---|---|
| 1: $RI^{(1)}$ | 1 | 2 | 0-0 (Table 20) | 2 | 1 |
| and $RI^{(2)}$ |  | 4 | 1-1 (Table 20) |  | 2 |
| calculation |  | 8 | 2-2 (Table 20) |  | 3 |
| are |  | 8 | 3-2 (Table 20) |  | 3 |
| independent | 2, 3, or 4 | 2 | 0-0 (Table 24) | 2 | 1 |
|  |  | 4 | 1-1 (Table 24) |  | 2 |
|  |  | 8 | 2-2 (Table 24) |  | 3 |
|  |  | 8 | 3-2 (Table 24) |  | 3 |

Another example of the subset with only one hybrid configuration (instead of two) for $N_P=8$ is shown in Table 26. In this subset, $RI^{(1)}=2$ bits corresponds to rank 1-2, rank 3-4, and rank 7-8 Class A $W_1$ codebooks.

TABLE 26

Configurable hybrid configurations; both $RI^{(1)}$ and $RI^{(2)}$ are reported

| Case | Class A: Codebook-Config | Class B: $N_P$ | Hybrid Configuration | # $RI^{(1)}$ bits | # $RI^{(2)}$ bits |
|---|---|---|---|---|---|
| 0: $RI^{(1)}$ | 1 | 2 | 0 (Table 19) | 2 | 1 |
| and $RI^{(2)}$ |  | 4 | 1 (Table 19) |  | 2 |
| calculation |  | 8 | 3 (Table 19) |  | 3 |
| are | 2, 3, or 4 | 2 | 0-0 (Table 23) | 2 | 1 |
| dependent |  | 4 | 1-1 (Table 23) |  | 2 |
|  |  | 8 | 2-3 (Table 23) |  | 3 |
| 1: $RI^{(1)}$ | 1 | 2 | 0-0 (Table 20) | 2 | 1 |
| and $RI^{(2)}$ |  | 4 | 1-1 (Table 20) |  | 2 |
| calculation |  | 8 | 3-2 (Table 20) |  | 3 |
| are | 2, 3, or 4 | 2 | 0-0 (Table 24) | 2 | 1 |
| independent |  | 4 | 1-1 (Table 24) |  | 2 |
|  |  | 8 | 3-2 (Table 24) |  | 3 |

A variation of the above example where only independent $RI^{(1)}$ and $RI^{(2)}$ calculation is supported can be described as follows. Two examples are given in Table 27 and Table 28 below where the number of bits for $RI^{(1)}$ is 2 and 1, respectively. In this case, an additional RRC parameter is not needed. In Table 27, $RI^{(1)}=2$ bits corresponds to rank 1-2, rank 3-4, and rank 7-8 Class A $W_1$ codebooks. In Table 28, $RI^{(1)}=1$ bit corresponds to rank 1-2 and rank 7-8 Class A $W_1$ codebooks.

TABLE 27

Configurable hybrid configurations; both $RI^{(1)}$ (2 bits) and $RI^{(2)}$ are reported

| Class A: Codebook-Config | Class B: $N_P$ | Hybrid Configuration | # $RI^{(1)}$ bits | # $RI^{(2)}$ bits |
|---|---|---|---|---|
| 1 | 2 | 0-0 (Table 20) | 2 | 1 |
|  | 4 | 1-1 (Table 20) |  | 2 |
|  | 8 | 3-2 (Table 20) |  | 3 |
| 2, 3, or 4 | 2 | 0-0 (Table 24) | 2 | 1 |
|  | 4 | 1-1 (Table 24) |  | 2 |
|  | 8 | 3-2 (Table 24) |  | 3 |

TABLE 28

Configurable hybrid configurations; both $RI^{(1)}$ (1 bit) and $RI^{(2)}$ are reported

| Class A: Codebook-Config | Class B: $N_P$ | Hybrid Configuration | # $RI^{(1)}$ bits | # $RI^{(2)}$ bits |
|---|---|---|---|---|
| 1 | 2 | 0-0 (Table 20) | 1 | 1 |
|  | 4 | 3-1 (Table 20) |  | 2 |
|  | 8 | 3-2 (Table 20) |  | 3 |
| 2, 3, or 4 | 2 | 0-0 (Table 24) | 1 | 1 |
|  | 4 | 3-1 (Table 24) |  | 2 |
|  | 8 | 3-2 (Table 24) |  | 3 |

A few other examples of $RI^{(1)}$ and $RI^{(2)}$ reporting are shown in Table 29, Table 20, Table 31, and Table 32, where: the number of bits for $RI^{(1)}=0$ for $N_p=2$ Class B ports (i.e., $RI^{(1)}$ is not reported); and the number of bits for $RI^{(1)}$ for $N_p=4$ and 8 Class B ports.

In the example in Table 29, $RI^{(1)}=\log_2(N_P/2)$ bits and $RI^{(2)}=\log_2(N_P)$ bits. The reported $RI^{(1)}$ indicates a Class A codebook rank as follows: 0-bit $RI^{(1)}$ indicates rank 1 for $N_p=2$ (i.e., $RI^{(1)}$ is not reported); 1-bit $RI^{(1)}$ indicates rank 1 or 3 for $N_p=4$; and 2-bit RV) indicates rank 1, 3, 5, or 7 for $N_p=8$. The reported $RI^{(2)}$ indicates a Class B codebook rank 1, 2, . . . , or $N_p$.

In the example in Table 30, $RI^{(1)}=0$ or 1 bit and $RI^{(2)}=\log_2(N_P)$ bits. The reported $RI^{(1)}$ indicates a Class A codebook rank as follows: 0-bit $RI^{(1)}$ indicates rank 1 for $N_p=2$ (i.e., $RI^{(1)}$ is not reported); 1-bit $RI^{(1)}$ indicates rank 1 or 3 for $N_p=4$; and 1-bit $RI^{(1)}$ indicates rank either (Alt 0) 1 or 3, or (Alt 1) 1 or 7 for $N_p=8$. The reported $RI^{(2)}$ indicates a Class B codebook rank 1, 2, . . . , or $N_p$.

In the example in Table 31, $RI^{(1)}=\log_2(Np/2)$ bits and $RI^{(2)}=1$ bit. The reported $RI^{(1)}$ indicates a Class A codebook rank as follows: 0-bit $RI^{(1)}$ indicates rank 1 for $N_p=2$ (i.e., $RI^{(1)}$ is not reported); 1-bit $RI^{(1)}$ indicates rank 1 or 3 for $N_p=4$; and 2-bit $RI^{(1)}$ indicates rank 1, 3, 5, or 7 for $N_p=8$. The reported 1-bit $RI^{(2)}$ indicates a Class B codebook rank which depends on the reported $RI^{(1)}$. In one example, 1-bit $RI^{(2)}$ indicates rank 1 or 2 for $N_p=2$. In another example, for $N_p=4$, 1-bit $RI^{(2)}$ indicates: rank 1 or 2 if $RI^{(1)}$ indicates rank 1; and rank 3 or 4 if $RI^{(1)}$ indicates rank 3. In yet another example, for $N_p=8$, 1-bit $RI^{(2)}$ indicates: rank 1 or 2 if $RI^{(1)}$ indicates rank 1; rank 3 or 4 if $RI^{(1)}$ indicates rank 3; rank 5 or 6 if $RI^{(1)}$ indicates rank 5; and rank 7 or 8 if $RI^{(1)}$ indicates rank 7.

In the example in Table 32, $RI^{(1)}=\log_2(N_P/2)$ bits and $RI^{(2)}=1$ or 3 bits. The reported $RI^{(1)}$ indicates a Class A codebook rank as follows: 0-bit $RI^{(1)}$ indicates rank 1 for $N_p=2$ (i.e., $RI^{(1)}$ is not reported); 1-bit $RI^{(1)}$ indicates rank 1 or 3 for $N_p=4$; and 2-bit $RI^{(1)}$ indicates rank 1, 3, 5, or 7 for $N_p=8$. The reported 1-bit $RI^{(2)}$ indicates a Class B codebook rank which depends on the reported $RI^{(1)}$. In one example, 1-bit $RI^{(2)}$ indicates rank 1 or 2 for $N_p=2$. In another example, for $N_p=4$, 1-bit $RI^{(2)}$ indicates: rank 1 or 2 if RV) indicates rank 1; and rank 3 or 4 if $RI^{(1)}$ indicates rank 3. In yet another example, for $N_p=8$, 3-bit $RI^{(2)}$ indicates rank 1-8.

TABLE 29

Configurable hybrid configurations; $RI^{(1)} = \log_2(N_P/2)$ bit and $RI^{(2)} = \log_2(N_P)$ bit

| Class A: Codebook-Config | Class B: $N_P$ | # $RI^{(1)}$ bits | Class A codebook rank | # $RI^{(2)}$ bits |
|---|---|---|---|---|
| 1, 2, 3 or 4 | 2 | 0 | 1 | 1 |
|  | 4 | 1 | 1, 3 | 2 |
|  | 8 | 2 | 1, 3, 5, 7 | 3 |

TABLE 30

Configurable hybrid configurations; both $RI^{(1)} = 0$ or 1 bit and $RI^{(2)} = \log_2(N_P)$ bit

| Class A: Codebook-Config | Class B: $N_P$ | # $RI^{(1)}$ bits | Alt 0: Class A codebook rank | # $RI^{(2)}$ bits |
|---|---|---|---|---|
| 1, 2, 3 or 4 | 2 | 0 | 1 | 1 |
|  | 4 | 1 | 1, 3 | 2 |
|  | 8 | 1 | 1, 3 | 3 |

| Class A: Codebook-Config | Class B: $N_P$ | # $RI^{(1)}$ bits | Alt 1: Class A codebook rank | # $RI^{(2)}$ bits |
|---|---|---|---|---|
| 1, 2, 3 or 4 | 2 | 0 | 1 | 1 |
|  | 4 | 1 | 1, 3 | 2 |
|  | 8 | 1 | 1, 7 | 3 |

TABLE 31

Configurable hybrid configurations; $RI^{(1)} = \log_2(N_P/2)$ bit and $RI^{(2)} = 1$ bit

| Class A: Codebook-Config | Class B: $N_P$ | # $RI^{(1)}$ bits | Class A codebook rank | # $RI^{(2)}$ bits |
|---|---|---|---|---|
| 1, 2, 3 or 4 | 2 | 0 | 1 | 1 |
|  | 4 | 1 | 1, 3 | 1 |
|  | 8 | 2 | 1, 3, 5, 7 | 1 |

TABLE 32

Configurable hybrid configurations; $RI^{(1)} = \log_2(N_P/2)$ bit and $RI^{(2)} = 1$ or 3 bit

| Class A: Codebook-Config | Class B: $N_P$ | # $RI^{(1)}$ bits | Alt 0: Class A codebook rank | # $RI^{(2)}$ bits |
|---|---|---|---|---|
| 1, 2, 3 or 4 | 2 | 0 | 1 | 1 |
|  | 4 | 1 | 1, 3 | 1 |
|  | 8 | 2 | 1, 3, 5, 7 | 3 |

In some embodiments, a UE is configured with hybrid configuration 0-c in Table 13 with reporting content: for the 1$^{st}$ eMIMO-Type (CLASS A), Um and x-bit RV) are reported, while $CQI^{(1)}$ and $i2^{(1)}$ are not reported, where if UE supports up to 2 layers, x=0, if UE supports up to 4 layer, x=1 where $RI^{(1)}=\{1, 3\}$, or if UE supports up to 8 layer, x=2 where $RI^{(1)}=\{1, 3, 5, 7\}$; and for the 2$^{nd}$ eMIMO-Type (CLASS B K=1), $CQI^{(2)}$, $PMI^{(2)}$), $RI^{(2)}$ are Reported. Note Superscript (y) represents the y-th eMIMO-Type, where y=1, 2.

In some embodiments, a UE is configured with hybrid configuration 0-c in Table 13 with no inter-dependence between CSI calculations across two eMIMO-Types.

In some embodiments, a UE is configured with hybrid configuration 0-c in Table 13 with rank indication according to one of Table 33 to Table 37, where the Tables show the fields and the corresponding bit width for the rank indication feedback for PDSCH transmissions associated with transmission mode 3, transmission mode 4, transmission mode 8 configured with PMI/RI reporting, transmission mode 9 configured with PMI/RI reporting with 2/4/8 antenna ports, transmission mode 10 configured with PMI/RI reporting with 2/4/8 antenna ports, and transmission mode 9/10 configured with PMI/RI reporting with 2/4/8 antenna ports and higher layer parameter eMIMO-Type, and eMIMO-Type is set to 'CLASS B' with K=1, transmission mode 9/10 configured with PMI/RI reporting with 8/12/16 antenna ports and higher layer parameter eMIMO-Type, and eMIMO-Type is set to 'CLASS A', and transmission mode 9/10 configured without PMI reporting and higher layer parameter eMIMO-Type, and eMIMO-Type is set to 'CLASS B' with K=1 with 2/4/8 antenna ports.

TABLE 33

Fields for rank indication feedback

| | | 4 antenna ports | | 8/12/16/20/24/28/32 antenna ports | |
|---|---|---|---|---|---|
| Field | 2 antenna ports | Max 1 or 2 layers | Max 4 layers | Max 1 or 2 layers | Max 4 layers | Max 8 layers |
| Rank indication | 1 | 1 | 2 | 1 | 2 | 3 |
| Rank | {1, 2} | {1, 2} | {1, 2, 3, 4} | {1, 2} | {1, 2, 3, 4} | {1, 2, 3, 4, 5, 6, 7, 8} |

TABLE 34

Fields for rank indication feedback

| | | 4 antenna ports | | 8/12/16/20/24/28/32 antenna ports | |
|---|---|---|---|---|---|
| Field | 2 antenna ports | Max 1 or 2 layers | Max 4 layers | Max 1 or 2 layers | Max 4 layers | Max 8 layers |
| Rank indication | 0 | 0 | 1 | 0 | 1 | 1 |
| Rank | {1} | {1} | {1, 3} | {1} | {1, 3} | {1, 3, 5, 7} |

TABLE 35

Fields for rank indication feedback

| | | 4 antenna ports | | 8/12/16/20/24/28/32 antenna ports | |
|---|---|---|---|---|---|
| Field | 2 antenna ports | Max 1 or 2 layers | Max 4 layers | Max 1 or 2 layers | Max 4 layers | Max 8 layers |
| Rank indication | 0 | 0 | 1 | 0 | 1 | 1 |
| Rank | {1} | {1} | {1, 3} | {1} | {1, 3} | {1, 3} |

TABLE 36

Fields for rank indication feedback

| Field | Bit width | | | | | |
|---|---|---|---|---|---|---|
| | 2 antenna ports | 4 antenna ports | | 8/12/16/20/24/28/32 antenna ports | | |
| | | Max 1 or 2 layers | Max 4 layers | Max 1 or 2 layers | Max 4 layers | Max 8 layers |
| Rank indication | 0 | 0 | 1 | 0 | 1 | 1 |
| Rank | {1} | {1} | {1, 3} | {1} | {1, 3} | {1, 7} |

TABLE 37

Fields for rank indication feedback

| Field | Bit width | | | | | |
|---|---|---|---|---|---|---|
| | 2 antenna ports | 4 antenna ports | | 8/12/16/20/24/28/32 antenna ports | | |
| | | Max 1 or 2 layers | Max 4 layers | Max 1 or 2 layers | Max 4 layers | Max 8 layers |
| Rank indication | 0 | 0 | 2 | 0 | 2 | 2 |
| Rank | {1} | {1} | {1, 2, 3, 4} | {1} | {1, 2, 3, 4} | {1, 3, 5, 7} |

In some embodiments, a UE is configured with a hybrid CSI reporting in which the 1st eMIMO-Type is Class B, $K_1>1$ and the 2nd eMIMO-Type is Class B, $K_2=1$. The CSI reported in the first Class B eMIMO-Type is either: alternative 2-a (Table 13): CRI and associated PMI (and $RI^{(1)}$); or alternative 2-b (Table 13): PMI (and RI(1), if applicable) for each CSI-RS resource, and that reported in the 2nd Class B eMIMO-Type includes $RI^{(2)}$, CQI, and PMI.

In one example of embodiment 2-b, the 1st eMIMO-Type is associated with $K_1=2$ CSI-RS resources. An exemplary use case is to implement the so-called partial-port (non-precoded) CSI-RS where the $K_1=2$ CSI-RS resources are used to represent the two dimensions of two-dimensional antenna port layouts (FIG. 12 and FIG. 13).

Note that for the special case of one-dimensional (1D) antenna port layouts, only one dimension is present. Therefore, the 1st eMIMO-Type is associated with $K_1=1$ CSI-RS resource. With $K_1=2$ CSI-RS resources, the first of the two CSI-RS resources can be associated with the 1st antenna port dimension and the second of the two CSI-RS resources can be associated with the 2nd antenna port dimension. For instance, the first of the two CSI-RS resources can be associated with one of the rows (e.g. row 1) of antenna ports and the second of the two CSI-RS resources can be associated with one of the columns (e.g. column 1) of antenna ports. The 2nd CSI-RS resource is BF using the two reported PMIs in the 1st eMIMO-Type.

Figure 27:
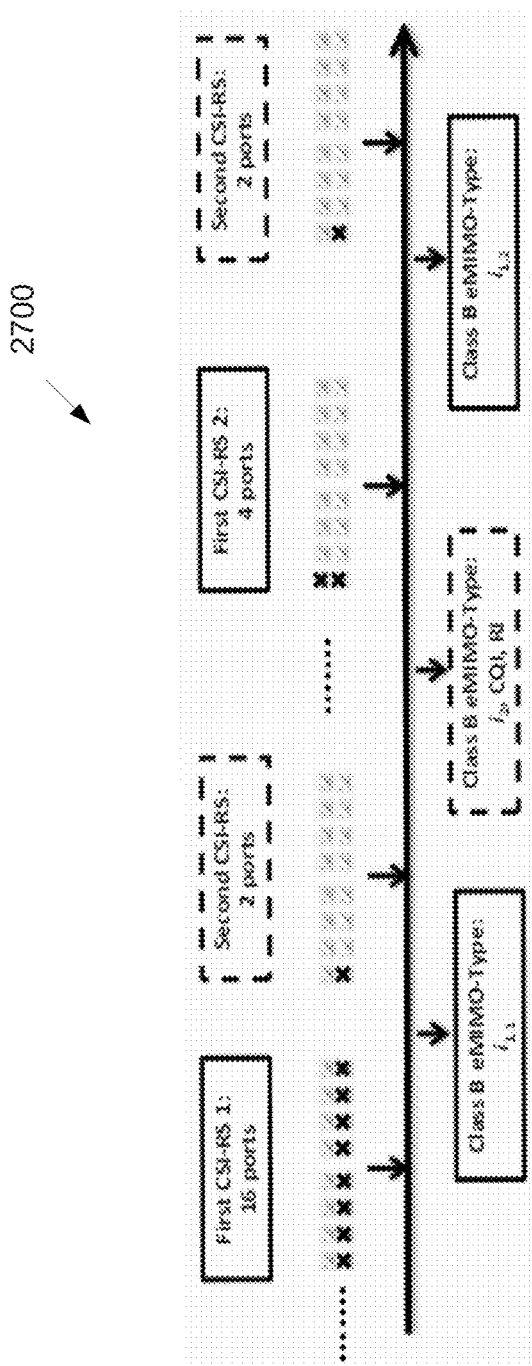
FIG. 27 illustrates an example hybrid CSI reporting according to embodiments of the present disclosure.

FIG. 27 illustrates an example hybrid CSI reporting 2700 according to embodiments of the present disclosure. An embodiment of the hybrid CSI reporting 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

An example of this scheme is shown in FIG. 27. As shown in FIG. 27, the first CSI-RS corresponds to "Class B $K_1=2$ eMIMO-Type" in which NP CSI-RS is transmitted from a subset (one row or one column) of antenna ports. There are two CSI-RS resources: first CSI-RS 1 is for the row and first CSI-RS 2 is for the column. The second CSI-RS corresponds to "Class B $K_2=1$ eMIMO-Type" in which BF CSI-RS is transmitted from two beam-formed ports which are beam-formed using the beams associated with the first PMI. The UE derives: 1st CSI: $i_{1,1}$ of the first PMI pair $(i_{1,1}, i_{1,2})$ using the NP CSI-RS corresponding to the row and a 16 port codebook, and $i_{1,2}$ of the first PMI pair $(i_{1,1}, i_{1,2})$ using the NP CSI-RS corresponding to the column and a 4 port codebook; and 2nd CSI: the second PMI $i_2$, CQI and RI using BF CSI-RS and a 2 port codebook.

TABLE 38

Codebook alternatives for 1st Class B eMIMO-Type in alternative 2-b (Table 13)

| Codebook Type | 1st dimension codebook | 2nd dimension codebook |
|---|---|---|
| 0 | Co-pol | Co-pol |
| 1 | Co-pol | Dual-pol |
| 2 | Dual-pol | Co-pol |
| 3 | Dual-pol | Dual-pol |

Figure 28:
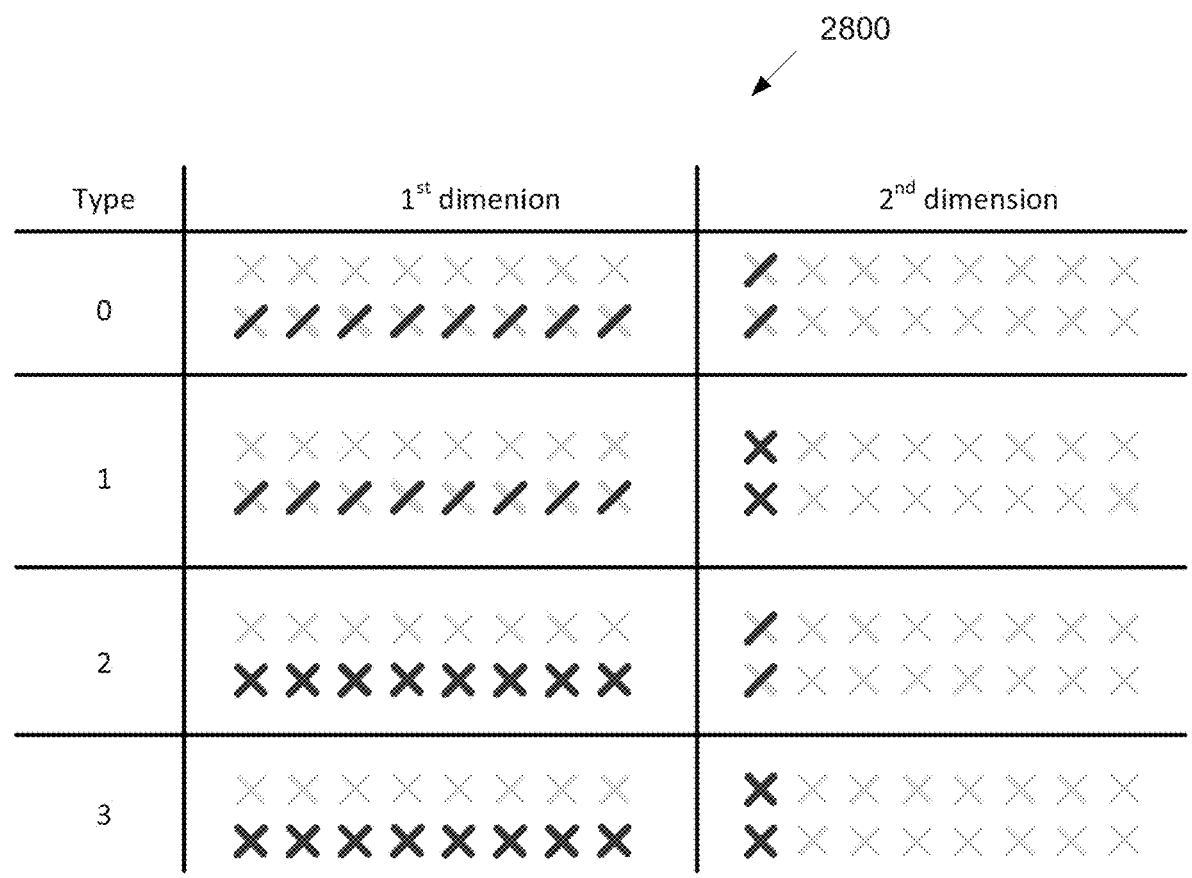
FIG. 28 illustrates an example codebook types for Class B $K_1=2$ eMIMO-Type according to embodiments of the present disclosure.

FIG. 28 illustrates an example codebook types for Class B $K_1=2$ eMIMO-Type 2800 according to embodiments of the present disclosure. An embodiment of the codebook types for Class B $K_1=2$ eMIMO-Type 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

In some embodiments, the codebook for the 1st Class B $K_1=2$ eMIMO-Type is one of the four types as tabulated in Table 38 and shown in FIG. 28, where there are two types of codebooks for the two dimensions. In one example, the co-pol codebook is used for PMI calculation if the CSI-RS is transmitted from the antenna ports with one polarization only (e.g. +45 or −45). In another example, the dual-pol codebook is used for PMI calculation if the CSI-RS is transmitted from the antenna ports with both polarizations. Examples of dual-pol codebooks include Rel. 10 8-Tx, Rel. 12 4-Tx, and Rel. 13 Class A codebooks.

An example of the 1st eMIMO-Type codebook for different antenna port layouts shown in FIG. 12 and FIG. 13 is shown in Table 39. In this table, codebook types 1 and 2 (Table 38) is assumed, i.e. the co-pol codebook is configured in one of the two dimensions, and the other dimension is configured with a dual-pol (legacy) codebook. The other combinations of the 1st eMIMO-Type codebook can be constructed similarly.

TABLE 39

1st eMIMO-Type codebook for 1st and 2nd dimensions

| Number of CSI-RS antenna ports, P | ($N_1$, $N_2$) | ($N_1$, $P_1$) | 1st dimension | ($N_2$, $P_2$) | 2nd dimension |
|---|---|---|---|---|---|
| 8  | (2, 2)  | (2, 2)  | Rel. 12 4-Tx W1 | (2, 1)  | Co-pol 2-Tx |
| 12 | (2, 3)  | (2, 2)  | Rel. 12 4-Tx W1 | (3, 1)  | Co-pol 3-Tx |
|    | (3, 2)  | (3, 1)  | Co-pol 3-Tx     | (2, 2)  | Rel. 12 4-Tx W1 |
| 16 | (2, 4)  | (2, 1)  | Co-pol 2-Tx     | (4, 2)  | Rel. 10 8-Tx W1 |
|    | (4, 2)  | (4, 2)  | Rel. 10 8-Tx W1 | (2, 1)  | Co-pol 2-Tx |
|    | (8, 1)  | (8, 1)  | Co-pol 8-Tx     | —       | — |
| 20 | (1, 10) | —       | —               | (10, 1) | Co-pol 10-Tx |
|    | (2, 5)  | (2, 2)  | Rel. 12 4-Tx W1 | (5, 1)  | Co-pol 5-Tx |
|    | (5, 2)  | (5, 1)  | Co-pol 5-Tx     | (2, 2)  | Rel. 12 4-Tx W1 |
|    | (10, 1) | (10, 1) | Co-pol 10-Tx    | —       | — |
| 24 | (1, 12) | —       | —               | (12, 1) | Co-pol 12-Tx |
|    | (2, 6)  | (2, 2)  | Rel. 12 4-Tx W1 | (6, 1)  | Co-pol 6-Tx |
|    | (3, 4)  | (3, 1)  | Co-pol 3-Tx     | (4, 2)  | Rel. 10 8-Tx W1 |
|    | (4, 3)  | (4, 2)  | Rel. 10 8-Tx W1 | (3, 1)  | Co-pol 3-Tx |
|    | (6, 2)  | (6, 1)  | Co-pol 6-Tx     | (2, 2)  | Rel. 12 4-Tx W1 |
|    | (12, 1) | (12, 1) | Co-pol 12-Tx    | —       | — |
| 28 | (1, 14) | —       | —               | (14, 1) | Co-pol 14-Tx |
|    | (2, 7)  | (2, 2)  | Rel. 12 4-Tx W1 | (7, 1)  | Co-pol 7-Tx |
|    | (7, 2)  | (7, 1)  | Co-pol 7-Tx     | (2, 2)  | Rel. 12 4-Tx W1 |
|    | (14, 1) | (14, 1) | Co-pol 14-Tx    | —       | — |
| 32 | (1, 16) | —       | —               | (16, 1) | Co-pol 16-Tx |
|    | (2, 8)  | (2, 1)  | Co-pol 2-Tx     | (8, 2)  | Rel. 13 16-Tx W1 |
|    | (4, 4)  | (4, 2)  | Rel. 10 8-Tx W1 | (4, 1)  | Co-pol 4-Tx |
|    | (8, 2)  | (8, 2)  | Rel. 13 16-Tx W1| (2, 1)  | Co-pol 2-Tx |
|    | (16, 1) | (16, 1) | Co-pol 16-Tx    | —       | — |

In one example of 1, the co-pol codebook is rank 1 and the corresponding PMI indicates a single beam. An example of such a codebook is shown in Table 40, where the dimension d=1, 2, and $$u_{m_d} = \begin{bmatrix} 1 & e^{j\frac{2\pi m_d}{O_d N_d}} & \ldots & e^{j\frac{2\pi m_d (N_d - 1)}{O_d N_d}} \end{bmatrix}^T.$$

TABLE 40

$W_1$ Co-pol Codebook for 1-layer CSI reporting using antenna ports 15 to 14 + P

| $m_d$ | Precoder |
|---|---|
| $0, 1, \ldots, O_d N_d - 1$ | $W_{m_d}^{(1)} = \dfrac{u_{m_d}}{\sqrt{N_d}}$ |

The overall rank of the 1st eMIMO-Type depends on the co-pol codebook type (Table 39): for Codebook Type=0, the overall rank is 1. So, RV) is not reported; and for Codebook Type=1, 2, the overall rank can be >1 if rank >1 is reported from the dimension associated with the dual-pol codebook.

In another example of 2, the co-pol codebook is rank >1 and the corresponding PMI indicates orthogonal beams. An example of rank-2 co-pol codebook is shown in Table 41, where the dimension d=1, 2.

TABLE 41

$W_1$ Co-pol Codebook for 2-layer CSI reporting using antenna ports 15 to 14 + P

| $N_1, N_2 > 1$ | |
|---|---|
| $m_d$ | Precoder |
| $0, 1, \ldots, O_d N_d - 1$ | $W_{m_d}^{(2)} = \dfrac{1}{\sqrt{2N_d}} [u_{m_d} \quad u_{m_d + O_d}]$ |

| $N_1$ or $N_2 = 1$ | |
|---|---|
| $m_d$ | Precoder |
| $0, 1, \ldots, O_d N_d - 1$ | $W_{m_d}^{(2)} = \dfrac{1}{\sqrt{2N_d}} [u_{m_d} \quad u_{m_d + O_d}]$ |
| $O_d N_d, O_d N_d + 1, \ldots, 2 O_d N_d - 1$ | $W_{m_d}^{(2)} = \dfrac{1}{\sqrt{2N_d}} [u_{m_d} \quad u_{m_d + 2O_d}]$ |
| $2 O_d N_d, O_d N_d + 1, \ldots, 3 O_d N_d - 1$ | $W_{m_d}^{(2)} = \dfrac{1}{\sqrt{2N_d}} [u_{m_d} \quad u_{m_d + 3O_d}]$ |

In yet another example of 3, the co-pol codebook is rank 1 and the corresponding PMI indicates a group of beams. An example of such a codebook is shown in Table 42 where the dimension d=1, 2, and the type of beam group is indicated by the higher layer RRC parameter Codebook-Config.

TABLE 42

$W_1$ Co-pol Codebook for 1-layer CSI reporting using antenna ports 15 to 14 + P

| Value of Codebook-Config | $m_d$ | Precoder |
|---|---|---|
| 1 | $0, 1, \ldots, O_d N_d - 1$ | $W_{m_d}^{(1)} = \dfrac{u_{m_d}}{\sqrt{N_d}}$ |
| 2 | $0, 1, \ldots, \dfrac{O_d N_d}{2} - 1$ | $W_{m_d}^{(1)} = \dfrac{1}{\sqrt{N_d}} [u_{2m_d} \quad u_{2m_d+1}]$ |
| 3 | $0, 1, \ldots, \dfrac{O_d N_d}{2} - 1$ | $W_{m_d}^{(1)} = \dfrac{1}{\sqrt{N_d}} [u_{2m_d} \quad u_{2m_d+1} \quad u_{2m_d+2} \quad u_{2m_d+3}]$, if $N_d \geq N_e$ $e = \{1, 2\} - d$ |
| | | $W_{m_d}^{(1)} = \dfrac{1}{\sqrt{N_d}} [u_{2m_d} \quad u_{2m_d+1}]$, if $N_d < N_e$ $e = \{1, 2\} - d$ |

TABLE 42-continued

W₁ Co-pol Codebook for 1-layer CSI reporting using antenna ports 15 to 14 + P

| Value of Codebook-Config | $m_d$ | Precoder |
|---|---|---|
| 4 | $0, 1, \ldots, \dfrac{O_d N_d}{2} - 1$ | $W_{m_d}^{(1)} = \dfrac{1}{\sqrt{N_d}} [\, u_{2m_d} \;\; u_{2m_d+1} \;\; u_{2m_d+2} \;\; u_{2m_d+3} \,]$, if $N_d \geq N_e$ $e = \{1, 2\} - d$ $W_{m_d}^{(1)} = \dfrac{u_{2m_d}}{\sqrt{N_d}}$, if $N_d < N_e$ $e = \{1, 2\} - d$ |

In yet another example of 4, the co-pol codebook is rank >1 and the corresponding PMI indicates orthogonal beam groups. An example of such a rank—2 codebook is shown in Table 42, where the dimension d=1, 2, and the type of beam group is indicated by the higher layer RRC parameter Codebook-Config. An example of values for parameters ($s_1$, $s_2$) and ($p_1$, $p_2$) in the Table is shown in Table 43.

TABLE 43

Example parameter values

| Codebook-Config | ($s_1$, $s_2$) | ($p_1$, $p_2$) |
|---|---|---|
| 1 | $(1, 1)$ | $(-, -)$ |
| 2 | $\left(\dfrac{o_1}{2}, \dfrac{o_2}{2}\right)$ | $\left(\dfrac{o_2}{4}, \dfrac{o_2}{4}\right)$ |
| 3 | $\left(O_1, \dfrac{o_2}{2}\right)$ | $\left(\dfrac{o_2}{4}, \dfrac{o_2}{4}\right)$ |
| 4 | $\left(O_1, \dfrac{o_2}{4}\right)$ | $\left(\dfrac{o_2}{4}, -\right)$ |

TABLE 44

W₁ Co-pol Codebook for 2-layer CSI reporting using antenna ports 15 to 14 + P $N_1, N_2 > 1$

| $m_d$ | Precoder |
|---|---|
| Value of Codebook-Config: 1 | |
| $0, 1, \ldots, O_d N_d - 1$ | $W_{m_d}^{(2)} = \dfrac{1}{\sqrt{2N_d}} [\, u_{m_d} \;\; u_{m_d + O_d} \,]$ |
| Value of Codebook-Config: 2 | |
| $0, 1, \ldots, \dfrac{O_d N_d}{s_d} - 1$ | $W_{m_d}^{(2)} = \dfrac{1}{\sqrt{2N_d}} [\, u_{s_d m_d} \;\; u_{s_d m_d + p_d} \;\; u_{s_d m_d + O_d} \;\; u_{s_d m_d + O_d + p_d} \,]$ |
| Value of Codebook-Config: 3 | |
| $0, 1, \ldots, \dfrac{O_d N_d}{s_d} - 1$ | $W_{m_d}^{(2)} = \dfrac{1}{\sqrt{2N_d}} [\, u_{s_d m_d} \;\; u_{s_d m_d + p_d} \;\; u_{s_d m_d + 2p_d} \;\; u_{s_d m_d + 3p_d} \;\; u_{s_d m_d + O_d} \;\; u_{s_d m_d + O_d + p_d} \;\; u_{s_d m_d + O_d + 2p_d} \;\; u_{s_d m_d + O_d + 3p_d} \,]$, if $N_d \geq N_e$ $e = \{1, 2\} - d$ $W_{m_d}^{(1)} = \dfrac{1}{\sqrt{N_d}} [\, u_{s_d m_d} \;\; u_{s_d m_d + 1} \,]$, if $N_d < N_e$ $e = \{1, 2\} - d$ |

TABLE 44-continued $W_1$ Co-pol Codebook for 2-layer CSI reporting using antenna ports 15 to 14 + P

Value of Codebook-Config: 4

$0, 1, \ldots, \frac{O_d N_d}{s_d} - 1 \qquad W^{(2)}_{m_d} = \frac{1}{\sqrt{2N_d}} [\, u_{s_d m_d} \;\; u_{s_d m_d + p_d} \;\; u_{s_d m_d + 2p_d} \;\; u_{s_d m_d + 3p_d} \;\; u_{s_d m_d + O_d} \;\; u_{s_d m_d + O_d + p_d} \;\; u_{s_d m_d + O_d + 2p_d} \;\; u_{s_d m_d + O_d + 3p_d} \,],$ if $N_d \geq N_e$ e = {1, 2} – d $W^{(1)}_{m_d} = \frac{u_{s_d m_d}}{\sqrt{N_d}}$, if $N_d < N_e$ e = {1, 2} – d

$N_1$ or $N_2$ = 1

| $m_d$ | Precoder |
|---|---|

Value of Codebook-Config: 1

$0, 1, \ldots, O_d N_d - 1 \qquad W^{(2)}_{m_d} = \frac{1}{\sqrt{2N_d}} [\, u_{m_d} \;\; u_{m_d + O_d} \,]$ $O_d N_d, O_d N_d + 1, \ldots, 2 O_d N_d - 1 \qquad W^{(2)}_{m_d} = \frac{1}{\sqrt{2N_d}} [\, u_{m_d} \;\; u_{m_d + 2 O_d} \,]$ $2 O_d N_d, O_d N_d + 1, \ldots, 3 O_d N_d - 1 \qquad W^{(2)}_{m_d} = \frac{1}{\sqrt{2N_d}} [\, u_{m_d} \;\; u_{m_d + 3 O_d} \,]$

Value of Codebook-Config: 4

$m_d: 0, 1, \ldots, \frac{O_d N_d}{s_d} - 1$ $W^{(2)}_{m_d} = \frac{1}{\sqrt{2N_d}} [\, u_{s_d m_d} \;\; u_{s_d m_d + p_d} \;\; u_{s_d m_d + 2p_d} \;\; u_{s_d m_d + 3p_d} \;\; u_{s_d m_d + O_d} \;\; u_{s_d m_d + O_d + p_d} \;\; u_{s_d m_d + O_d + 2p_d} \;\; u_{s_d m_d + O_d + 3p_d} \,],$ if $N_d \geq N_e$ e = {1, 2} – d $W^{(1)}_{m_d} = \frac{u_{s_d m_d}}{\sqrt{N_d}}$, if $N_d < N_e$ e = {1, 2} – d $m_d: \frac{O_d N_d}{s_d}, \frac{O_d N_d}{s_d} + 1, \ldots, \frac{2 O_d N_d}{s_d} - 1$ $W^{(2)}_{m_d} = \frac{1}{\sqrt{2N_d}} [\, u_{s_d m_d} \;\; u_{s_d m_d + p_d} \;\; u_{s_d m_d + 2p_d} \;\; u_{s_d m_d + 3p_d} \;\; u_{s_d m_d + 2 O_d} \;\; u_{s_d m_d + 2 O_d + p_d} \;\; u_{s_d m_d + 2 O_d + 2p_d} \;\; u_{s_d m_d + 2 O_d + 3p_d} \,],$ if $N_d \geq N_e$ e = {1, 2} – d $W^{(1)}_{m_d} = \frac{u_{s_d m_d}}{\sqrt{N_d}}$, if $N_d < N_e$ e = {1, 2} – d $m_d: \frac{2 O_d N_d}{s_d}, \frac{2 O_d N_d}{s_d} + 1, \ldots, \frac{3 O_d N_d}{s_d} - 1$ $W^{(2)}_{m_d} = \frac{1}{\sqrt{2N_d}} [\, u_{s_d m_d} \;\; u_{s_d m_d + p_d} \;\; u_{s_d m_d + 2p_d} \;\; u_{s_d m_d + 3p_d} \;\; u_{s_d m_d + 3 O_d} \;\; u_{s_d m_d + 3 O_d + p_d} \;\; u_{s_d m_d + 3 O_d + 2p_d} \;\; u_{s_d m_d + 3 O_d + 3p_d} \,],$ if $N_d \geq N_e$ e = {1, 2} – d $W^{(1)}_{m_d} = \frac{u_{s_d m_d}}{\sqrt{N_d}}$, if $N_d < N_e$ e = {1, 2} – d In some embodiments, in the case of 1st Class B eMIMO-Type with $K_1$=2 CSI-RS resources, two RIs can be reported in two CSI reports associated with the two CSI-RS resources. Let us denote the two RIs as $RI^{(1,1)}$ and $RI^{(1,2)}$. In one example of 2-b-a, $RI^{(1,1)}$ and $RI^{(1,2)}$ are not reported. There are two sub-alternatives: $RI^{(1,1)}$ and $RI^{(1,2)}$ are fixed, for example $RI^{(1,1)}$=$RI^{(1,2)}$=1 or 8, or $RI^{(1,1)}$=1, $RI^{(1,2)}$=8, or $RI^{(1,1)}$=8, $RI^{(1,2)}$=1; and $RI^{(1,1)}$ and $RI^{(1,2)}$ are configured (via RRC signaling). In another example of 2-b-b, only $RI^{(1,1)}$ is reported, where the reported $RI^{(1,1)}$ can either be: restricted, for example to rank {1, 2} for co-pol and {1, 3} for dual-pol (1-bit $RI^{(1,1)}$), or {1, 2, 3, 4} for co-pol and {1, 3, 5, 7} for dual-pol (2-bit $RI^{(1,1)}$); or unrestricted, for example to rank 1-8 (3-bit $RI^{(1,1)}$). In yet another example, there are two sub-alternatives for $RI^{(1,2)}$: $RI^{(1,2)}$ is fixed, for example, $RI^{(1,2)}$=1 or 8; and $RI^{(1,2)}$ is configured (via RRC signaling). In yet another example of 2-b-c: Only $RI^{(1,2)}$ is reported, where the reported $RI^{(1,2)}$ can either be: restricted, for example to rank {1,2} for co-pol and {1,3} for dual-pol (1-bit $RI^{(1,2)}$), or {1, 2, 3, 4} for co-pol and {1, 3, 5, 7} for dual-pol (2-bit $RI^{(1,2)}$); or unrestricted, for example to rank 1-8 (3-bit $RI^{(1,2)}$), where there are two sub-alternatives for $RI^{(1,1)}$: $RI^{(1,1)}$ is fixed, for example, $RI^{(1,1)}=1$ or 8; and $RI^{(1,1)}$ is configured (via RRC signaling). In yet another example of 2-b-d, both $RI^{(1,1)}$ and $RI^{(1,2)}$ are reported, where one or both of them are restricted or unrestricted. Two examples of rank configurations in this case are shown in Table 45 and Table 46. Note that the maximum rank depends on the antenna port layouts (i.e., $N_1$, $N_2$ values) and the type of codebook (co-pol or dual-pol). In general, the maximum rank is $N_d$ for co-pol and $2N_d$ for dual-pol where d=1, 2.

TABLE 45

Example rank combinations for $(N_1, N_2) = (8, 2)$

| Rank config. | $RI^{(1,1)}$ | | | | $RI^{(1,2)}$ | | | |
| --- | --- | --- | --- | --- | --- | --- | --- | --- |
| | Type | Co-pol | Dual-pol | #bits | Type | Co-pol | #bits | Dual-pol | #bits |
| 0 | Restricted | {1, 2} | {1, 3} | 1 | Restricted | {1, 2} | 1 | {1, 3} | 1 |
| 1 | | {1, 2, 3, 4} | {1, 3, 5, 7} | 2 | | | | | |
| 2 | Restricted | {1, 2} | {1, 3} | 1 | Unrestricted | {1, 2} | 1 | {1, 2, 3, 4} | 2 |
| 3 | | {1, 2, 3, 4} | {1, 3, 5, 7} | 2 | | | | | |
| 4 | Unrestricted | {1, 2, ..., 8} | {1, 2, ..., 8} | 3 | Restricted | {1, 2} | 1 | {1, 3} | 1 |
| 5 | Unrestricted | {1, 2, ..., 8} | {1, 2, ..., 8} | 3 | Unrestricted | {1, 2} | 1 | {1, 2, 3, 4} | 2 |

TABLE 46

Example rank combinations $(N_1, N_2) = (8, 8)$

| Rank config. | $RI^{(1,1)}$ | | | | $RI^{(1,2)}$ | | | |
| --- | --- | --- | --- | --- | --- | --- | --- | --- |
| | Type | Co-pol | Dual-pol | #bits | Type | Co-pol | Dual-pol | #bits |
| 0 | Restricted | {1, 2} | {1, 3} | 1 | Restricted | {1, 2} | {1, 3} | 1 |
| 1 | | {1, 2, 3, 4} | {1, 3, 5, 7} | 2 | | {1, 2} | {1, 3} | 1 |
| 2 | | {1, 2} | {1, 3} | 1 | | {1, 2, 3, 4} | {1, 3, 5, 7} | 2 |
| 3 | | {1, 2, 3, 4} | {1, 3, 5, 7} | 2 | | {1, 2, 3, 4} | {1, 3, 5, 7} | 2 |
| 4 | Restricted | {1, 2} | {1, 3} | 1 | Unrestricted | {1, 2, ..., 8} | {1, 2, ..., 8} | 3 |
| 5 | | {1, 2, 3, 4} | {1, 3, 5, 7} | 2 | | | | |
| 6 | Unrestricted | {1, 2, ..., 8} | {1, 2, ..., 8} | 3 | Restricted | {1, 2} | {1, 3} | 1 |
| 7 | | | | | | {1, 2, 3, 4} | {1, 3, 5, 7} | 2 |
| 8 | Unrestricted | {1, 2, ..., 8} | {1, 2, ..., 8} | 3 | Unrestricted | {1, 2, ..., 8} | {1, 2, ..., 8} | 3 |

Note that for 1D antenna port layouts, only alternatives 2-b-a and 2-b-b are applicable (assuming antenna ports are in the 1st dimension). The overall rank of the 1st eMIMO-Type $RI^{(I)}$ depends on the reported $RI^{(1,1)}$ and $RI^{(1,2)}$. For example, $1 \leq RI^{(1)} \leq \max(RI^{(1,1)}, RI^{(1,1)})$. Once $RI^{(1)}$ is determined from $RI^{(1,1)}$ and $RI^{(1,2)}$, all embodiments mentioned earlier in the present disclosure on dependent and independent reporting of $RI^{(1)}$ and $RI^{(2)}$ in Class A+Class B K=1 eMIMO-Types are applicable.

The present disclosure covers the use of all the above configurations or sub-configurations. It also covers the use of only a subset of all the above configurations or sub-configurations. If more than one configurations or sub-configurations are used, the choice of configuration or sub-configuration is performed via higher layer signaling.

For example, a subset of rank configurations is used to configure one hybrid configuration to the UE. An example of such a subset is shown in Table 47. As example use case for this is when the first dimension is co-polarized and the second dimension is dual-polarized. The number of configurations in the Table is 2, so 1-bit RRC signaling is required to configure one of the two rank configurations.

TABLE 47

Configurable rank configurations

| Rank configuration | $RI^{(1,1)}$ | | | $RI^{(1,2)}$ | | |
| --- | --- | --- | --- | --- | --- | --- |
| | Type | Co-pol | #bits | Type | Dual-pol | #bits |
| 0 | Restricted | {1, 2} | 1 | Restricted | {1, 3} | 1 |
| 1 | | {1, 2} | 1 | | {1, 3, 5, 7} | 2 |

A variation of the above example where only one rank configuration is supported can be described as follows. Two examples are given in Table 48 and Table 49 below where the number of bits for $RI^{(1,2)}$ is 1 and 2, respectively. In this case, an additional RRC parameter is not needed.

TABLE 48

Configurable rank configurations: $RI^{(1,2)} = 1$

| $RI^{(1,1)}$ | | | $RI^{(1,2)}$ | | |
|---|---|---|---|---|---|
| Type | Co-pol | #bits | Type | Dual-pol | #bits |
| Restricted | {1, 2} | 1 | Restricted | {1, 3} | 1 |

TABLE 49

Configurable rank configurations: $RI^{(1,2)} = 2$

| $RI^{(1,1)}$ | | | $RI^{(1,2)}$ | | |
|---|---|---|---|---|---|
| Type | Co-pol | #bits | Type | Dual-pol | #bits |
| Restricted | {1, 2} | 1 | Restricted | {1, 3, 5, 7} | 2 |

In some embodiments, in the case of 1st Class B eMIMO-Type with $K_1 > 1$ CSI-RS resources, $K_1$ RIs can be reported in $K_1$ CSI reports associated with the $K_1$ CSI-RS resources. Let us denote the two RIs as $RI^{(1,1)}, RI^{(1,2)}, \ldots, RI^{(1,K_1)}$. In one example of 2-b-a, $RI^{(1,1)}, RI^{(1,1)}, \ldots, RI^{(1,K_1)}$ are not reported. There are two sub-alternatives: $RI^{(1,1)}, RI^{(1,2)}, \ldots, RI^{(1,K_1)}$ are fixed, for example all of them are 1 or 8, or a subset ($S_1$) of reported RIs is fixed to 1 and another subset ($S_2$) to 8 where $S_1$ and $S_2$ are disjoint and their union covers all RIs; and $RI^{(1,1)}, RI^{(1,2)}, \ldots, RI^{(1,K_1)}$ are configured (via RRC signaling). In another example of 2-b-b, only a subset ($S_1$) of RIs is reported, where the reported $RI^{(1,x)}$ for x in $S_1$ can either be: restricted, for example to rank {1, 2} for co-pol and {1, 3} for dual-pol (1-bit $R^{(1,x)}$), or {1, 2, 3, 4} for co-pol and {1, 3, 5, 7} for dual-pol (2-bit $RI^{(1,x)}$); or unrestricted, for example to rank 1-8 (3-bit $RI^{(1,x)}$). Also, $RI^{(1,x)}$'s for all x in $S_1$ are either the same or can be different. There are two sub-alternatives for $RI^{(1,y)}$ for y not in $S_1$: $RI^{(1,1)}$ is fixed, for example, 1 or 8; and $RI^{(1,y)}$ is configured (via RRC signaling). Also, $RI^{(1,y)}$'s for all y not in $S_1$ are either the same or can be different. In yet another example of 2-b-d, all of $RI^{(1,1)}, RI^{(1,2)}, \ldots, RI^{(1,K_1)}$ are reported, where some or all of them are restricted or unrestricted. When the reported $RI^{(1,y)}$ for y in {1, 2, \ldots, $K_1$} is restricted, the reported $RI^{(1,y)}$ can be 1 bit indicating rank {1, 3} or {1, 2} or 2 bits indicating rank {1, 3, 5, 7} or {1, 2, 3, 4}. When the reported RI is unrestricted, them all possible ranks can be reported. For example, the reported RI can be 3 bits indicating rank 1-8.

The codebooks for $RI^{(1,1)}, RI^{(1,2)}, \ldots, RI^{(1,K_1)}$ reporting can be legacy (up to Rel. 13) codebooks or the co-pol codebook proposed in the present disclosure.

In some embodiments, a UE is configured with a hybrid CSI reporting in which the 1st eMIMO-Type is Class B, $K_1=1$ with $N_{P1}$ ports and the 2nd eMIMO-Type is Class B, $K_2=1$ with $N_{P2}$ ports, where $N_{P1}, N_{P2}=2, 4, 8$. The CSI reported in the first Class B eMIMO-Type is either: alternative 1-a (Table 13): PMI or alternative 1-b (Table 13): CQI, $RI^{(1)}$, PMI and that reported in the 2nd Class B eMIMO-Type includes $RI^{(2)}$, CQI, and PMI. The codebooks for the two eMIMO-Types can be according to one of the following alternatives: alt0: Rel. 13 Class B codebook; and alt1: One of Rel. 12 codebooks. There are two alternatives for configuring $N_{P1}, N_{P2}$: $N_{P1} = N_{P2}$; and $N_{P1} \ne N_{P2}$.

Depending on whether both or at least one of $RI^{(1)}$ and $RI^{(2)}$ are reported, there may be following alternatives (as shown in Table 13): 1-a: Only $RI^{(1)}$ is reported; 1-b: Only $RI^{(2)}$ is reported; and 1-c: Both $R^{(1)}$ and $RI^{(2)}$ are reported.

All embodiments on RI reporting alternatives (alternatives 0-a, 0-b, 0-c) for the case of Class A+Class B K=1 described earlier in the present disclosure are applicable in this case too.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for a channel state information (CSI) feedback in an advanced communication system, the UE comprising:
   a transceiver configured to receive, via a higher layer signaling from a base station (BS), CSI feedback configuration information for the CSI feedback including a spatial channel information indicator; and
   at least one processor configured to determine the spatial channel information indicator using a codebook that indicates a sum of a plurality of matrices by calculating the sum as a linear combination of the plurality of matrices, wherein each matrix is a product of a coefficient and an n-dimensional basis matrix as a representation of a downlink channel matrix, where n>1,
   wherein, the transceiver is further configured to transmit, to the BS, over an uplink channel, the CSI feedback including the spatial channel information indicator.

2. The UE of claim 1, wherein the spatial channel information indicator corresponds to a precoding matrix indicator (PMI) comprising a first PMI $i_1$ to indicate at least one of the plurality of matrices, and a second PMI $i_2$ to indicate weights to combine the plurality of matrices.

3. A user equipment (UE) for a channel state information (CSI) feedback in an advanced communication system, the UE comprising:
   a transceiver configured to receive, via a higher layer signaling from a base station (BS), CSI feedback configuration information for the CSI feedback including a spatial channel information indicator; and
   at least one processor configured to determine the spatial channel information indicator using a codebook that indicates a sum of a plurality of quantities, wherein each quantity is a product of a coefficient and a basis vector as a representation of at least one eigenvector of a covariance matrix of a downlink channel matrix,
   wherein, the transceiver is further configured to transmit, to the BS, over an uplink channel, the CSI feedback including the spatial channel information indicator,
   wherein the spatial channel information indicator comprises the at least one eigenvector corresponding to at least one transmit eigenvector derived using an eigen decomposition of an P×P transmit covariance matrix of an P×R downlink channel matrix, where P is a number of antenna ports at the BS and R is a number of antenna ports at the UE, and
   wherein the at least one transmit eigenvector is calculated as the following weighted linear combination of a plurality of transmit basis vectors:

$$e_{T,1} \approx \sum_{l=0}^{L_T-1} c_{T,l} b_{T,l}$$

where $b_{T,l}$ is an l-th transmit basis vector, $c_{T,l}$ is an l-th transmit weight, and $L_T$ is a number of the plurality of transmit basis vectors.

4. The UE of claim 1, wherein the coefficient comprises an amplitude and a phase,
wherein the amplitude is reported as a wideband component common for all subbands and a subband component for each subband, and
wherein reporting of the subband component of the amplitude is turned on or off based on the CSI feedback configuration information.

5. The UE of claim 1, wherein the spatial channel information indicator comprises at least one eigenvector corresponding to at least one transmit eigenvector and at least one receive eigenvector that are jointly derived using an eigen decomposition of a P×P transmit covariance matrix and an R×R receive covariance matrix of a P×R downlink channel matrix, where P is a number of antenna ports at the BS and R is a number of antenna ports at the UE, and
wherein the jointly derived at least one transmit eigenvector and at least one receive eigenvector are represented as the following weighted linear combination of a plurality of transmit and receive basis vectors:

$$e_{T,1} e_{R,1}^H \approx \sum_{l=0}^{L-1} c_l b_{T,l} b_{R,l}^H$$

where $b_{T,l}$ is an l-th transmit basis vector, L is a number of the plurality of transmit and receive basis vectors, $b_{R,l}$ is an l-th receive basis vector, $c_l$ is an l-th weight.

6. The UE of claim 1, wherein the spatial channel information indicator comprises at least one of a transmit covariance matrix or a receive covariance matrix based on the downlink channel matrix, wherein the transmit and receive covariance matrices are respectively represented as the following weighted linear combinations of a plurality of transmit basis matrices and a plurality of receive basis matrices:

$$E_T = \frac{1}{|f|} \sum_{k \in f} \left( (H_k^{(I)})(H_k^{(I)})^H \right) \approx \sum_{l=0}^{L_T-1} c_{T,l} b_{T,l} b_{T,l}^H; \text{ and}$$

$$E_R = \frac{1}{|f|} \sum_{k \in f} \left( (H_k^{(I)})^H (H_k^{(I)}) \right) \approx \sum_{l=0}^{L_R-1} c_{R,l} b_{R,l} b_{R,l}^H$$

where f is a set of frequency subcarriers, $H_k^{(I)}$ is a P×R downlink channel matrix at a frequency subcarrier k in the set f, $E_T$ is a transmit covariance matrix, $b_{T,l} b_{T,l}^H$ is an l-th transmit basis matrix, $c_{T,l}$ is an l-th transmit weight, $L_T$ is a number of the plurality of transmit basis matrices, $E_R$ is a receive covariance matrix, $b_{R,l} b_{R,l}^H$ is an l-th receive basis matrix, $c_{R,l}$ is an l-th receive weight, and $L_R$ is a number of a plurality of receive basis matrices.

7. The UE of claim 1, wherein:
the at least one processor is further configured to partition the spatial channel information indicator into multiple spatial channel information indicators each of which corresponds to a subset of antenna ports at the BS and comprises at least one of the downlink channel matrix, a covariance matrix of the downlink channel matrix, or at least one eigenvector of the covariance matrix of the downlink channel matrix, wherein the downlink channel matrix corresponds to the subset of antenna ports at the BS; and
the transceiver is further configured to transmit, over the uplink channel, the CSI feedback including the multiple spatial channel information indicators in multiple time instances.

8. A base station (BS) for a channel state information (CSI) feedback in an advanced communication system, the BS comprising:
a transceiver configured to:
transmit, via a higher layer signaling to a user equipment (UE), CSI feedback configuration information for the CSI feedback including a spatial channel information indicator; and
receive, from the UE, over an uplink channel, the CSI feedback including the spatial channel information indicator,
wherein the spatial channel information indicator is determined using a codebook that indicates a sum of a plurality of matrices, wherein the sum is calculated by the UE as a linear combination of the plurality of matrices, wherein each matrix is a product of a coefficient and an n-dimensional basis matrix as a representation of a downlink channel matrix, where n>1.

9. The BS of claim 8, wherein the spatial channel information indicator corresponds to a precoding matrix indicator (PMI) comprising a first PMI $i_1$ to indicate at least one of the plurality of matrices, and a second PMI $i_2$ to indicate weights to combine the plurality of matrices.

10. A base station (BS) for a channel state information (CSI) feedback in an advanced communication system, the BS comprising:
a transceiver configured to:
transmit, via a higher layer signaling to a user equipment (UE), CSI feedback configuration information for the CSI feedback including a spatial channel information indicator; and
receive, from the UE, over an uplink channel, the CSI feedback including the spatial channel information indicator,
wherein the spatial channel information indicator is determined using a codebook that indicates a sum of a plurality of quantities, wherein each quantity is a product of a coefficient and a basis vector as a representation of at least one eigenvector of a covariance matrix of a downlink channel matrix,
wherein the spatial channel information indicator comprises the at least one eigenvector corresponding to at least one transmit eigenvector derived using an eigen decomposition of an P×P transmit covariance matrix of an P×R downlink channel matrix, where P is a number of antenna ports at the BS and R is a number of antenna ports at the UE, and
wherein the at least one transmit eigenvector is calculated as the following weighted linear combination of a plurality of transmit basis vectors:

$$e_{T,1} \approx \sum_{l=0}^{L_T-1} c_{T,l} b_{T,l}$$

where $b_{T,l}$ is an l-th transmit basis vector, $c_{T,l}$ is an l-th transmit weight, and $L_T$ is a number of the plurality of transmit basis vectors.

11. The BS of claim 8, wherein the coefficient comprises an amplitude and a phase,
   wherein the amplitude is reported as a wideband component common for all subbands and a subband component for each subband, and
   wherein reporting of the subband component of the amplitude is turned on or off based on the CSI feedback configuration information.

12. The BS of claim 8, wherein the spatial channel information indicator comprises at least one eigenvector corresponding to at least one transmit eigenvector and at least one receive eigenvector that are jointly derived using an eigen decomposition of a P×P transmit covariance matrix and an R×R receive covariance matrix of a P×R downlink channel matrix, where P is a number of antenna ports at the BS and R is a number of antenna ports at the UE, and
   wherein the jointly derived at least one transmit eigenvector and at least one receive eigenvector are represented as the following weighted linear combination of a plurality of transmit and receive basis vectors:

$$e_{T,1} e_{R,1}^H \approx \sum_{l=0}^{L-1} c_l b_{T,l} b_{R,l}^H$$

where $b_{T,l}$ is an l-th transmit basis vector, L is a number of the plurality of transmit and receive basis vectors, $b_{R,l}$ is an l-th receive basis vector, $c_l$ is an l-th weight.

13. The BS of claim 8, wherein the spatial channel information indicator comprises at least one of a transmit covariance matrix or a receive covariance matrix based on the downlink channel matrix, wherein the transmit and receive covariance matrices are respectively represented as the following weighted linear combinations of a plurality of transmit basis matrices and a plurality of receive basis matrices:

$$E_T = \frac{1}{|f|} \sum_{k \in f} \left( (H_k^{(l)})(H_k^{(l)})^H \right) \approx \sum_{l=0}^{L_T-1} c_{T,l} b_{T,l} b_{T,l}^H; \text{ and}$$

$$E_R = \frac{1}{|f|} \sum_{k \in f} \left( (H_k^{(l)})^H (H_k^{(l)}) \right) \approx \sum_{l=0}^{L_R-1} c_{R,l} b_{R,l} b_{R,l}^H$$

where f is a set of frequency subcarriers, $H_k^{(l)}$ is a P×R downlink channel matrix at a frequency subcarrier k in the set f, $E_T$ is a transmit covariance matrix, $b_{T,l} b_{T,l}^H$ is an l-th transmit basis matrix, $c_{T,l}$ is an l-th transmit weight, $L_T$ is a number of the plurality of transmit basis matrices, $E_R$ is a receive covariance matrix, $b_{R,l} b_{R,l}^H$ is an l-th receive basis matrix, $c_{R,l}$ is an l-th receive weight, and $L_R$ is a number of a plurality of receive basis matrices.

14. A method for a channel state information (CSI) feedback in an advanced communication system, the method comprising:
   receiving, via a higher layer signaling from a base station (BS), CSI feedback configuration information for the CSI feedback including a spatial channel information indicator;
   determining, by a user equipment (UE), the spatial channel information indicator using a codebook that indicates a sum of a plurality of matrices, the sum calculated by the UE as a linear combination of the plurality of matrices, wherein each matrix is a product of a coefficient and an n-dimensional basis matrix as a representation of a downlink channel matrix, where n>1; and
   transmitting, to the BS, over an uplink channel, the CSI feedback including the spatial channel information indicator.

15. The method of claim 14, wherein the spatial channel information indicator corresponds to a precoding matrix indicator (PMI) comprising a first PMI $i_1$ to indicate at least one of the plurality of matrices, and a second PMI $i_2$ into indicate weights to combine the plurality of matrices.

16. A method for a channel state information (CSI) feedback in an advanced communication system, the method comprising:
   receiving, via a higher layer signaling from a base station (BS), CSI feedback configuration information for the CSI feedback including a spatial channel information indicator;
   determining, by a user equipment (UE), the spatial channel information indicator using a codebook that indicates a sum of a plurality of quantities, wherein each quantity is a product of a coefficient and a basis vector as a representation of at least one eigenvector of a covariance matrix of a downlink channel matrix; and
   transmitting, to the BS, over an uplink channel, the CSI feedback including the spatial channel information indicator,
   wherein the spatial channel information indicator comprises the at least one eigenvector corresponding to at least one transmit eigenvector derived using an eigen decomposition of a P×P transmit covariance matrix of a P×R downlink channel matrix, where P is a number of antenna ports at the BS and R is a number of antenna ports at the UE, and
   wherein the at least one transmit eigenvector is calculated as the following weighted linear combination of a plurality of basis vectors:

$$e_{T,1} \approx \sum_{l=0}^{L_T-1} c_{T,l} b_{T,l}$$

where $b_{T,l}$ is an l-th transmit basis vector, $c_{T,l}$ is an l-th transmit weight, and $L_T$ is a number of the plurality of transmit basis vectors.

17. The method of claim 14, wherein the coefficient comprises an amplitude and a phase,
   wherein the amplitude is reported as a wideband component common for all subbands and a subband component for each subband, and
   wherein reporting of the subband component of the amplitude is turned on or off based on the CSI feedback configuration information.

18. The method of claim 14, wherein the spatial channel information indicator comprises at least one eigenvector corresponding to at least one transmit eigenvector and at least one receive eigenvector that are jointly derived using an eigen decomposition of a P×P transmit covariance matrix and an R×R receive covariance matrix of a P×R downlink channel matrix, where P is a number of antenna ports at the BS and R is a number of antenna ports at the UE, and
wherein the jointly derived at least one transmit eigenvector and at least one receive eigenvector are represented as the following weighted linear combination of a plurality of transmit and receive basis vectors:

$$e_{T,1} e_{R,1}^H \approx \sum_{l=0}^{L-1} c_l b_{T,l} b_{R,l}^H$$

where $b_{T,l}$ is an l-th transmit basis vector, L is a number of the plurality of transmit and receive basis vectors, $b_{R,l}$ is an l-th receive basis vector, $c_l$ is an l-th weight.

19. The method of claim 14, wherein the spatial channel information indicator comprises at least one of a transmit covariance matrix or a receive covariance matrix based on the downlink channel matrix, wherein the transmit and receive covariance matrices are respectively represented as the following weighted linear combinations of a plurality of transmit basis matrices and a plurality of receive basis matrices:

$$E_T = \frac{1}{|f|} \sum_{k \in f} \left( (H_k^{(D)})(H_k^{(D)})^H \right) \approx \sum_{l=0}^{L_T-1} c_{T,l} b_{T,l} b_{T,l}^H; \text{ and}$$

-continued $$E_R = \frac{1}{|f|} \sum_{k \in f} \left( (H_k^{(D)})^H (H_k^{(D)}) \right) \approx \sum_{l=0}^{L_R-1} c_{R,l} b_{R,l} b_{R,l}^H$$

where f is a set of frequency subcarriers, $H_k^{(D)}$ is a P×R downlink channel matrix at a frequency subcarrier k in the set f, $E_T$ is a transmit covariance matrix, $b_{T,l} b_{T,l}^H$ is an l-th transmit basis matrix, $c_{T,l}$ is an l-th transmit weight, $L_T$ is a number of the plurality of transmit basis matrices, $E_R$ is a receive covariance matrix, $b_{R,l} b_{R,l}^H$ is an l-th receive basis matrix, $c_{R,l}$ is an l-th receive weight, and $L_R$ is a number of the plurality of receive basis matrices.

20. The method of claim 14, further comprising:
partitioning the spatial channel information indicator into multiple spatial channel information indicators each of which corresponds to a subset of antenna ports at the BS and comprises at least one of the downlink channel matrix, a covariance matrix of the downlink channel matrix, or at least one eigenvector of the covariance matrix of the downlink channel matrix, wherein the downlink channel matrix corresponds to the subset of antenna ports at the BS; and
transmitting, over the uplink channel, the CSI feedback including the multiple spatial channel information indicators in multiple time instances.

* * * * *